US007242991B2

(12) United States Patent
Budinger et al.

(10) Patent No.: US 7,242,991 B2
(45) Date of Patent: *Jul. 10, 2007

(54) WORKFLOW CONTROL CONFIGURATOR FOR USE WITH PROCESS, FACTORY-FLOOR, ENVIRONMENTAL, COMPUTER AIDED MANUFACTURING-BASED OR OTHER CONTROL SYSTEM

(75) Inventors: Bruce D. Budinger, York, PA (US); Robert A. DeRemer, York, PA (US); Ronald L. Hess, York, PA (US); Paul W. LeMert, York, PA (US); James C. Long, York, PA (US); Steven M. Weinrich, York, PA (US); Julia Wright, York, PA (US)

(73) Assignee: Invensys Systems, Inc., Foxboro, MA (US)

( * ) Notice: Subject to any disclaimer, the term of this patent is extended or adjusted under 35 U.S.C. 154(b) by 707 days.

This patent is subject to a terminal disclaimer.

(21) Appl. No.: 10/414,273

(22) Filed: Apr. 15, 2003

(65) Prior Publication Data

US 2003/0220707 A1 Nov. 27, 2003

Related U.S. Application Data

(60) Provisional application No. 60/372,770, filed on Apr. 15, 2002.

(51) Int. Cl.
*G06F 19/00* (2006.01)
(52) U.S. Cl. .............................. 700/95; 700/86; 700/17; 715/965; 715/967
(58) Field of Classification Search .................. 700/95, 700/17, 86, 87; 702/32; 715/965, 967; 705/8
See application file for complete search history.

(56) References Cited

U.S. PATENT DOCUMENTS 5,848,393 A 12/1998 Goodridge et al.

(Continued)

OTHER PUBLICATIONS

VanNess, Shawn A. "GEO—the General Expression Object: Overview" Version 3.1 (beta1) 1997-1999 (1 page).

(Continued)

*Primary Examiner*—Leo Picard
*Assistant Examiner*—Steven R. Garland
(74) *Attorney, Agent, or Firm*—Nutter, McClennen & Fish, LLP; David J. Powsner

(57) ABSTRACT

The invention provides improved methods and apparatus for workflow editing. Such methods and apparatus permit, for example, user-defined and/or other tasks to be combined in any combination or combinations to specify a workflow. The tasks can be linked for direct, serial processing and/or for conditional processing that includes branching and/or looping. The invention also improved methods and apparatus of workflow definition and processing with extensible actions. The invention provides, further, improved methods and apparatus for workflow definition and processing which utilize workflow variables for communication of data and control information among tasks within a workflow. The invention provides, still further, improved methods and apparatus of workflow definition and processing with enhanced messaging. The invention provides, still yet further, improved methods and apparatus for workflow definition and processing which permit definition of hierarchically enumerated data types and for for definition of "plans" to collect, e.g., for storage, data such as the aforementioned hierarchical data types.

18 Claims, 46 Drawing Sheets

U.S. PATENT DOCUMENTS

| | | | |
|---|---|---|---|
| 6,073,109 | A | 6/2000 | Flores et al. |
| 6,349,287 | B1 | 2/2002 | Hayashi |
| 6,594,588 | B1 * | 7/2003 | Peden et al. .................. 702/32 |
| 2003/0217053 | A1 * | 11/2003 | Bachman et al. .............. 707/4 |
| 2004/0254465 | A1 * | 12/2004 | Sano et al. ................... 700/17 |

OTHER PUBLICATIONS

VanNess, Shawn A. "GEO—the General Expression Object: Interface Documentation" Version 3.1 (beta1) 1997-1999 (2 apges).

VanNess, Shawn A. "GEO—the General Expression Object: The Math Library" Version 3.1 (beta1) 1997-1999 (2 pages).

VanNess, Shawn A. "GEO—the General Expression Object: Sample Client Code" Version 3.1 (beta1) 1997-1999 (1 page).

VanNess, Shawn A. "GEO—the General Expression Object: Support" Version 3.1 (beta1) 1997-1999 (1 page).

VanNess, Shawn A. "GEO—the General Expression Object: Expression Syntax" Version 3.1 (beta1) 1997-1999 (1 page).

VanNess, Shawn A. "GEO—the General Expression Object: Technical Info" Version 3.1 (beta1) 1997-1999 (1 page).

* cited by examiner

List1
- Level1_1 [1]
  - Level2_1 [11]
  - Level2_2 [12]
- Level1_2 [2]
  - Level2_3 [13]
    - Level3_1 [21]
      - Level4_1 [31]
        - Level5_1 [41]
- Level1_3 [3]

```xml
<xsl:stylesheet version="1.0" xmlns:xsl="http://www.w3.org/1999/XSL/Transform">
  <xsl:template match="/">
    <html>
      <body>
        <xsl:apply-templates />
      </body>
    </html>
  </xsl:template>
  <xsl:template match="xsl:stylesheet" />
  <!-- ignore embedded stylesheet -->
  <xsl:template match="Header" />
  <!-- ignore header node-set -->
  <xsl:template match="Body">
    <xsl:apply-templates select="Heading" />
    <table span="100%">
      <col width="80%" />
      <col width="20%" />
      <xsl:for-each select="Message_Entry">
        <tr>
          <xsl:apply-templates />
        </tr>
      </xsl:for-each>
    </table>
    <hr />
    <div align="right">
      <button id="submit" onclick="window.external.Submit()" disabled="true">Submit</button>
      <button id="cancel" onclick="window.external.Cancel()" disabled="true">Cancel</button>
    </div>
  </xsl:template>
  <xsl:template match="Heading">
    <h2>
      <center>
        <xsl:value-of select="text()" />
      </center>
    </h2>
    <hr />
  </xsl:template>
  <xsl:template match="Prompt">
    <td>
      <xsl:value-of select="text()" />
    </td>
  </xsl:template>
  <xsl:template match="Result">
    <td>
      <xsl:element name="input">
        <xsl:attribute name="id">
          <xsl:value-of select="@name" />
        </xsl:attribute>
        <xsl:attribute name="type">text</xsl:attribute>
        <xsl:attribute name="value">
          <xsl:value-of select="text()" />
        </xsl:attribute>
      </xsl:element>
    </td>
  </xsl:template>
</xsl:stylesheet>
```

Figure 31

```xml
<?xml version="1.0" encoding="UTF-8" ?>
<!-- Generated by XML Authority. Conforms to w3c http://www.w3.org/2001/XMLSchema -->
<xsd:schema xmlns:xsd="http://www.w3.org/2001/XMLSchema">
  <xsd:element name="UI_Message">
    <xsd:complexType>
      <xsd:sequence>
        <xsd:element ref="Header" />
        <xsd:element ref="Body" />
      </xsd:sequence>
      <xsd:attribute name="id" use="required" type="xsd:string" />
    </xsd:complexType>
  </xsd:element>
  <xsd:element name="Header">
    <xsd:complexType>
      <xsd:sequence>
        <xsd:element ref="Mode" />
        <xsd:element ref="Name" />
        <xsd:element ref="Description" />
        <xsd:element ref="TimeCreated" />
        <xsd:element ref="Timeout" />
        <xsd:element ref="Workflow" />
        <xsd:element ref="Workstation_Group" />
        <xsd:element ref="Routing" />
        <xsd:element ref="Security" />
        <xsd:element ref="Interaction_Log" />
      </xsd:sequence>
    </xsd:complexType>
  </xsd:element>
  <xsd:element name="Mode" />
  <xsd:element name="Name" />
  <xsd:element name="Description" />
  <xsd:element name="TimeCreated" />
  <xsd:element name="Timeout" type="xsd:double" />
  <xsd:element name="Workflow">
    <xsd:complexType mixed="true">
      <xsd:complexContent>
        <xsd:extension base="anyType">
          <xsd:choice />
          <xsd:attribute name="trigger" use="required" type="xsd:string" />
          <xsd:attribute name="id" use="required" type="xsd:string" />
        </xsd:extension>
      </xsd:complexContent>
    </xsd:complexType>
  </xsd:element>
  <xsd:element name="Workstation_Group" />
  <xsd:element name="Routing">
    <xsd:complexType>
      <xsd:sequence>
        <xsd:element ref="Origin" />
        <xsd:element ref="Destination" />
        <xsd:element ref="Response" />
        <xsd:element ref="Exception" />
      </xsd:sequence>
    </xsd:complexType>
  </xsd:element>
  <xsd:element name="Origin">
    <xsd:complexType mixed="true">
      <xsd:choice />
      <xsd:attribute name="protocol" use="required" type="xsd:string" />
    </xsd:complexType>
  </xsd:element>
  <xsd:element name="Destination">
    <xsd:complexType mixed="true">
      <xsd:complexContent>
```

Figure 32A

```xml
            - <xsd:extension base="anyType">
                <xsd:attribute name="protocol" use="required" type="xsd:string" />
              </xsd:extension>
            </xsd:complexContent>
        </xsd:complexType>
    </xsd:element>
- <xsd:element name="Response">
    - <xsd:complexType mixed="true">
        - <xsd:complexContent>
            - <xsd:extension base="anyType">
                <xsd:attribute name="protocol" use="required" type="xsd:string" />
              </xsd:extension>
            </xsd:complexContent>
        </xsd:complexType>
    </xsd:element>
- <xsd:element name="Exception">
    - <xsd:complexType mixed="true">
        <xsd:attribute name="protocol" use="required" type="xsd:string" />
      </xsd:complexType>
    </xsd:element>
- <xsd:element name="Security">
    - <xsd:complexType>
        - <xsd:sequence>
            <xsd:element ref="Req_Authorization" />
          </xsd:sequence>
      </xsd:complexType>
    </xsd:element>
- <xsd:element name="Req_Authorization">
    <xsd:complexType />
  </xsd:element>
- <xsd:element name="Interaction_Log">
    - <xsd:complexType>
        - <xsd:sequence>
            <xsd:element ref="TimeStamp" />
            <xsd:element ref="User" />
            <xsd:element ref="Authorization" />
            <xsd:element ref="Location" />
          </xsd:sequence>
      </xsd:complexType>
    </xsd:element>
- <xsd:element name="TimeStamp">
    <xsd:complexType />
  </xsd:element>
- <xsd:element name="User">
    <xsd:complexType />
  </xsd:element>
- <xsd:element name="Authorization">
    <xsd:complexType />
  </xsd:element>
- <xsd:element name="Location">
    <xsd:complexType />
  </xsd:element>
- <xsd:element name="Body">
    - <xsd:complexType>
        - <xsd:sequence>
            <xsd:element ref="Heading" />
            <xsd:element ref="Message_Entry" maxOccurs="unbounded" />
          </xsd:sequence>
      </xsd:complexType>
    </xsd:element>
    <xsd:element name="Heading" />
- <xsd:element name="Message_Entry">
    - <xsd:complexType>
        - <xsd:sequence>
            <xsd:element ref="Prompt" />
```

Figure 32B

```xml
        <xsd:element ref="Result" minOccurs="0" />
      </xsd:sequence>
    </xsd:complexType>
  </xsd:element>
- <xsd:element name="Prompt">
  - <xsd:complexType mixed="true">
    - <xsd:complexContent>
      - <xsd:extension base="anyType">
        - <xsd:attribute name="type" use="required">
          - <xsd:simpleType>
            - <xsd:restriction base="xsd:NMTOKEN">
                <xsd:enumeration value="question" />
                <xsd:enumeration value="label" />
              </xsd:restriction>
            </xsd:simpleType>
          </xsd:attribute>
        </xsd:extension>
      </xsd:complexContent>
    </xsd:complexType>
  </xsd:element>
- <xsd:element name="Result">
  - <xsd:complexType mixed="true">
    - <xsd:complexContent>
      - <xsd:extension base="anyType">
          <xsd:attribute name="name" use="required" type="xsd:string" />
        - <xsd:attribute name="required" use="required">
          - <xsd:simpleType>
            - <xsd:restriction base="xsd:NMTOKEN">
                <xsd:enumeration value="false" />
                <xsd:enumeration value="true" />
              </xsd:restriction>
            </xsd:simpleType>
          </xsd:attribute>
        </xsd:extension>
      </xsd:complexContent>
    </xsd:complexType>
  </xsd:element>
</xsd:schema>
```

Figure 32C

```xml
<?xml version="1.0" ?>
<UI_Message id="33916EEC-C681-4c06-8833-46EDEB005018" xmlns:dt="urn:schemas-microsoft-com:datatypes">
  <Header>
    <Mode />
    <Name />
    <Description />
    <TimeCreated dt:dt="string" />
    <Timeout dt:dt="i4" />
    <Workflow id="48F25A83-D462-4e4c-95E7-95C38BE38EFF" trigger="name" />
    <Workstation_Group />
    <Distribution_Mask />
    <Routing>
      <Origin protocol="msmq" />
      <Destination protocol="msmq" />
      <Response protocol="msmq" />
      <Exception protocol="msmq" />
    </Routing>
    <Security>
      <Req_Authorization />
    </Security>
    <Interaction_Log>
      <TimeStamp />
      <User />
      <Authorization />
      <Location />
    </Interaction_Log>
  </Header>
  <Body>
    <Heading />
    <!-- 1+ Message_Entry elements type = (label | question | list | combo) -->
    <Message_Entry>
      <Prompt type="label" />
    </Message_Entry>
    <Message_Entry>
      <Prompt type="question" />
      <Result name="result_variable_name" required="true" dt:dt="string" />
    </Message_Entry>
  </Body>
  <UI_Facet name="std_display">
    <xsl:stylesheet version="1.0" xmlns:xsl="http://www.w3.org/1999/XSL/Transform">
      <xsl:template match="/">
        <html>
          <body>
            <xsl:apply-templates />
          </body>
        </html>
      </xsl:template>
      <xsl:template match="xsl:stylesheet" />
      <!-- ignore embedded stylesheet -->
      <xsl:template match="Header" />
      <!-- ignore header node-set -->
      <xsl:template match="Body">
        <xsl:apply-templates select="Heading" />
        <table span="100%">
          <col width="80%" />
          <col width="20%" />
          <xsl:for-each select="Message_Entry">
            <tr>
              <xsl:apply-templates />
            </tr>
          </xsl:for-each>
        </table>
        <hr />
```

Figure 33A

```xml
- <div align="right">
    <button id="submit" onclick="window.external.Submit()"
      disabled="true">Submit</button>
    <button id="cancel" onclick="window.external.Cancel()"
      disabled="true">Cancel</button>
  </div>
  </xsl:template>
- <xsl:template match="Heading">
  - <h2>
    - <center>
        <xsl:value-of select="text()" />
      </center>
    </h2>
    <hr />
  </xsl:template>
- <xsl:template match="Prompt">
  - <td>
      <xsl:value-of select="text()" />
    </td>
  </xsl:template>
- <xsl:template match="Result">
  - <td>
    - <xsl:element name="input">
      - <xsl:attribute name="id">
          <xsl:value-of select="@name" />
        </xsl:attribute>
        <xsl:attribute name="type">text</xsl:attribute>
      - <xsl:attribute name="value">
          <xsl:value-of select="text()" />
        </xsl:attribute>
      </xsl:element>
    </td>
  </xsl:template>
  </xsl:stylesheet>
  </UI_Facet>
</UI_Message>
```

Figure 33B

WORKFLOW CONTROL CONFIGURATOR FOR USE WITH PROCESS, FACTORY-FLOOR, ENVIRONMENTAL, COMPUTER AIDED MANUFACTURING-BASED OR OTHER CONTROL SYSTEM

This application claims the benefit of filing of U.S. Provisional Patent Application 60/372,770, filed Apr. 15, 2002, and entitled METHODS AND APPARATUS FOR WORKFLOW DEFINITION AND PROCESSING, the teachings of which are incorporated herein by reference.

BACKGROUND OF THE INVENTION

The invention pertains to digital data processing and, more particularly, by way of non-limiting example, to automated workflow definition and processing. The invention has application, for example, in process control, environmental control, computer aided manufacturing, and other industrial and non-industrial applications.

Automated workflow processing is increasingly common in today's manufacturing plants. Conventional solutions provide general capabilities for interfacing plant equipment to identify events and take specific responsive actions. However, those solutions provide for only rudimentary workflow definition and require special-purpose programs to model plant operations of complexity. The conventional solutions, moreover, provide only limited interfaces, accepting data from and outputting data to only specific hardware devices and software applications.

This runs counter to modern trends, wherein plant owners—and, more generally, all those who own or run process control, environmental control, computer aided manufacturing, and other industrial and non-industrial applications—may wish to "mix and match" hardware devices and software solutions. Thus, for example, different areas of the plant floor and, certainly, of an enterprise as a whole may use different process control, environmental control, computer aided manufacturing, and other industrial and non-industrial equipment. The same is true of software (whether it be for control, "back office" reporting and analysis, and/or other applications) used on the plant floor and/or by the enterprise.

Significantly, this also runs counter to a trend for increased data distribution and visibility. Continuing the above example, those who own or run process control, environmental control, computer aided manufacturing, and other industrial and non-industrial applications, may wish to distribute data among different areas of the plant floor and/or within the enterprise as a whole, regardless of any existing diversity of hardware and software used. They may wish to do this to improve control, as well as reporting and analysis, on the plant floor and/or by the enterprise.

An object of this invention is to provide improved digital data processing systems and methods.

Another object is to provide such systems and methods as are suited to workflow definition and/or processing.

A further object is to provide such systems and methods as provide increased flexibility and workflow modelling processing over conventional systems.

A still further object is to provide such systems and methods as facilitate the mixing and integration of hardware devices and/or software solutions, e.g., whether for improved control, reporting, analysis, or otherwise, on a plant floor, in an enterprise, or otherwise.

Yet still another object of the invention is to provide such systems and methods as facilitate data distribution and visibility, e.g., among hardware devices and/or software solutions, whether of diverse varieties or otherwise.

SUMMARY OF THE INVENTION

These are among the objects attained by the invention which provides, in one aspect, improved methods and apparatus for workflow editing. Such methods and apparatus permit, for example, user-defined and/or other tasks to be combined in any combination to specify a workflow. The tasks can be linked for direct, serial processing and/or for conditional processing that includes branching and/or looping.

Related aspects of the invention provide such methods and apparatus as permit third-party (or unrelated) software applications to be invoked as tasks, with their respective contexts defined by environmental variables, e.g., which are interfaced through an applications program interface (API).

Further aspects of the invention provide such methods and apparatus which accept and process factory-floor or other process control, environmental control, computer aided manufacturing, and other industrial and non-industrial application data, regardless of its source. Related aspects of the invention provide for enhanced definition of data sources, data sinks and other tags.

Still further related aspects of the invention provide such methods and apparatus wherein workflow editing is performed graphically, e.g., using panes that are organized hierarchically or otherwise. Yet still further aspects of the invention provide for definition of the workflow utilizing a graphical programming metaphor. Related aspects of the invention provide for graphical definition of information-flow among tasks and to/from other applications or devices.

Other aspects of the invention provide improved methods and apparatus of workflow definition and processing with extensible actions. Such methods and apparatus permit user definition of workflow tasks, e.g., using the graphical programming metaphor or otherwise. This includes, by way of non-limiting example, interfacing legacy software systems and databases.

Related aspects of the invention provide such methods and apparatus in which the actions conform to a component object model (COM) application program interface (API). That interface can define portions of a third-party application context required for task implementation and can provide mechanisms for communication of that information.

Extensible actions according to some aspects of the invention permits a workflow to interface with components and subsystems not part of the workflow system. This is done by permitting the workflow to instantiate component object model (COM) components that implement an extended action interface. A component of this type permits a workflow editor and workflow processing engine to interrogate the component for input and output arguments and other properties, as well as to cause the component to execute. The extended action interface provides a portal through which the workflow can give information to, and acquire information from, external systems.

Related aspects of the invention provide methods and apparatus as described above in which the input and output argument sets of such a component comprise a portion of an overall workflow context. An action can be executed with the input argument contexts and, upon return from the extended action component, entries in the output argument context can be written back to corresponding entries in the overall workflow context.

Still further related aspects of the invention provide such methods and apparatus as provide for enhanced communication between a task executing in a workflow processing engine and a third-party application.

Still other aspects of the invention provide improved methods and apparatus for workflow definition and processing which utilize workflow variables for communication of data and control information among tasks within a workflow. Such variables can reflect workflow status, factory-floor or other process control, environmental control, computer aided manufacturing, and other industrial and non-industrial application data and/or other parameters.

Related aspects of the invention such methods and apparatus as provide for persistence of the workflow variables, e.g., using XML or other markup languages.

Still other aspects of the invention provide improved methods and apparatus of workflow definition and processing with enhanced messaging. This facilitates communication with an operator station during workflow execution.

Related aspects of the invention provide such methods and apparatus in which both message content and formatting is transmitted between a workflow processing engine and an operator interface, e.g., via a markup language. Related aspects of the invention provide for use of XML and XSL for these purposes. Still further related aspects provide for customizable display of operator interfaces via controls which execute style sheets. Yet still further related aspects of the invention provide for enhanced transmittal of operator responses to the workflow processing engine.

Still other aspects of the invention provide improved methods and apparatus for workflow definition and processing which permit definition of hierarchically enumerated data types, referred to below as List PDIs. These can be used to capture multiple levels of data, e.g., for analysis or reporting.

Related aspects of the invention provide for definition of "plans" to collect, e.g., for storage, data such as the aforementioned hierarchical data types. These plans can include expressions that are evaluated on collection or storage of the data. Such expressions can include execution of procedures, e.g., for obtaining or evaluating further data.

Still other aspects of the invention provide improved methods and apparatus for workflow definition and processing which provide for registration of third-party and other software applications, e.g., used by an enterprise, and that facilitate communication with such applications. Related aspects of the invention facilitate information visibility, e.g., communication of information to/from portals and other data display/collection applications, networked or otherwise.

Still other aspects of the invention provide improved methods and apparatus for workflow definition and processing that utilize a common event-driven or other messaging structures, e.g., for transferring data to/from applications and/or operator interfaces.

Still other aspects of the invention provide improved methods and apparatus for workflow definition and processing that facilitate real-time gathering, processing, communication and/or reporting of data.

Advantages of methods and apparatus according to the foregoing and other aspects of the invention are that they facilitate distribution of data upon event occurrence. This can include, by way of non-limiting example, distribution of distributed control system (DCS) data in real-time to transactional software, e.g., executing within or between enterprises. It can also include, by way of further non-limiting example, communication of information necessary for supply chain automation between a plan and its customers.

Other aspects of the invention are evident in the claims, as well as in the text and drawings that follow.

BRIEF DESCRIPTION OF THE DRAWINGS

A more complete understanding of the invention may be attained by reference to the drawings, in which

FIG. 11 depicts the tree hierarchy of a List PDI in a system according to one practice of the invention;

FIGS. 15–16 depict graphical user interface screens used in connection with definition and maintenance of collection plans in a system according to one practice the invention;

FIG. 31 is a UI Message style sheet according to one practice of the invention;

FIGS. 32A–32C is a UI Message schema according to one practice of the invention;

FIGS. 33A–33B is a UI Message template according to one practice of the invention;

DETAILED DESCRIPTION OF THE ILLUSTRATED EMBODIMENT

Figure 1A:
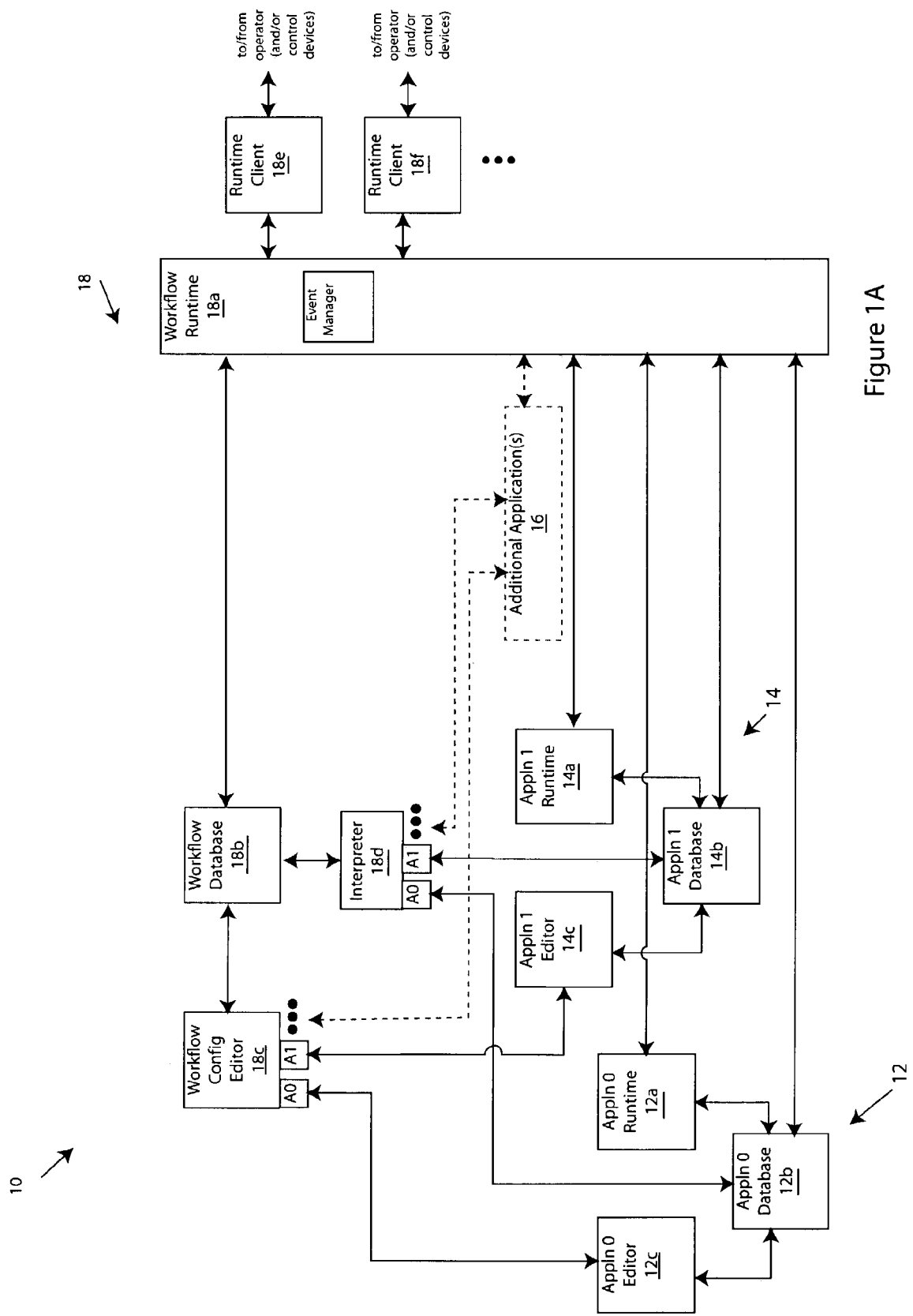
FIGS. 1A–1C depict a digital data processing system according to one practice of the invention.

FIG. 1A depicts a digital data processing system 10 according to one practice of the invention. The illustrated system includes one or more applications 12, 14, 16 of the type commercially available and conventionally used for process, batch, discrete, environmental or other control in manufacturing, utilities or other industries, research or other applications. The applications 12–16 are adapted to monitor and/or control the respective process, batch, environment, and so forth, via sensors and/or control equipment in the conventional manner known in the art. The illustrated system also includes a production engine 18 that is coupled to applications 12–16 and coordinates data collection, operation, and/or reporting thereby.

Engine 18 and applications 12–16 may execute on a single digital data processing device or multiple digital data processing devices, which may be disposed locally or remotely with respect to one another and which may communicate via network or otherwise in the conventional manner known in the art. Each digital data processing device may constitute a conventional workstation, personal computer, mainframe computer, controller, microprocessor, embedded processor, "smart" field device or any other hardware/software platform suitable for module and/or application execution in accord with the teachings hereof. On any given such digital data processing device, the respective engine 18 and/or applications 12–16 may execute within a single process though, more typically, they execute in different respective processes.

Illustrated applications 12–14, referred to as "Appln 0" and "Appln 1," respectively, have runtime components 12a, 14a that operate in accord with information contained in respective databases 12b, 14b, proprietary or otherwise, that may be independent or shared between those and other applications in the conventional manner known in the art (as further adapted in accord with the teachings below). Each application 12, 14 also includes an editor (or configurator) that is used in the conventional manner, e.g., to set up and modify the respective database for such functions as are desired by the plant operator or other personnel. Each additional application 16 can similarly include a runtime component, database and editor.

Those skilled in the art will, of course, appreciate that, per convention in the art, applications 12–16 may include fewer components or more components than those shown in the drawing and described herein. Thus, for example, some application used in systems according to the invention may include only a runtime component and others may include multiple runtime components, databases and/or editors, as well as other components.

Illustrated production engine 18 includes a runtime component 18a—referred to below both as the "event manager" or "production engine"—that coordinates operation of, data collection for, and/or reporting for applications 12–16. This is governed by workflow(s) and parameters defined in a configuration database 18b—though, in alternate embodiments these may be hardcoded, e.g., in the runtime component (18a) and/or defined elsewhere. An editor (or configurator) 18c, which includes the Workflow Editor described below, provides a user interface and/or otherwise facilitates set up and modification the database 18b and, more generally, the production engine 18.

The aforementioned operational coordination, data collection and/or reporting may be effected via coupling between the component 18a (the event manager) and the applications' respective runtime components 12a–14a, e.g., utilizing application program interfaces (APIs) or other interprocess communications techniques, as discussed below. Though all of these coupling mechanisms are indicated in the drawing by lines connecting component 18a with the runtime modules 12a–14a and databases 12b–14b, those skilled in the art will appreciate that fewer or additional mechanisms may be employed as well consistent with the teachings below.

In the illustrated embodiment, further coupling between the production engine 18 and the applications 12–16 is provided via their respective database components 12b, 14b and 18b. To this end, system 18 includes a interpreter 18d that transfers data between the configuration database 18b and the application's respective databases 12b–14b. Such transfers may be effected at configuration time, at runtime, periodically, continuously, or otherwise, e.g., in accord with the teachings below.

Communications coupling, formatting and/or translation required for each respective database 12b–14b is effected by respective interface adapters shown, here, "hanging off" the interpreter 18d and labeled A0, A1. In practice, the adapters may be part of (e.g., "hang off") the interpreter 18d and/or the databases 12b–14b themselves (and, more properly, respective database managements systems—which may, for example, form part of the respective runtime or editor components 12a, 12c–14a, 14c).

To facilitate coordinated setup and/or modification of the system 10, databases 12b, 14b, 18b, configuration editor 18c may include adapters that facilitate direct setup or modification of the application databases 12b–14b, or portions thereof, e.g., via an interface consistent with that provided by editor 18c vis-a-vis database 18b, via interfaces consistent with those provided by editors 12c-14c vis-a-vis databases 12b–14b, or otherwise. As above, the adapters are shown here hanging off the editor 18c and labeled A0, A1. In practice, the adapters may be part of the editor 18c and/or the databases 12b–14b themselves.

Applications 12–16 are clients of the production engine 18, e.g., insofar as those applications rely on services or data provided by engine 18 for purposes of setup and/or coordinated runtime operation. The illustrated system includes further clients, here, runtime clients 18e, 18f that provide for notifications (e.g., alarms), workflow or other status reporting, and/or data collection, e.g., via user interfaces with plant operator or other personnel. While runtime clients 18e, 18f can be adapted to interface process or other control equipment, e.g., in the manner of applications 12–16, in the illustrated embodiment, the runtime clients are more typically adapted to provide alarms, notifications and other information to plant personnel and/or to receive information therefrom, e.g., in addition to or in lieu of such information provided to and/or received from such personnel by the applications 12–16. More particularly, in one embodiment, the runtime client provides for security (e.g., password entry and access restriction); data trending; alarm notification; task list entry, editing, history reporting and querying; graphical or other workflow status visualization; and workflow state setting (e.g., offline versus active).

Overview of Operation and Terminology

The production engine 18 provides a framework to configure, capture and manage process and production data based on inputs from (and outputs to) applications 12–16, plant or personnel, and/or process or other control equipment. It also provides for correlating process and production data, e.g., to facilitate analysis of the effectiveness of a facility or process. To this end, the engine 18 comprises, inter alia, an event manager 18a that monitors the equipment or processes, for example, via communications with applications 12–16 and via interfaces (e.g., through runtime clients 18e, 18f) with the plant personnel and/or control equipment directly); executes workflows and evaluates any expressions defined therein; triggers actions; prompts plant personnel with or for information; collects data from the applications, personnel and/or control equipment.

As noted above, operation of the event manager 18a is based on workflows, e.g., represented in database 18b. Workflow types include, by way of non-limiting example material workflows (e.g., manipulating raw materials to produce finished goods), equipment workflows (e.g., based on a manufacturing resource, e.g., machine, line, cell, exceptions, faults and regular maintenance activities, cleaning, calibration, failures) and supply chain and/or information workflows (e.g., moving information between applications or areas in an enterprise). Workflows can be triggered by multiple machines, with parameters captured automatically from that equipment or manually from its operators.

As discussed further below, workflow definitions can include event triggers, e.g., process value changes, device inputs, production status changes, resource status changes, messages from other application, or UI messaging. Workflow definitions in the illustrated embodiment also typically include event actions. These can include transactions (such as start, complete, etc.) in applications 12–16, stored procedures/database actions; set-point downloading; user tasks, such as data collection, downtime reporting, sample registration, production reporting, consumption reporting, maintenance task; operator messaging (referred to below as User Interface or UI messages); and SCADA alarm actions, such as e-mail, pager, or telephone messages; to name a few.

In addition to events and actions, a workflow of the illustrated embodiment can include activities, which are defined by one or more related actions; transitions, which inhibit the execution of a workflow until a condition is met; conditional branches, which allow one branch of activities to executed based on evaluation of an expression; decision branches, result in execution of one branch of activities if the evaluation of an expression is true and another branch if false; loops, which execute a executes a series of activities until a condition is met. Of course, it will be appreciated that workflows may have other components, instead or in addition, consistent with the teachings hereof.

Workflow definitions in the illustrated embodiment utilize process data items or PDIs. These capture, track and move information about the controlled process. PDIs represent an aggregation of functionality, such as a transaction input, I/O point (or "tag"), process historization, alarming and analysis. Types of PDI in the illustrated embodiment include memory variables/local workflow variables, I/O and device input, user input, and database I/O. At runtime, sources of PDI values include tags (or I/O points), information manually entered (e.g., via a runtime client), values derived from other data, information retrieved from application databases 12b–14b, arithmetic and/or logical expressions.

By way of example, plant equipment such as a packer unit signals the production engine indicating that its status has changed to a non-running state. A scheduler operating within the event manager 18a reschedules work otherwise assigned to that unit to other plant equipment, updating a work-in-process module with the new equipment information. Based on the downtime cause reported by the equipment and its' expected duration, the scheduler also reschedules the shop floor to account for the lost resource and releases a new schedule to the floor, e.g., via operator messing in a runtime client 18e, 18f, concurrently updating application databases 12b–14b (and other tables, databases, etc.) that govern operation of the floor equipment. The scheduler also signals the runtime components of necessary applications, e.g., 12a, to reflect transfer of the job and operators to the new equipment.

Concurrently, the scheduler treats the underlying cause of the non-running state as an indicator of a maintenance task, to which it assigns a resource—here, a mechanic. It notifies both the mechanic and the information technology department (and/or other enterprise personnel) of the assignment, e.g., via a runtime client 18f. The scheduler also messages personnel to have the parts prepared and delivered to the downed equipment.

Figure 1B:
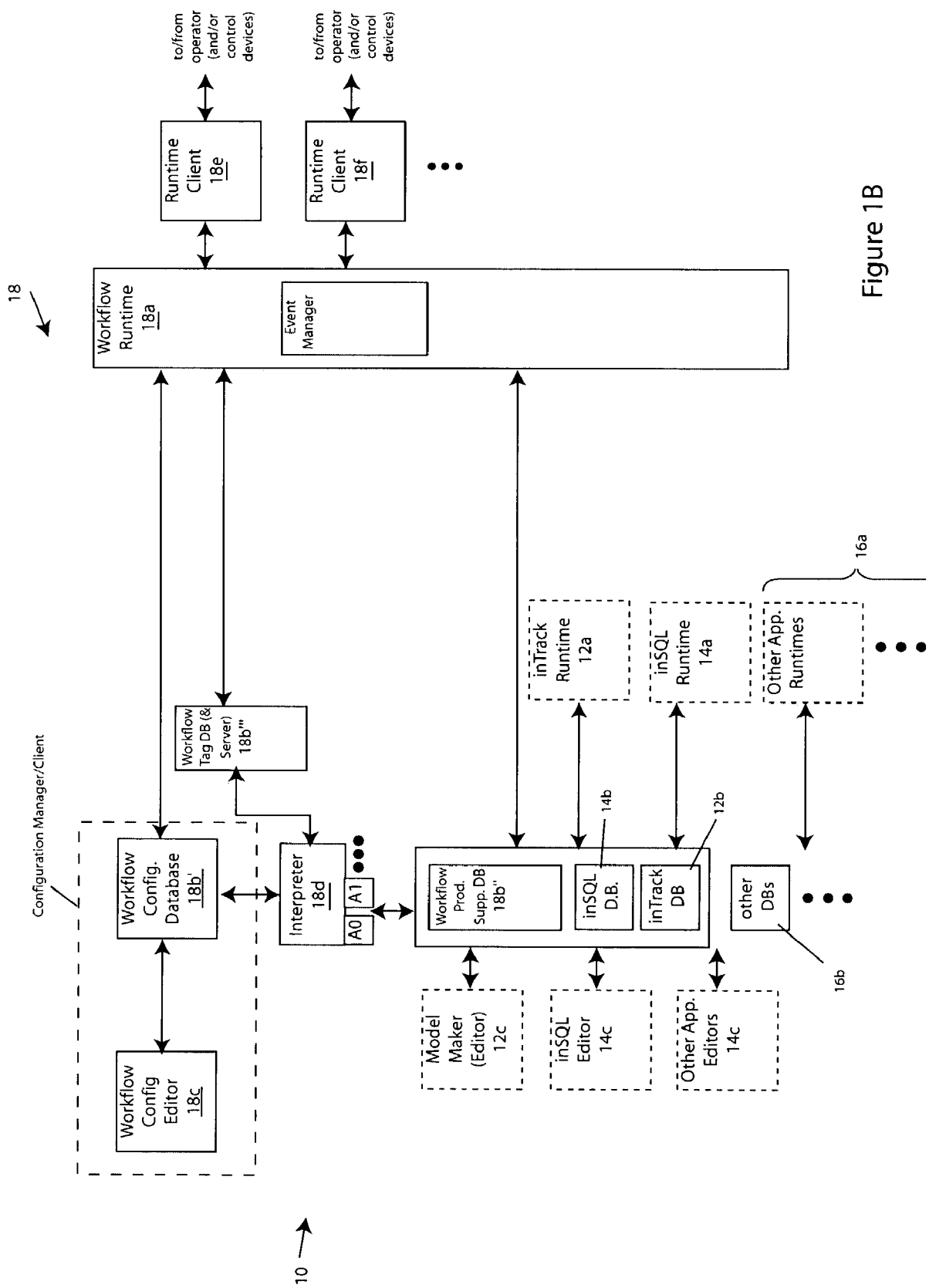

Referring to FIG. 1B, in the illustrated embodiment, the applications 12–16 include InTrack™ and InSQL™, both commercially available from the assignee hereof. InTrack™ provides for graphical representation of a controlled process (and the underlying equipment or other resources). It permits, for example, tracking of production from raw materials through to finished goods inventory, and can model and track critical resources like work orders, materials, product specifications, work instructions, equipment, people and process/analytical data. InSQL™ is an SQL server that provides a common point of access for production information utilized by InTrack, providing for acquisition of production data in real time and integration of non-real-time, manual or off-line data. These applications share a common database, e.g., 12b, associated with the InTrack™ product, as well as having independent databases, e.g., an InSQL™ database (associated with the InSQL™ product).

The runtime component of the InTrack™ application is depicted in FIG. 1B as element 12a; the database component, as element 12b; and the editor (referred to as Model Maker™), as element 12c. The corresponding components of the InSQL™ application are depicted as elements 14a, 14b and 14c. Further applications, depicted in the drawing by elements 16a, 16b, 16c, can include by way of non-limiting example the InTouch™ product, which is commercially available from the assignee hereof and which provides a human machine interface (HMI), enabling visualization of control and information resources, e.g., represented by InTrack.

Of course, those skilled in the art will appreciate that other applications, regardless of whether available from the assignee hereof, can be utilized in addition to or instead of inTrack™, InSQL™, and/or InTouch™. Those applications may be competitive, functional or other equivalents of the type known in the art amenable or adaptable for use in systems operating according to the teachings hereof. By way of example, in place of (or in addition to) the inSQL™ server, another SQL server may by utilized, as may be a database management system, query system or other system capable of querying or otherwise identifying items of interest in a database, table or other data collection.

Also shown in FIG. 1B is the division of configuration database 18b into a configuration database components 18b' and one or more runtime components, here, a runtime "support" database component 18b" and a runtime "tag" database component 18b'". The configuration database component 18b' maintains a representation of the workflow editable by editor (or configurator) 18c. The runtime components 18b" and 18b'" maintain representations of the workflow uploaded from the configuration component 18b', as well as of operational parameters taken from the other application databases, e.g., 12b, 14b, and 16b. Thus, for example, support database component 18b" can maintain a representation of event triggers, event actions, activities, transitions, conditional branches, decision branches, loops, and so forth that make up a workflow. Tag database component 18b'" on the other hand, for example, maintains a representation or listing of I/O ports, memory addresses and other tags potentially implicated by the workflow.

The runtime components 18b" and 18b'" of the configuration database 18b are generated by the interpreter 18d and/or by an compilation/upload component (not shown). This can include compiling into a suitable runtime representation for component 18b" the graphical (or other) representation of the workflow maintained in configuration database 18b'. It can also include resolving references to tags and other parameters in the configuration representation so that they can be properly accessed at runtime by the production engine.

According to one practice of the invention, workflows in the configuration database 18b' are maintained in "disabled" or "enabled" states, as determined by the operator, e.g., using a menu or other option in editor 18c. In a preferred practice, the interpreter 18d and/or compilation/upload element upload to the runtime databases 18b" and 18b'" only configuration database 19b' workflows that are in the "enabled" state.

Likewise, according to one practice of the invention, workflows represented in the runtime databases 18b" and 18b'" are maintained in "offline", "active" and "running" states. Workflows in the offline state are not executed or "evaluated" by the event manager 18a, while those in the active state are amenable to such execution. Workflows currently being executed by the event manager are referred to as running.

Generation of the tag database 18b'" can be accomplished, for example, by creating a indexed, trees or other accessible compilation of tags suitable for access by the production engine 18 during execution of the workflow represented in database 18b".

Although the illustrated embodiment utilizes separate databases 18b'–18b'" to maintain the configuration versus runtime representations of workflows, alternate embodiments utilize a single database (or set of databases) for both configuration and runtime.

In some embodiments, the production engine accesses the tag database 18b" directly. In other embodiments, a tag database server (not shown) serves as an interface between the production engine 18 and the database 18b". One such server is commercially available from the assignee hereof as part of its inTouch™ software package.

With further reference to FIG. 1B, the production engine 18 of the illustrated embodiment includes an application server component that provides an interface between the production engine and one or more of the databases 18b'", 12b, 14b, 16c. The application server, which can be packaged separately from the event manager 18a or other runtime components, support multiple access by simultaneous clients to these databases, e.g., thus permitting the production engine to access the databases for purposes of workflow execution while, at the same time, permitting the applications 12–16 to access respective ones of those databases to carry out application-specific tasks (e.g., in response to notifications from the production engine).

Figure 1C:
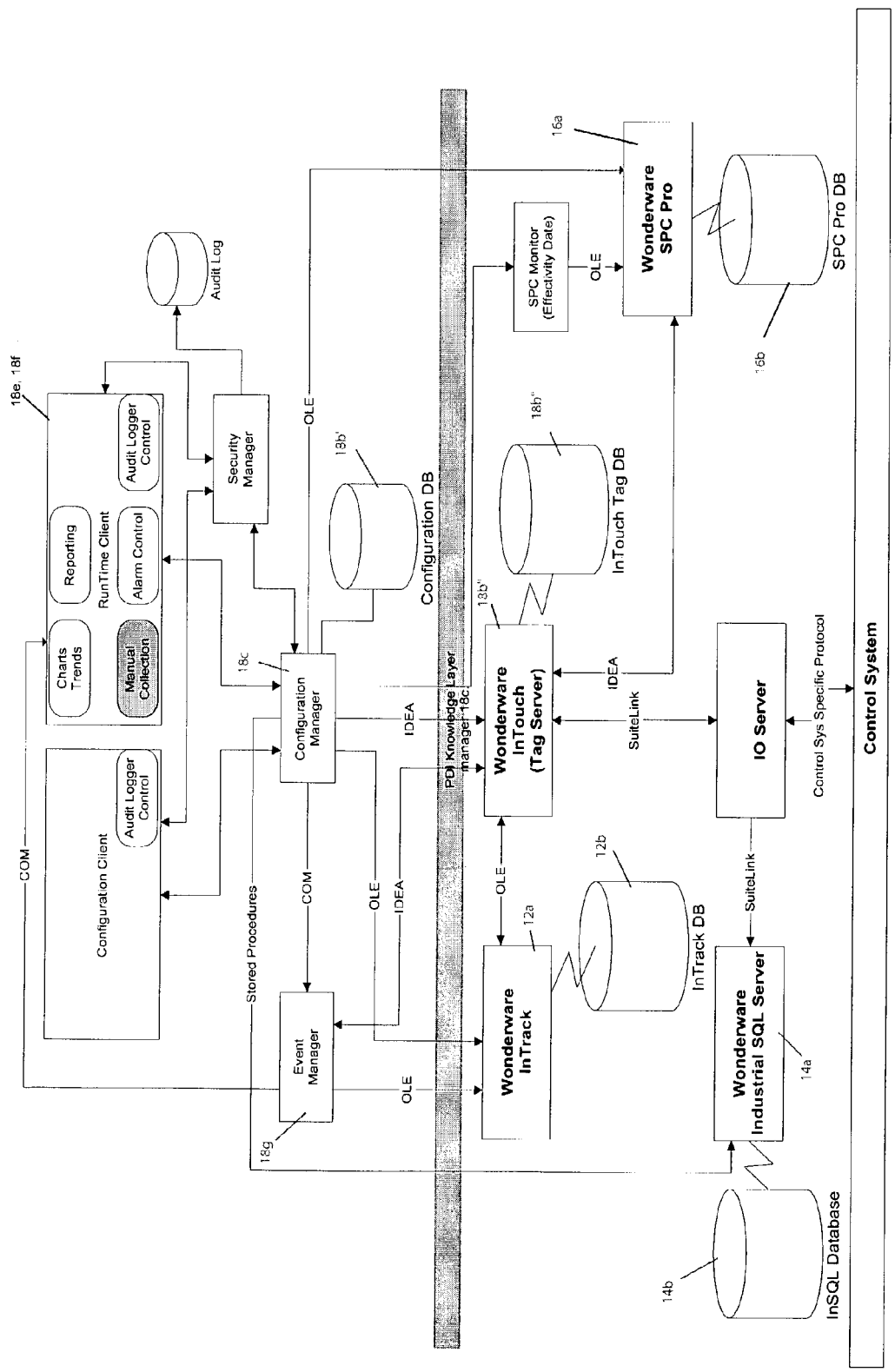
Figure 2:
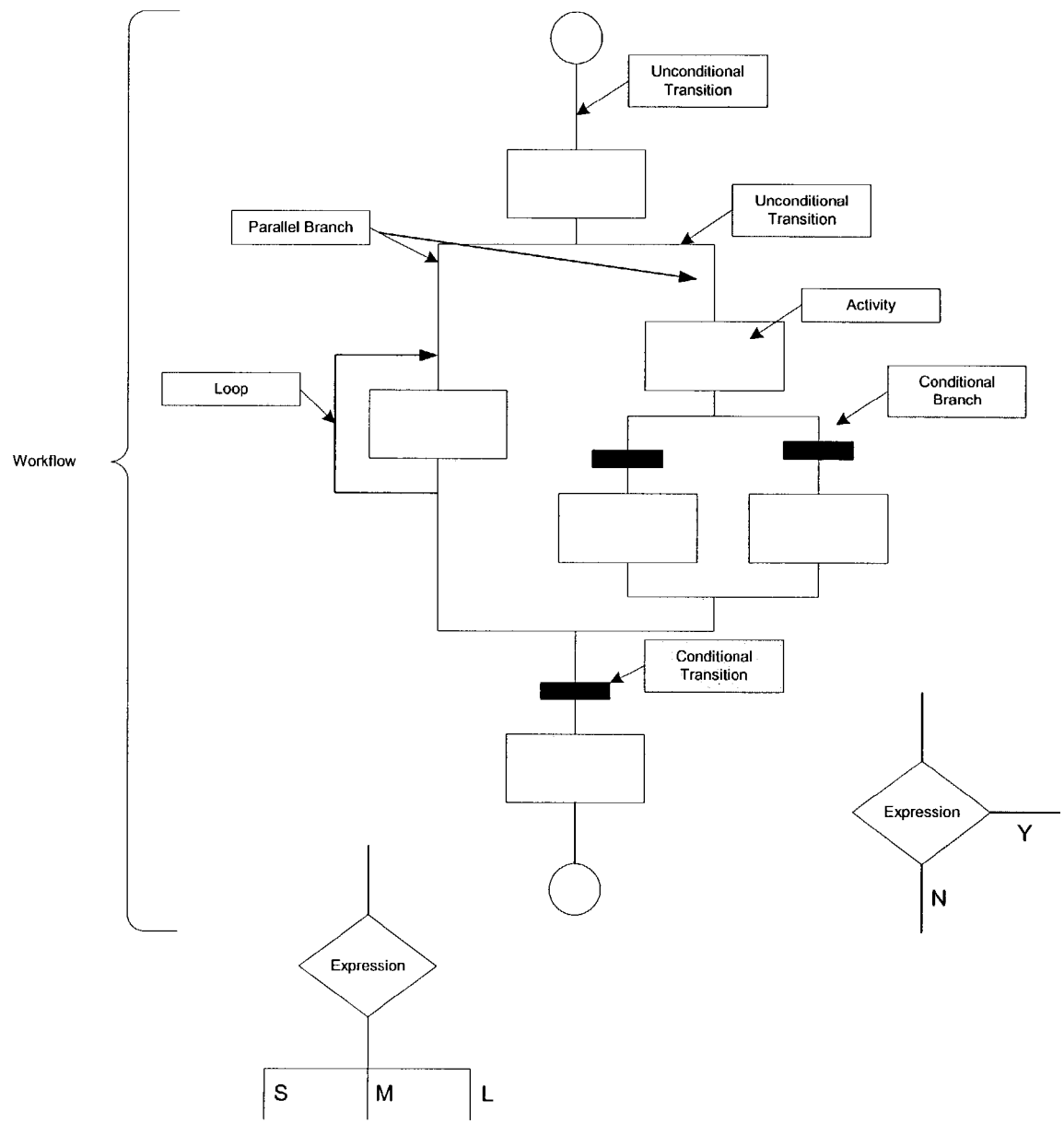
FIG. 2 depicts a graphical workflow of the type that is created, edited and processed in a system according to one practice of the invention.

FIG. 1C depicts an architecture of the system 10 according to one practice of the invention. To facilitate review of the drawing, like element designations are used in FIGS. 1A–1C to indicate like components. A client application further to those described above as element 12–16 is identified by the designations 16a, 16b, reflecting the utility of the system 10 with a variety of applications. Here, that application is a statistical process control package, SPC Pro, available from the assignee hereof, though, it will be appreciated that other applications, regardless of whether for statistical process control, can be used in addition or instead. Process or other control equipment with which the applications 12–16 is designated as "Control System" in the drawing.

Communications between the elements and components of FIG. 1C may be effected in an conventional manner known in the art, including, but not limited to ActiveX, Microsoft™ COM (component object model), COM+, DCOM, OLE, JAVA, OpenDOC, Netscape LiveConnect. In the embodiment represented in FIG. 1C, specific such communications mechanisms are identified in the lines connecting several of the elements and components. Thus, for example, COM is used for communications between the event manager 18a and the runtime clients 18e, 18f, as well as between the event manager 18a and a configuration manager 18g. OLE is used, by way of further example, between the inTrack application 12a and each of the configuration manager 18g and the event manager 18a.

In the illustrated embodiment, further communications mechanisms are used as well. Thus, a communications protocol and, more particularly, and applications program interface (API) defined under the inTouch External Database Access (IDEA) software package commercially available from the assignee, is used to support communications with the inTouch application (which as noted above serves, e.g., as the tag database 18b" server). Any other mechanism, commercially available, proprietary or otherwise, supporting such access and, more generally, providing communications coupling among and between the elements may be used in addition or instead.

Likewise, the protocol (and API) known as SuiteLink™ available in input/output servers commercially available from the assignee is used to support communications between applications available from the assignee (e.g., inTouch, inSQL, and inTrack) and the devices of the control system. Those servers are identified collectively in the drawing as an "IO Server." Again, any other mechanism, commercially available, proprietary or otherwise, server-based or otherwise, supporting such access and, more generally, providing communications coupling with the control system may be used in addition or instead. These same or other communications mechanisms can also be used to provide communications coupling between the control system and the real time clients 18e, 18f.

Production Engine

Overview

The production engine 18 includes two components, a configuration client and an interpreter, to enable the user to enter data into a single point. The configuration client, which comprises the configuration database 18b and editor 18c, allows the user to configure a process data item (PDI). Each such data item represents a tag and particularly, in the illustrated embodiment, a tag from the InTouch application, e.g., 12. The data item may also represent a tag from the InSQL application if any of the historization attributes are selected. Of course, those skilled in the art will appreciate that the data items may represent tags from other application instead or in addition. Once the tag is configured and saved, the aforementioned interpreter is executed which transfers the appropriate attributes to the InTouch tag database 12b and InSQL database 14b.

The configuration client permits security groups, users and associated passwords to be created. Once the user information is saved, execution of the interpreter transfers the security information to the InTrack application 12.

The configuration client provides a mechanism for defining an object called a collection plan. The basis of the collection plan is a data collection from one of the applications 12–16, here, the InTrack application 12. When the user saves the collection plan and runs the interpreter, an automation server is used to create the data collection. Machine and location attributes are available on a collection plan and other objects within production engine. If these attributes are specified they are created within the underlying application, here, InTrack, after running the interpreter. The following default items are created in that application from the interpreter: Default machine types PE Machine and PE Line.

In a typical implementation of one of the applications 12–16 (and particularly, for example, the InTrack application 12), a client application is developed for a shop floor operator. The client application varies but characteristically takes input from the user or gathers information from a control system. These values are used in calls to the automation server or any automation server of another application. The production engine utilizes a set of predetermined actions that encapsulate some of the common transactions. The user operates the configuration client (e.g., database 18b and editor 18c) to create instances of these actions to map control system values via PDIs to the action's parameters. Execution of the actions as part of a workflow replaces the capability provided by the custom scripting or custom applications.

A client of the production engine provides on-demand graphical reports and basic input mechanisms. The client can contain a screen to allow user input into collection plans. Collection plans can be executed on demand or appear to the user by request of engine. A series of reports are also available via buttons on the screen.

Extended Actions

To understand how automation of manufacturing processes involving the interaction of people, equipment, applications, time and external hardware events is facilitated by the production engine 18, it will be appreciated that actions used in the production engine can literally be calls to a limitless range of software. Tasks required of the applications 12–16 are wrapped in COM wrappers, which conforms to a defined interface. The simple COM wrapper conforming to a pre-defined interface enables the configuration client to detect the wrapper's presence on the machine. Once detected the user can create instances of that action for execution in a workflow. The fact that the user can map the new action's parameters to workflow context variables or control system I/O points (PDIs) facilitates interaction of production engine actions and applications 12–16.

For example, to execute actions of a new application, the programmer can wrap that application's APIs in a component with the extended action interface. Once selected from the configuration client and configured, interpreted, and also installed on the application server, it is available for execution by the engine and thus can utilize information from previous actions via parameters the same way internal production engine actions use the variables.

This ability to add programmatic interaction between any application 12–16 (or external software or hardware) relies on use of one of two interface methods:

GetArguments([out] BSTR InputArgsXmlSpec, [out] BSTR OutputArgsXmlSpec)

GetArguments( . . . ) is a method that, when implemented by the action provider, provides an XML string that contain elements with a name attribute (the name of the argument), a data-type attribute (MSXML data types) and a value for the element (which is set to an unused value in this situation). One of these strings defines the necessary input argument list while the other describes the output argument list, which will be generated. These arguments define the argument lists of the Execute( . . . ) method.

Execute([in] BSTR InputArgsXmlCollection, [out] BSTR OutputArgsXmlCollection)

The Execute( . . . ) method requires two parameters: the input argument list and the output argument list. These argument lists are XML strings as described above and contain the values appropriate for the method call and the return from the method call, respectively.

The workflow editor 18c' allows greater control of task definition and interaction. If operator input is required for an action, a prompt message can be added into the workflow and automatically sent to the designated operator to retrieve the input. Once the operator enters the input it is returned to the engine. That information is available for use in subsequent actions of the same workflow via workflow context variables.

Instances of actions created in the production engine's configuration client, which use PDIs as parameters, implement the interaction with the control system. Through the use of workflow variables described previously, it allows the activities of the equipment to be intertwined with the activities of the user.

The production engine 18 provides a user interface that allows the operator to select a particular instance of a workflow and visually see the action currently being performed. It also gives information about the status of the workflow. The operator has the option to do such things as:

Enable or disable a workflow—allows the workflow to be removed from the runtime system if disabled or added to the runtime system when enabled.

Pause/continue the workflow—if a workflow is running the operator can choose to pause after the completion of the current action.

A further understanding of the relationship between control applications 12–16 and workflow extended actions may be attained by reference to the following discussion of the automated generation of an extended action for e-mailing. Sample code is provided within comments in each of the methods shown.

In the discussion that follows, "activity" refers to an atomic unit of work. An activity is the smallest unit of work in a workflow that can exist either alone or in combination. For our purposes the combination of activities creates a workflow. This single unit of work is referred to elsewhere herein as an "action". "Extended Action" refers to a component, conforming to an aforementioned COM interface containing one or more activities. These activities are displayed in the Workflow Editor for use in a workflow.

Figure 24:
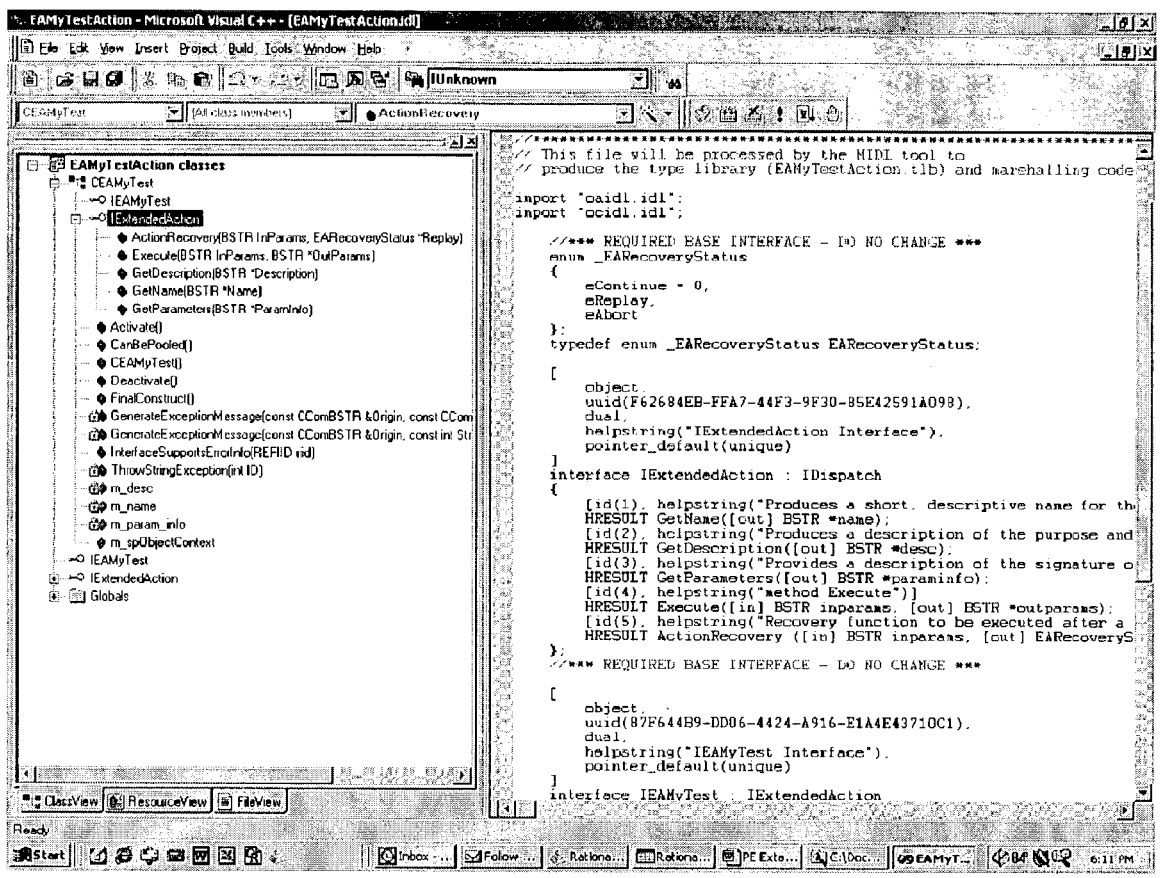
FIG. 24 depicts a relationship between workflow elements and extended actions in a system according to one practice of the invention.

After an interface is named and specific actions associated with it are identified, a class is created. The newly created class can be opened in an applications development tool (here, Visual Studio C++) and the interface (here, IExtendedAction) expanded, as presented, by way of non-limiting example, in FIG. 24.

The sample code shows parameters being created for sending an Email:

```
ImsUtil::IEAParametersPtr eaparams;
hr = eaparams.CreateInstance (__uuidof(ImsUtil::EAParameters));
if (SUCCEEDED(hr))
{
// the exception handling is new. Errors must be propagated to the
engine in a particular format.
// It is YOUR responsibility to provide proper error messages for workflow
debugging.
BEGIN_EXCEPTION_HANDLER( )
// Add a parameter by specifying it's name, type, direction, presence,
            description and a default value
            // this first parameter is the NEW map parameter type
            eaparams->InsertCollection(L"ToList", ImsUtil::eIn, ImsUtil::eRequired,
            L"Recipient list", 0);
            eaparams->Insert(L"From", ImsUtil::eString, ImsUtil::eIn, ImsUtil::
            eRequired, L"Sender", L"");
            eaparams->Insert(L"Subject", ImsUtil::eString, ImsUtil::eIn, ImsUtil::
            eRequired, L"Message Subject", L"");
            eaparams->Insert(L"Message", ImsUtil::eString, ImsUtil::eIn, ImsUtil::
            eOptional, L"Message", L"");
            eaparams->Insert(L"Status", ImsUtil::eString, ImsUtil::eOut, ImsUtil::
            eOptional, L"Message sent status", L"");
            // again this is the end of the error handler for this section of code
            END_EXCEPTION_HANDLER(EXCEPTION_COM, 1009, L"Error
            inserting parameters into EAParameters component.")
            // Place this xml definition of the parameters to the Execute method in the
            return BSTR* parameter
            BEGIN_EXCEPTION_HANDLER( )
                eaparams->PersistToXML(ParamInfo);
            END_EXCEPTION_HANDLER(EXCEPTION_COM, 1003, L"Error de-
            materializing parameters from EAParameters component.")
            }
                else
                    THROW_EXCEPTION(EXCEPTION_COM, 1004,
                    L"Error creating instance of EAParameters component.")
                END_EXCEPTION_HANDLER(EXCEPTION_COM, 1004, L"Error
            creating instance of EAParameters component.")
    Each of the parameters (input and output) can be decoded from the converted XML
string:
            // declare autoptrs to the input and output parameter containers
            ImsUtil::IEAParametersPtr inparams;
            ImsUtil::IEAParametersPtr outparams;
            // declare return values for CreateInstance
            HRESULT inphr;
            HRESULT outhr;
            // declare a CComVariant to hold the value of a parameter
            CComVariant v;
            // Create parameter container objects
            inphr = inparams.CreateInstance (__uuidof(ImsUtil::EAParameters));
            outhr = outparams.CreateInstance (__uuidof(ImsUtil::EAParameters));
                // New error handling
                    BEGIN_EXCEPTION_HANDLER( )
                        if (SUCCEEDED(inphr) && SUCCEEDED(outhr))
                        {
                                BEGIN_EXCEPTION_HANDLER( )
                    // Load the inparams container from the input parameters BSTR
                        passed to Execute
                                inparams->InsertFromXML(InParams);
                                END_EXCEPTION_HANDLER
```

-continued

```
                (EXCEPTION_COM, 1005,
L"Error materializing EAParameters component from input parameters.")
            //*++++++++++++++++++++++++++++++++++++++++++++++
              ++++++++++++++++++
            //      USED FOR EMAIL EXTENDED
            ACTION SAMPLE
            //
            //      The following code shows how to use the
                    InParams and OutParams in the
            //      execution of an Extended Action. Modify
                    to fit your parameter requirements.
            BEGIN_EXCEPTION_HANDLER( )
                //Create the Message to send
                CDO::IMessagePtr iMsg(__uuidof(CDO::Message));
    // Next Load the Flds object with the values of the parameters in
      inparams
                BEGIN_EXCEPTION_HANDLER( )
                    std::wostringstream oss;
                    int     numitems = 0;
                    BSTR    name = 0;
                    ImsUtil::DataType dt;
                    CDO::FieldsPtr Flds;
        Flds = iMsg->Fields;
                    BEGIN_EXCEPTION_HANDLER( )
                        if (inparams->Find(L"ToList", &v))
                        {
                            ImsUtil::IEAMapParameterPtr tolist;
                            if (SUCCEEDED(tolist.CreateInstance
                                (__
uuidof(ImsUtil::EAMapParameter))))
                            {
                                v.ChangeType(VT_BSTR);
                                // add the elements of the to list
                                to the xml string
                              holding the recipients
                        tolist->InsertFromXML(v.bstrVal);
                        while (tolist->FindByIndex(numitems++, &name,
                            &dt, &v))
                        {
                            v.ChangeType(VT_BSTR);
                            if (numitems > 1)
                                oss << L";" << std::endl;
                            oss << v.bstrVal << std::endl;
                        }
                        if (name)
                            ::SysFreeString(name);
                    }
                    else
                        throw ExceptionMessage(o, EXCEPTION_
                            COM, 1008, L"Error creating
                            instance of EAMapParameter
                            component.");
                }
            END_EXCEPTION_HANDLER(EXCEPTION_COM, 1008,
                                        L"Error creating instance
                                        of EAMapParameter
                                        component.")
    // assign the xml string to the map parameter field
    Flds->Item[cdoTo]->Value = CComVariant(oss.str( ).c_str( ));
            if (inparams->Find(L"From", &v))
                Flds->Item[cdoFrom]->Value = v;
            if (inparams->Find(L"Subject", &v))
                Flds->Item[cdoSubject]->Value = v;
            else
                Flds->Item[cdoSubject]->Value = __variant_t(L"");
            oss.str(L"");
            numitems = 0;
            if (inparams->Find(L"Message", &v))
            {
                v.ChangeType(VT_BSTR);
                oss << v.bstrVal << std::endl;
            }
            BEGIN_EXCEPTION_HANDLER( )
                if (inparams->Find(L"MsgList", &v))
                {
                    ImsUtil::IEAMapParameterPtr msglist;
                    if (SUCCEEDED(msglist.CreateInstance (__
                        uuidof(ImsUtil::EAMapParameter))))
                    {
```

-continued

```
            v.ChangeType(VT_BSTR);
            msglist->InsertFromXML(v.bstrVal);
            while (msglist->FindByIndex(numitems++, &name,
                            &dt, &v))
            {
                v.ChangeType(VT_BSTR);
                oss << (wchar_t*)name << L":
                " << v.bstrVal <<
                        std::endl;
            }
            if (name)
                    ::SysFreeString(name);
        }
        else
                throw ExceptionMessage(o, EXCEPTION_
                        COM, 1008, L"Error creating instance of
                        EAMapParameter component.");
    }
    END_EXCEPTION_HANDLER(EXCEPTION_COM, 1008,
                                    L"Error creating instance
                                    of EAMapParameter
                                    component.")
    Flds->Item[cdoTextDescription]->Value =
                                    CComVariant(oss.str( ).
                                    c_str( ));
    Flds->Update( );
        END_EXCEPTION_HANDLER(EXCEPTION_EXT_ERROR,
                                    1010, L"Error configuring
                                    email message.")
    // send the email message
    iMsg->Send( );
        END_EXCEPTION_HANDLER(EXCEPTION_EXT_ERROR,
                                    1011, L"Error sending email
                                    message.")
        BEGIN_EXCEPTION_HANDLER( )
    //Add the only output parameter, Status, to the outparams container
            outparams->Insert(L"Status", ImsUtil::eString, ImsUtil::eOut,
ImsUtil::eOptional, L"Message sent status", L"Message Sent!");
            END_EXCEPTION_HANDLER(EXCEPTION_COM, 1012,
                                    L"Error inserting output
                                    parameters into EAParameters
                                    component.")
            //++++++++++++++++++++++++++++++++++++++++++++++++++
            +++++++++++++++++++++++*/
            BEGIN_EXCEPTION_HANDLER( )
    // Serialize the output parameter containter into the return BSTR*
            parameter
                    outparams->PersistToXML(OutParams);
            END_EXCEPTION_HANDLER(EXCEPTION_COM, 1006,
                                    L"Error de-materializing
                                    output parameters from
                                    EAParameters component.")
    }
    else
        throw ExceptionMessage(o, EXCEPTION_COM, 1007, L"Error
                                    creating instance of EAParameters
                                    component.");
    END_EXCEPTION_HANDLER(EXCEPTION_COM, 1007, L"Error
                                    creating instance of
                                    EAParameters component.")
```

A new extended action component created in this way can be registered with the digital data processor that executes the production engine 18 and can be used in the workflow editor 18c' as described above and elsewhere herein.

Production Engine System Structure

The illustrated system 10 and, particularly, for example, the production engine 18, can be implemented in three nodes: database server, application server and client node. The configuration client (e.g., database 18b and editor 18c) may be installed on anyone of these nodes. The database server and application server can physically reside on the same server, though, this may present resource contention issues. In the illustrated embodiment, each node utilizes Microsoft Message Queue (MSMQ) to communicate events and responses.

The following is a list of components used in the illustrated embodiment on each node and a brief description of their function:

Database Server

Scheduled Event Module (ScheduledEventsXP.dll)—used for communicating time based events to the event manager service 18a

SQL Stored Procedures for configuration client, cdac, import/export, interpreter, event manager service, security service, display manager, and runtime client.

Configuration database 18*b*'for configuration data
Production Support database 18*b''* for runtime data
Application Server
Event Manager Service—Event engine for workflow execution.
Security Manager Service—Validates all user logins
Application Server Message Queue Monitor Service—mechanism for monitoring and detecting issues with message queue, which are undetected by message queue.
GEO—publicly available from Shawn A. VanNess, at xonix@mindspring.com, for evaluation of expressions. Other expression evaluation software (proprietary or otherwise) may be used instead or in addition.
DssManager Application—Makes updates to InTrack based on a response or message time out from the runtime client
Abstraction Client—Toolkit for accessing InTouch tags
Runtime Client Node
Active Client ActiveX Control—Mechanism to edit collection plan actions and to query data collection information within InTrack
Queue Arrived ActiveX Control—monitors client's personal message queue. The control monitors for a message from event manager 18*a* indicating that a new message is on a runtime client common queue that it is interested in seeing.
Configuration Client Node
Workflow Editor—graphical modeling of the workflow
Configuration Client Executable
Interpreter—transfer data amongst InTrack, InTouch, InSQL, production engine support database and Config database
Import utility—import comma separated file containing Config database
Export Utility—export a comma separated file with Standard Message Structure In the illustrated embodiment, messages sent are sent to and from the production engine 18 and, more particularly, the event manager 18*a* via the Microsoft Message Queue, though other messaging systems may be used in addition or instead. The message fields may change content according to the intended message queue. The current message structure for communication trigger messages is as follows, though other message structures can be used instead or in addition.

Label—Trigger Name
AppSpecific—Message Type as described below:

```
typedef enum_cmdMsgType
{
    // EventMgr & RTC MSG Types
    mtNotify = 0,
    mtCollectionPlan,
    mtProductionEvent,
    mtTrigger,
    mtExpressionResult,
    // EventMgr Admin MSG Types
    mtShutdown = 50,
    mtTraceLevel,
    // Product Restart MSG Types
    mtStartAll = 100,
    mtStopAll,
    mtStartComplete,
    mtStartError,
    mtStopComplete,
    mtStopError,
    mtUpdateStatus,
    mtSPCProductRestart,
    mtSPCProductChangeOver,
    mtError,
    mtSystemMonitorMsg = 500
} eCmdMsgType;
```

Body—Workflow Context Variables—These variables are stored as an XML message of name value pairs.

The parts of the message described above (Label, AppSpecific, Body) are the actual names of the parts of Microsoft's Message object.

Message to the runtime clients having the following format:

AppSpecific—Message Type as described below:

```
typedef enum_cmdMsgType
{
    // EventMgr & RTC MSG Types
    mtNotify = 0,
    mtCollectionPlan,
    mtProductionEvent,
    mtTrigger,
    mtExpressionResult,
    mtUIMessage,
    // EventMgr Admin MSG Types
    mtShutdown = 50,
    mtTraceLevel,
    // Product Restart MSG Types
    mtStartAll = 100,
    mtStopAll,
    mtStartComplete,
    mtStartError,
    mtStopComplete,
    mtStopError,
    mtUpdateStatus,
    mtSPCProductRestart,
    mtSPCProductChangeOver,
    mtError,
    mtSystemMonitorMsg = 500
} eCmdMsgType;
```

Label—A bitwise representation of workstations. Bit position 1 indicates that workstation #1 can receive the queue message, Bit position 2 incidates that #2 can receive the queue message. This mechanism allows a single message to be sent to a workstation group and have only one workstation actually respond to the message.

Body-Workflow Context Variables—These variables are stored as an XML message of name value pairs.

IMS Message Toolkit

The XML messages used in production engine 18 and, more particularly, the event manager 18*a* of the illustrated embodiment all have a common piece—a name and value. A series of class structures is available for use by other C++ components. This class structure not only exposes the methods required to traverse and extract the pieces of information but also the ability to persist them to a database for backup.

```
interface IIMSKeyValueMap : IDispatch
{
    [id(1), helpstring("Add key/value pair to map container.")]
    HRESULT Insert([in] BSTR keyname, [in] VARIANT value);
    [id(2), helpstring("Find value of given key in map container.")]
    HRESULT Find([in] BSTR keyname, [out] VARIANT *value, [out, retval]
    BOOL *found);
    [id(3), helpstring("Find value of given index in map container.")]
    HRESULT FindByIndex([in] unsigned int index, [out] BSTR *keyname, [out]
    VARIANT *value, [out, retval] BOOL *found);
    [id(4), helpstring("Count of the number of key/value pairs in the map container")]
    HRESULT Count([out, retval] unsigned int *count);
    [id(5), helpstring("Erase key/value pair associated with key from the map
    container.")]
    HRESULT Erase([in] BSTR keyname, [out, retval] BOOL *found);
    [id(6), helpstring("Clear all key/value pairs from the map container.")]
    HRESULT Clear([out, retval] unsigned int *count);
    [id(7), helpstring("Stream the map contents to XML.")]
    HRESULT PersistToXML([out] BSTR *xml);
    [id(8), helpstring("Write the contents to a table in the DB with the key and
    value as separate columns.")]
    HRESULT PersistToDB([in] BSTR connectionstring, [in] BSTR tablename,
    [in] BSTR keycolumn, [in] BSTR valuecolumn);
    [id(9), helpstring("Insert the key/value pairs from XML into the map container.")]
    HRESULT InsertFromXML([in] BSTR xml);
    [id(10), helpstring("Insert the key/value pairs read from the DB into the map
    container.")]
    HRESULT InsertFromDB([in] BSTR connectionstring, [in] BSTR tablename,
    [in] BSTR keycolumn, [in] BSTR valuecolumn);
    [propget, id(11), helpstring("Stream the map contents to XML")]
    HRESULT XML([out, retval] BSTR *pVal);
    [propput, id(11), helpstring("Insert the key/value pairs from XML into the
    map container.")]
    HRESULT XML([in] BSTR newVal);
};
```

IMS Trigger Toolkit

Applications 12–16 transmit trigger and context information to the production engine and, more particularly, the event manager 18a via a workflow activation message component. In the illustrated embodiment, this activation component has a single method as defined below:

```
interface IWFActivationMsg : IDispatch
{
    [id(1), helpstring("Fire a trigger in Production Engine that will start a
    workflow using the context provided.")]
    HRESULT FireTrigger([in] BSTR TriggerName, [in] IDispatch
    *Context, [out] BSTR *StatusMsg, [out, retval] VARIANT_BOOL
    *Status);
};
```

Database Servers

In the illustrated embodiment, the configuration database 18b' contains all data required for the workflow editor, interpreter, configuration client, production engine. Likewise, the production support database 18b" contains all data required for the production engine and runtime clients. Additional tables added to this schema include:

AppserverConfiguration—Contains message queue path names for all single occurrence queues such as: the message queue server (node where the message queues for the engine were selected to reside), Common client queue, expression evaluation queue, event manager administration queue, scheduled events queue.

GenSampleID—table used to provide unique sample ids for data collection.

Local Queue Info—Contains the message queue path name for each node, node types and computer names for all the nodes in the system InWorkStored—table used by runtime clients to persist collection plan updates (a user can return to their data collection at a later time).

Monitors—a list of the monitoring applications installed on the node type.

Scheduled Event Module (ScheduledEventsXP)

In the illustrated embodiment, this is an extended stored procedure dll containing calls to the Microsoft Message Queue api to place a message onto the private em_schedule_q message queue. The dll accepts a trigger name from a stored procedure. The trigger name is placed in the label of the message.

Interaction with Other Components

Event Manager 18a: The event manager service reads trigger information from the production support database 18b". Triggers have the option to be scheduled. When a trigger is scheduled for a particular time or time interval, event manager uses the SQL demonstration application to create jobs in SQL Server. Each job is created to call the extended stored procedure with the appropriate trigger name. Event manager uses SQL Server's scheduler event mechanism to fire these trigger events.

An Event manager thread constantly monitors the em_schedule_q for trigger messages from the database server.

Application Server Detail

Security Manager Service

In the illustrated embodiment, the Security Manager is a Windows DCOM server service used for security checks of Production Engine clients. The users and their access rights are defined in the Configuration Client database 18b.

There are two different interfaces for the Security Manager. The ISecurityConfig interface is for accessing configuration data and the ISecurityRuntime interface is for accessing runtime or production data. The Logon method is used to validate and provide access to the user in the respective mode (config or runtime or both). A zero result from the logon method means that there was an error, otherwise a handle is returned that is used to grant/deny access. The RequestAccess method is called with the returned handle and the requested access (ConfigRead=1, ConfigReadWrite=2, ManualDataCollection=4, ManualDataSupercede=8, Production Actions=16). The return value of the RequestAccess function is True for access granted and False for access denied. To log off the user, the Logoff method is called.

The clients of the security manager service are the runtime clients 18e, 18f and configuration client (e.g., database 18b and editor 18c).

Event Manager Structure

In the illustrated embodiment, the event manager 18a functionality is separated into eight different categories: startup, shutdown, abstraction client call-back, scheduled event monitoring, action event monitoring, administration event monitoring, client response monitoring, and expression evaluation monitoring.

Startup

During the startup, event manager performs several operations.

Registry settings are loaded

Event Objects are created to detect proper shutdown of all event manager threads.

Local queue table is populated with the message queue path name for each node, node types and computer names for all the nodes in the system. Node names and types are stored in the configuration database.

AppServerConfig table is populated with message queue path names for all single occurrence queues such as: the message queue server (node where the message queues for the engine were selected to reside), Common client queue, expression evaluation queue, event manager administration queue, and scheduled events queue. This information is pulled from the registry on the application server.

Message queues are created for transfer of all information.

Scheduled jobs are created on the database server for each trigger requiring initiation by a timed event All Triggers, Workflows and Workflow Actions are loaded into Event Manager memory into standard template library (STL) maps. Action details are also loaded to enable quick execution of actions when an event occurs.

A connection is made to the tag server for ongoing retrieval of I/O information Four threads are spawned in event manager to monitor four separate incoming message queues.

Shutdown

An event object is created to request the four spawned threads to shutdown. Once shutdown is complete all allocated memory is deallocated.

Abstraction Client Callback

A callback method is used to receive data change and alarm events from InTouch. This call back routine first examines additional conditions (possibly expressions) to determine whether the trigger should be inhibited. If there are no additional conditions or the conditions return true then a message is placed on the em_internal_q for detection by the action event monitoring thread.

Schedule Event Monitoring

A thread is spawned in event manager to watch the schedule event queue. When a message comes in it is immediately sent to the em_internal_q (action event monitoring). This thread was created for later expansion to allow conditions to be considered before accepting the timed event.

Action Event Monitoring

A thread is spawned in event manager to respond to incoming triggers. A trigger arrives either by a data change or alarm event from InTouch or from a scheduled event. Once the thread detects a message on the em_internal_q it is examined to determine what workflow should be executed. The workflow execution is completed by calling the execute method on an actionTrigger object. The object resides in a standard template library (STL) name-value pair (name— trigger name, value—action Trigger object). Currently the actionTrigger.Execute method traverses an STL vector, containing action object instances, calling each action's execute method. Each action object is derived from a base action class allowing this traversal to occur seamlessly. The following actions are provided: stored procedures, expressions, production actions and collection plans.

Stored Procedures

Stored Procedure actions use ActiveX data objects (ADO) to pass parameters to a stored procedure for execution. If a stored procedure contains output parameters these parameters are written back out to the PDI values. This in turn writes them back to the I/O source using the abstraction client, if the PDI is not a workflow context variable.

Expressions

Expression actions use purchased source code for evaluating complex expressions. Parameters are passed to the GEO dll for evaluation. The result of the expression is written back to the PDI. Again this is written to the I/O source using the abstraction client if the PDI is not a workflow context variable.

Production Actions

Production actions are a series of transactions, here, transactions defined in the InTrack application 12a. Each action performs the operations necessary to setup the InTrack objects in order to execute the InTrack transactions of (create, start, consume, complete, close, move, and adjust). Parameters from the I/O source or workflow context variables are used to provide the necessary information to the transaction. In cases where data is returned from the transaction the I/O source or workflow context variable is stored.

Collection Plans

In the illustrated embodiment, Collection Plan actions represent an InTrack data collection action. Additional functionality on top of InTrack resides in the ability to assign an expression to a collection plan item. This is accomplished using the GEO application. The expression is evaluated (including the specified item parameters as input). The result is stored as the collection plan item specifying the expression. Another feature in the collection plans is "stored procedures in collection plans". This feature allows the user to insert one or more stored procedure calls into the collection plans. These stored procedures are executed using ADO. Each collection plan item, specified for use in the stored procedure, are loaded as parameters into the ADO object and the appropriate stored procedure is executed. All collection plan items are written to InTrack via the automation server once all items are evaluated.

Collection Plans can be automatic, partially automatic, or manual. Fully automatic collection plans are evaluated by the action execution thread and stored to InTrack. Partially automatic or manual collection plans are transmitted to the runtime client for further evaluation. These messages are placed in a message and sent via the common runtime client queue. Collection plan actions Message Action In the illustrated embodiment, all UI message actions are transmitted to the runtime client via the common runtime client queue. When a message is sent to the queue, the action thread stalls waiting for the response. Once the client response is received, the parameters of the response are written to the workflow context variables for use by other actions. A pool of threads are created which allow each workflow to execute in it's own thread.

Administration Event Monitoring

Administrative events such as responses from the runtime client are monitored through separate thread. Collection plan messages have time out conditions which require the operator to respond in a given amount of time. The types of responses from the runtime client are indications that a Client Response Monitoring Client responses are monitored within the action event monitoring. When a message is sent to the runtime client the thread will stall and wait for a client response on the client response queue.

Configuration Client Node Detail

Workflow Editor

Figure 21:
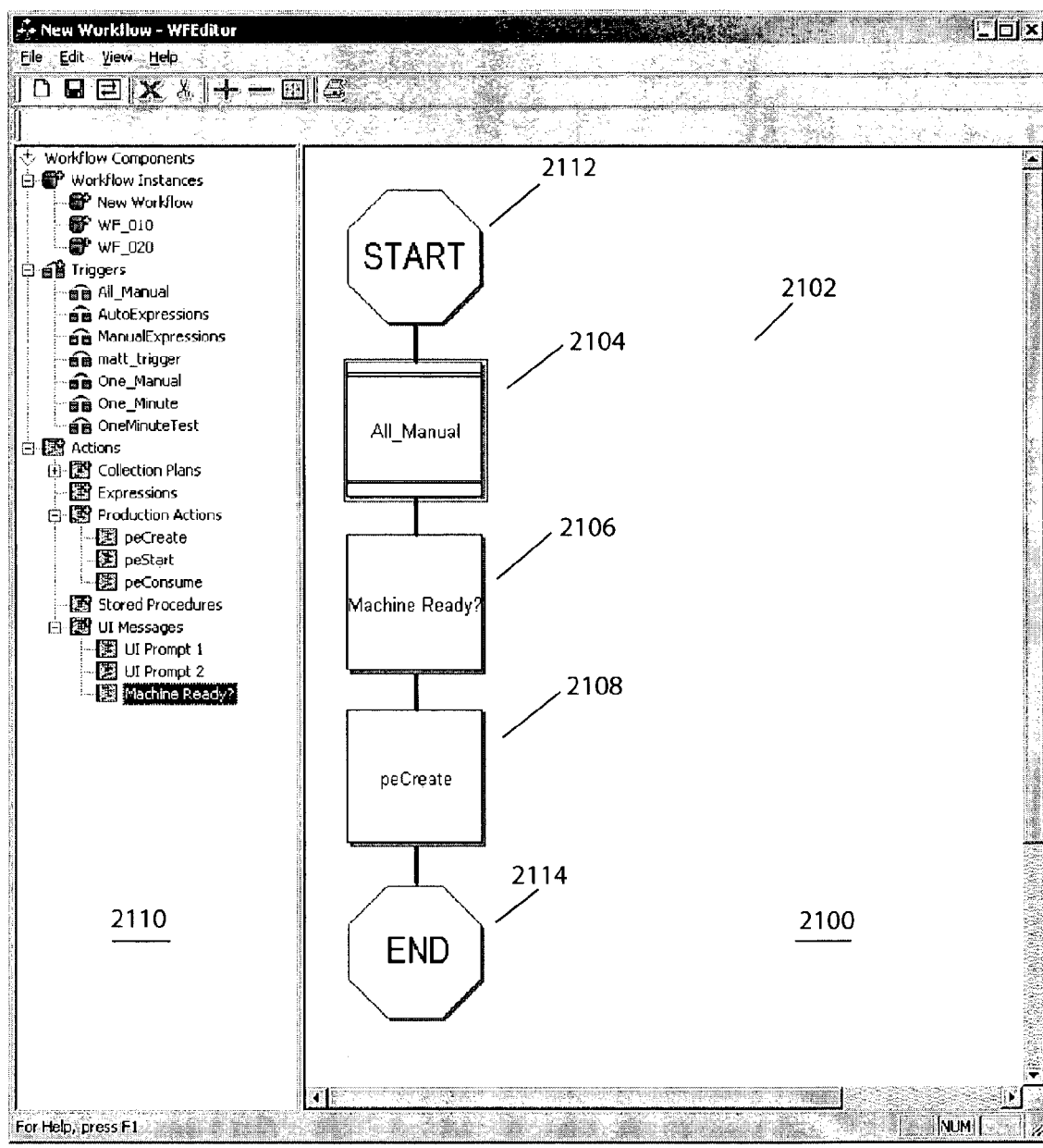
FIG. 21 depicts a graphical user interface editor display, including a sample workflow graphic, in a system according to one practice of the invention.

The workflow editor 18c' displays and builds workflows graphically, thereby permitting user-defined workflows. An exemplary editor display, including a sample workflow graphic, is presented in FIG. 21. As shown in the graphical editor pane 2100 of that display, the workflow 2102 triggers on the All_Manual trigger, as indicated by graphic 2104. When that occurs, the Machine Ready? user interface message is presented at the operator console (see graphic 2106) and, thereafter, the peCreate production action is exercised (see graphic 2108). The graphics 2104–2108 represent components of the illustrated workflow 2102 and are a subset of the available workflow components identified on the left side of the display, i.e., the workflow components pane 2110.

Workflow Components Pane 2110 presents a tree view of the various component categories that are used to build a workflow document. The category "Workflow Instances" contains the item New Workflow, as well as any other previously saved workflow instances. The New Workflow item can be dragged and dropped onto the editor pane 2100 to create the Start and Stop nodes for each workflow document. The category "Triggers" lists all available Triggers that have been configured for use in a workflow. The category "Actions" lists available Actions that have been configured for use in a workflow. In the illustration, The Actions category includes the following sub-categories: Collection Plans, Expressions, Production Events, and Stored Procedures.

The Graphical Editor Pane 2100 displays a current workflow document that is being edited or blank if it is a new document. In the illustrated embodiment, this can contain any of the following workflow nodes: Start node, which is created when a New Workflow is dragged and dropped onto the editor pane. In the illustrated embodiment, only Trigger nodes can be dropped on the Start node, though other embodiments may vary.

As evident, then, the workflow can further include a Trigger node, which is created when a Trigger node is dragged and dropped on the Start node. In the illustrated embodiment, only the one Trigger node can be added to a workflow, though other embodiments may vary. In the illustrated embodiment, if a workflow contains a Trigger node and another is dropped onto the Start node, the editor prompts the user if it should replace the existing Trigger node.

A workflow in the illustrated embodiment can further include an Action node, which is created when an Action node is dragged and dropped on the Trigger or any other Action node.

Finally, in the illustrated embodiment, a workflow can include a Stop node, which is also created when a New Workflow is dragged and dropped onto the editor pane. Like the Start node, in the illustrated embodiment, the Stop node cannot be deleted and, like the Start node, only Trigger nodes can be dropped on this node.

In order to create (or editor) a workflow, the user drags triggers onto an empty workflow which, in the first instance, is denoted by "start" and "end" graphics, 2112, 2114, respectively. In the illustrated embodiment, once that trigger is associated to a workflow it cannot be used in another workflow; other embodiments may vary in this regard. Actions, too, are dragged onto the workflow and appended into the workflow 2102 graphic. Action ordering is decided by the order in which these graphics they follow the start node. This ordering is written to the configuration database tables. After interpretation, Event Manager 18a uses the production support database 18b" to determine actual execution order of the workflow.

Though a linear workflow is shown in the drawing, as indicated by the linear arrangement of nodes and the line segments connecting them, the illustrated workflow editor allows for creation and display of decisions, transitions, conditional branches (multi-branch—3 or more choices), parallel workflows and subworkflows. Such workflows is can be represented in flowchart-like or graphical programming-like iconography. Thus, for example, decisions can be represented diamond- (or other-) shaped nodes that connect to different respective action nodes. Conditional branches can be likewise represented. Parallel workflows can be represented, for example, by two or more linear segments (each, for example, including a respective set of one or more action nodes) disposed side-by-side or otherwise. Preferably, modeling of decisions is limited to a controlled mechanism to form workflows. The editor also supports conditional branches, where the expressions are more complex and result in multiple results such as you would see in a programming case statement.

In the illustrated embodiment, underlying the workflow workspace is a hidden grid. This forces alignment of actions into grid locations to allow for a uniformed look to the workflow. The user is allowed to drop an action next to a decision to allow for connection from the main branch of the workflow. The user can connect decision actions to other actions and can supply the expected results of the decision action. The results for each branch of the decision determine the direction of the flow. The workflow editor stores the ordering of the action information along with a series of choices of next actions. In the case of actions, which are not decisions, there is only one possible next action. In the case of decision actions, there are two choices based on a result. Expression functionality executes these decisions.

Drawing and manipulation of graphical objects in the illustrated embodiment is implemented using the commercially available GO++ add-on to the Microsoft Foundation Classes (MFC), though other graphical object manipulation tools, whether or not based on MFC, may be used in addition or instead. The editor of the illustrated embodiment also uses a COM-based data access object mechanism referred to as OLEDB calls to read configuration data from the configuration database 18b', though other methods of database connectivity or access can be used. Following completion of a graphical model, the user can save that information back to the configuration database. Once the interpreter 18d is run the data is transferred to the production support database 18b'', where it is read at event manager restart to recognize the new workflows.

With further attention to details of implementation of the illustrated embodiment, the MFC Document/View Architecture is used for both the workflow components pane and the graphical editor views, as discussed below.

Workflow Components Pane

CTreeView that is used to hold information about each node the Workflow Editor supports. Each tree item has a class associated with it (Workflow, Trigger, and Action). For each of these classes a collection (C++ vector) has been defined to contain them. A WFComponents class is been defined that includes each one of these collections (Workflow, Trigger, and Action) as member variables.

Figure 22:
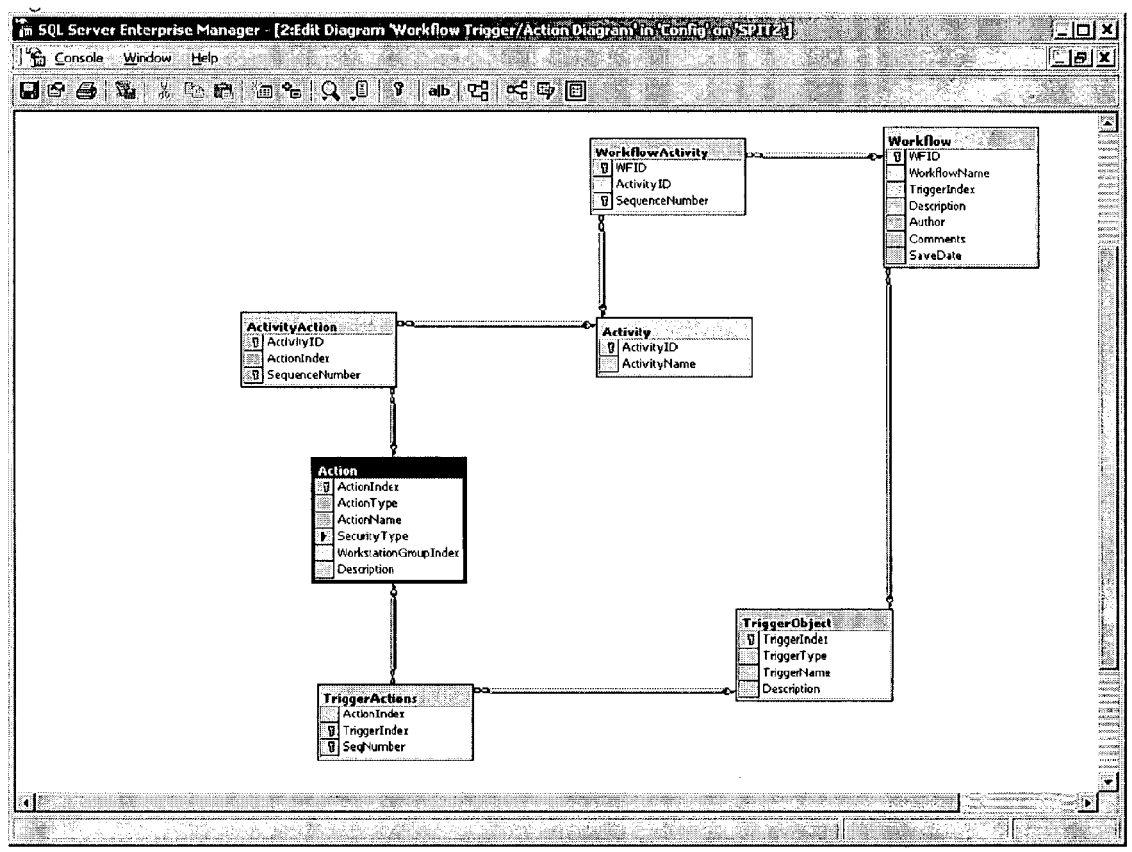
FIG. 22 depicts tables in a database supporting a class structure used in a workflow editor in a system according to one practice of the invention.

Referring to FIG. 22, only one WFComponents object is instantiated when the Workflow Editor runs. The Workflow, Trigger, and Action classes are used to instantiate objects that have their data members populated by loading from the tables defined in the MS SQL Server database.

The WFComponents data members include: Workflow, which uses a combination of tables (Workflow, WorkflowActivity, Activity, ActivityAction, Actions, TriggerActions, and TriggerObject); Trigger, which uses the TriggerObject table; and Action, which uses the Action table. The WFComponents class also includes methods that support the following (vectors refer to Workflow, Trigger, and Action collections):

Clear( )—clears all vectors

Load( )—loads all vectors with the appropriate data from the MS SQL Server database.

Reload( )—issues a Clear( ) and Load( ), described above.

SaveWorkflows( )—support for saving vector data to the MS SQL Server database.

Graphical Editor Pane

CWFEditorView derived from CGoGridView is used to support all of the graphical operations the Workflow Editor uses. The nodes that are currently supported are: WFNode, which is derived from CGoArea (GO++). Used as the base class for all Workflow Editor nodes; WFStartNode which is derived from WFNode; WFTriggerNode which is derived from WFNode; WFActionnode which is derived from WFNode; and WFStopNode which is derived from WFNode CWFEditorDoc is derived from CGoDocument and is used to support all necessary document functionality that is used for the Workflow Editor. Workflows are stored in a MS SQL Server v7.0 database. FIG. 22 shows the tables used in the database of the illustrated embodiment and the relationship between them.

Workflow Context

Workflow Context permits a set of associated events to work on a set of data that is particular to them, much like a program uses a local variable set inside a function. Using this metaphor, a workflow is like a function and the set of actions within that workflow is like the instructions within the function. Actions are permitted to operate upon the Workflow Context much like the instructions of the function operate upon the function's local variable set.

In the illustrated embodiment, every workflow maintains a Workflow Context. This context is an association of variable name with variable type/value. The Workflow Context can be initialized upon instantiation of the workflow through a Workflow Activation Message. The Workflow Activation Message contains a Workflow Context which is a proper subset of the instance of the workflow. Upon instantiation of the workflow, the Workflow Context from the Workflow Activation Message is assumed by the workflow's Workflow Context. As the workflow executes, actions within the workflow operate upon the Workflow Context by getting and/or setting the values associated with the name of the entry in the Workflow Context with which they are interested. Actions are able to increase the workflow's context by setting values that are not currently part of the Workflow Context. These entries are then available to the action from that point on as well as being accessible to subsequent actions in the workflow.

The entries within a Workflow Context are manipulated, in the illustrated embodiment, by the same subsystem that manipulates tags associated with physical I/O. This subsystem determines the type of item upon which information is requested. If it is a tag, the subsystem interfaces with the I/O subsystem. If it is part of a Workflow Context, the subsystem either gets or sets the value within the Workflow Context, as requested.

Workflow Context Variables

Figure 25:
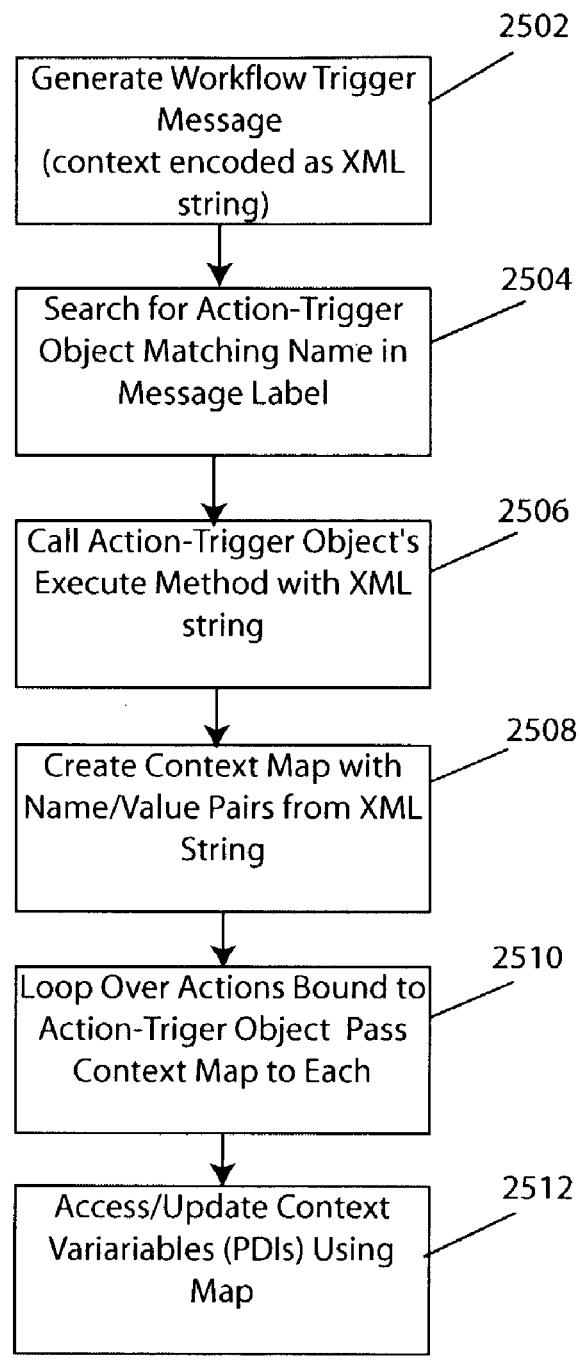
FIG. 25 is a flowchart depicting how workflow variable context is maintained in a system according to one practice of the invention.

In the illustrated embodiment, workflow variables are implemented as parameters to an event-generated trigger. The trigger is signaled via a message (with its label set to the trigger name) on Event Manager's internal queue. See FIG. 25, step 2502. This is how event-generated triggers also occur in the illustrated embodiment. The difference with a workflow trigger is that the workflow context variables are specified in the message body as an XML string representing the context in a name/value-pair collection (the workflow context).

In response to the message, the Event Manager searches for an action-trigger object (loaded by EM on startup) by the name specified in the message label. See step 2504. Once found, EM calls this action-trigger's execute method. See step 2506. The workflow context XML string is passed to this method. The action-trigger's Execute method creates a C++ standard template library (STL) map filled with the associations from the XML string passed as an argument. See step 2508. This map now has the name/value pairs collection, or workflow context, in the form of a string for the name and a CComVariant as the value for each pair.

The action-trigger, next, loops over all the actions that were bound to it, passing the workflow context map to each one. See step 2510. Each action implements an Execute method which takes a reference to this workflow context map. As described in the section that follow, all workflow variables of the illustrated embodiment are implemented in the configuration system as PDIs. These special PDIs have a prefix of wf_. As the actions execute, the CPDIRead and CPDIWrite objects are called to get or set the values of PDIs. These objects are instantiated within the action they are needed and passed a pointer to the workflow context map, which was also passed into the action. When the CPDIRead or CPDIWrite objects are asked to provide the value of a workflow variable, instead of going to the tag system, the workflow context map is accessed or modified.

As the actions are executed, the workflow context map is accessed and modified. See step 2512. The modifications are carried from action to action. In this way, subsequent actions have access to values in the workflow context map set by some previous action. Actions are configured to access either workflow context variables or PDIs. To the action, there is no difference: the CPDIRead and CPDIWrite objects handle the details. Expression evaluation actions are configured to set the value of a PDI based on the value(s) of workflow context variable(s). These actions may be configured with a mix of workflow variables and non-workflow PDIs, on the right side of the expression and either type on the left.

Workflow Variables

Figure 26:
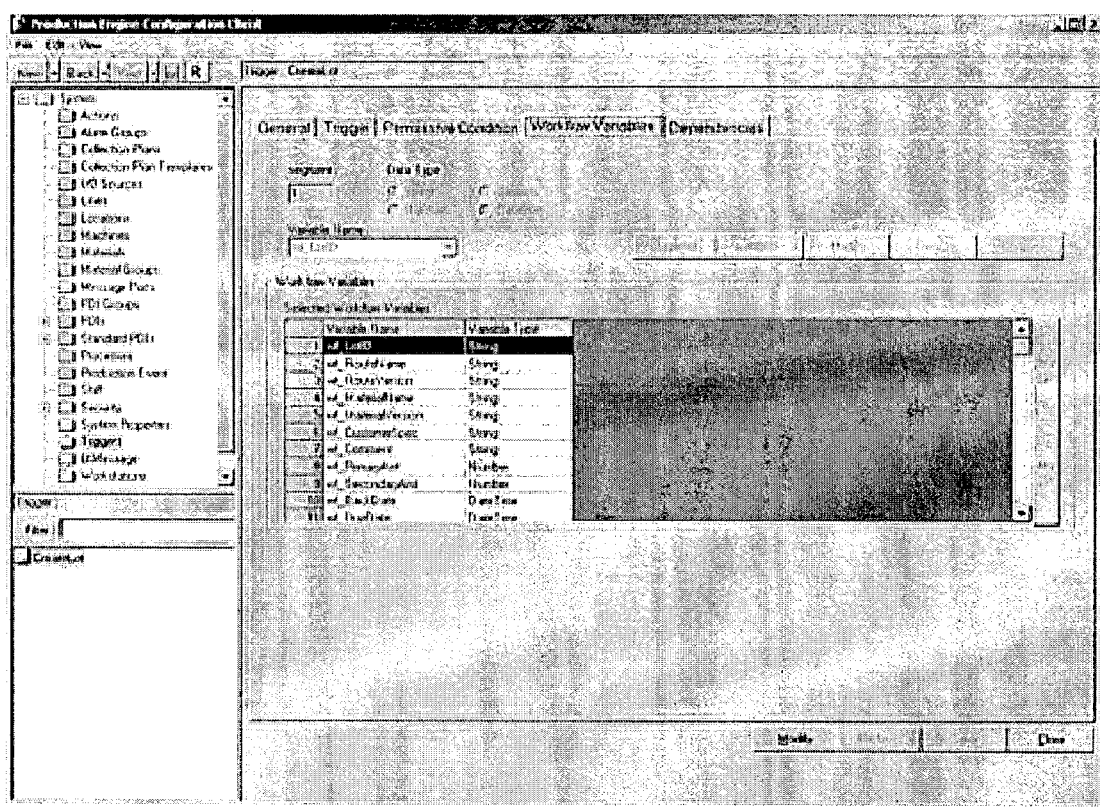
FIG. 26 depicts a graphical user interface screen used in connection with workflow variable definition in a system according to one practice of the invention.
Figure 27:
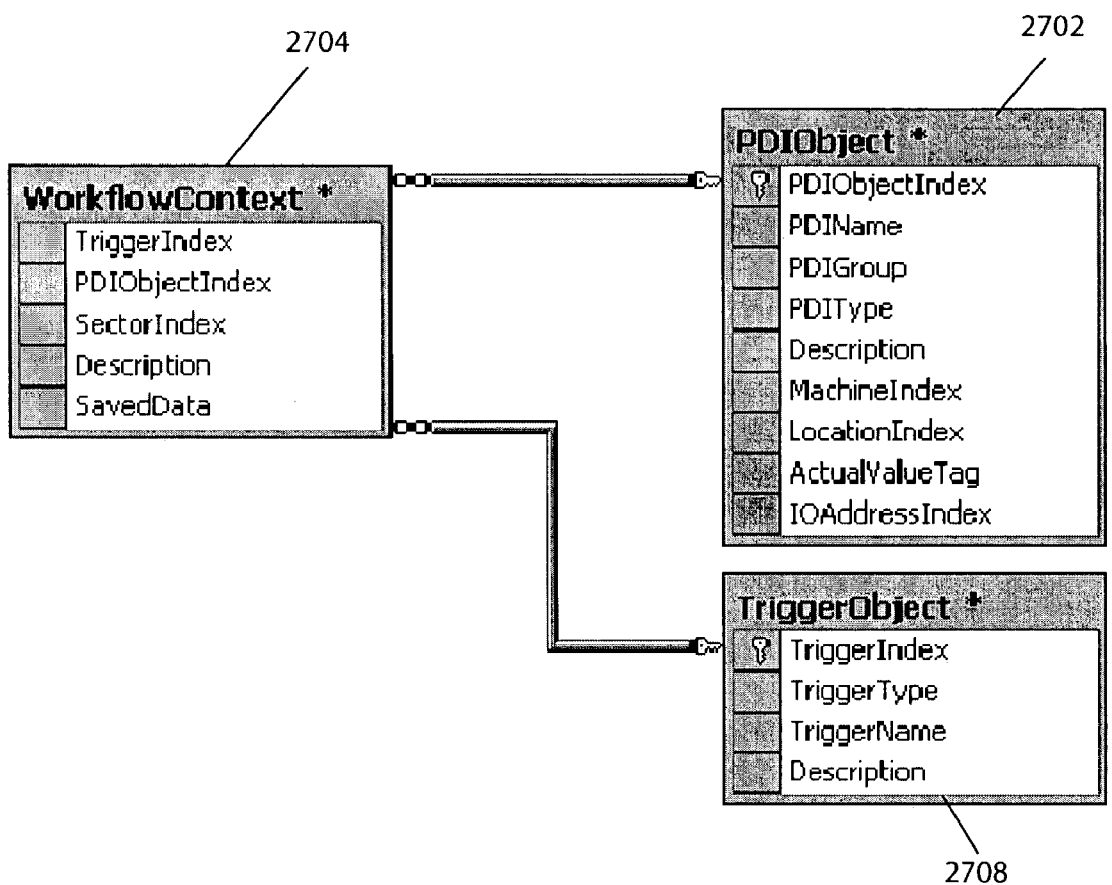
FIG. 27 depicts a relationship of tables used in support of workflow variable context persistence in a system according to one practice of the invention.

In the illustrated embodiment, workflow variables are implemented as parameters of a trigger and can be accessed via the Workflow Variables tab of the corresponding trigger object in the configuration editor 18c; see, for example, FIG. 26. Code for implementing this can be based on that used for action manipulation, e.g., the template functionality (modify, delete, insert, append), the transaction functionality (save, restore, modify) and the variable manipulation functionality (variable up/down). One difference is the addition of a separate workflow variable cache. Variables are created as a PDI, however they are not stored in the respective PDI tables. Rather, referring to FIG. 27, they are written to a PDI object table 2702. An additional table—workflow context table 2704—serves as a reference linking triggers, in the trigger object table 2706, with specific associated variables in table 2702, as shown in the drawing.

Variables are initially written to the database and stored in a temporary state until either a save is called or they are deleted (or the application is closed). This allows for restoration of a template that was changed but not saved with the trigger. The following flags are used for this function:

| Save Data Flag | Condition |
|---|---|
| 0 | Added but not saved with trigger |
| 1 | Added and saved with trigger |
| 2 | Delete but not saved |

In the illustrated embodiment, all workflow variables are created with a prefix of "wf_" and appear in all drop-down PDI selectors upon creation. After a workflow variable is created and associated with a trigger, it can be used by a different trigger but it's data type cannot be changed due to database referential integrity.

Association of WorkFlows and Order/Lot IDs

Figure 23:
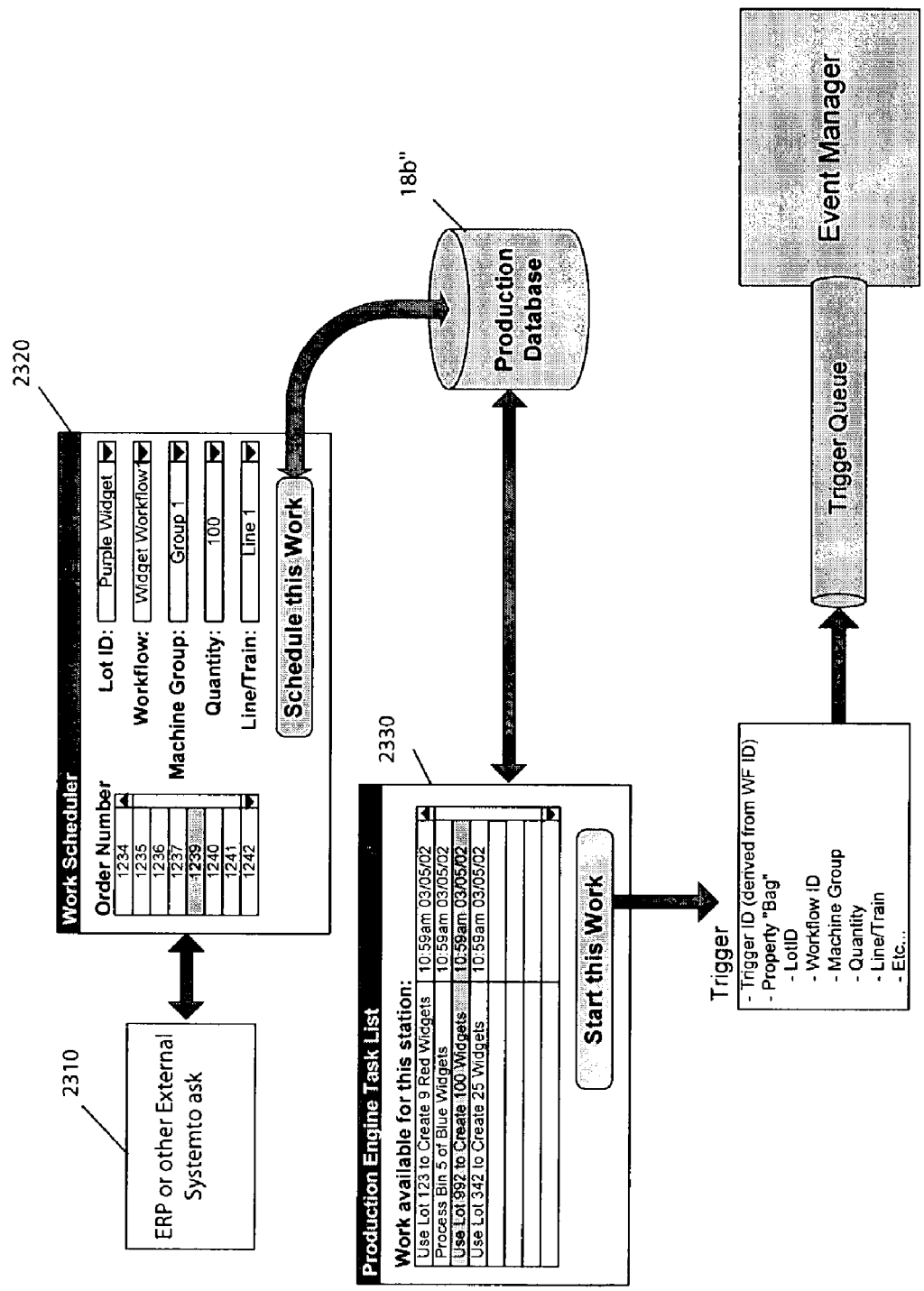
FIG. 23 illustrates how orders and lot IDs from external systems are associated with workflows created in a workflow editor in a system according to one practice of the invention.

FIG. 23 illustrates how orders and lot IDs from ERP or other external systems are associated with workflows created in the Workflow Editor. One such external system is illustrated here as element 2310; further such systems (not shown) can be provided, as well.

A work scheduler 2320 associates orders numbers from the external system 2310 with lot IDs maintained by the aforementioned InTrack application. In a particular example shown in the drawing, Order 1239 from the external system 2310 is shown associated with Lot ID "Purple Widget", Workflow "Widget Workflow", Machine Group "Group 1", Quantity "100" and Lines/Train "Line 1". Further associations, not shown in the illustration, are provided for Orders 1234–1237 and 1240–1242. The work scheduler 2320 can be an editor, e.g., with a graphical interface of the type shown in the drawing, or otherwise. It can also be a batch system, a script, a macro,, a program or otherwise that generates the indicated associations.

Regardless, a function is provided for scheduling the indicated order, here, Order 1239, through selection of the illustrated "Schedule this Work" button. Orders can, of course, be scheduled in other ways, depending on the type of work scheduler 2320 and the user interface, if any, provided thereby. When that function is exercised, the specific association is stored in a table (not shown) in the production database 18b".

Within at least selected real-time clients 18e, 18f, an ActiveX control reads "work" information directly from the aforementioned table for display to the operator via the corresponding workstation. A display of the type generated by that control is indicated by element 2330 in the drawing. Here, that display shows that, as of 10:58 AM, on Mar. 5, 2002, work available for the applicable real-time clients workstation includes "Use Lot 992 to Create 100 Widgets." Other work available for that workstation includes use of Lot 123 to create 9 red widgets, processing of Bin 5 of blue widgets, and use of Lot 342 to create 25 widgets. In alternate embodiments, interface mechanisms other than (or in addition to) ActiveX controls are used to display information from the aforementioned table to the operator. In yet still other embodiments, ActiveX controls or other interface mechanisms are used to convey information from the aforementioned table directly to control equipment (, e.g., other than operator workstations).

Regardless, a function is provided for generating a trigger, e.g., for indicating the start of the scheduled work. Here, that function is exercised by an "Start this Work" button provided on the ActiveX control. In other embodiments, the function is exercised otherwise by the user or control equipment. When the trigger is generated, the ActiveX control (or other interface) directly inserts a new trigger record into the trigger queue (see "Internal Trigger Q", FIG. 7); and other embodiments, the triggering event can be signaled otherwise (e.g., via messaging of the Event Monitoring "front and" of Event Manager 18a). The trigger contains not only a standard trigger ID, but also a collection of context information (e.g., lot ID, workflow ID, machine Group, quantity, line/train, and so forth—as indicated in the drawing) corresponding to the data in the aforementioned table of the production database 18b".

In the illustrated embodiment, the workflow schedule or 2320 is configured on a custom basis per project. The remaining functionality shown in the drawing is, across all projects and workflow implementations.

Runtime Client Node Detail

ActiveX Controls

The runtime client consists of several activeX controls added into application runtimes 12a, 14a, 16. The runtime client 18e, 18f includes activeX controls, as described below, which facilitate support communications coupling with the production engine and, more particularly, for example event manager 18a and other components of the system 10. Here, as elsewhere in the illustrated embodiment, though implemented in activeX, it will be appreciated that other programming constructs, containers and/or components (whether or not based on Microsoft™ COM (component object model)

technology or equivalents thereof, such as OLE, COM+, DCOM, JAVA, OpenDOC, Netscape LiveConnect) can be used in addition or instead.

UI Message Control

Figure 3:
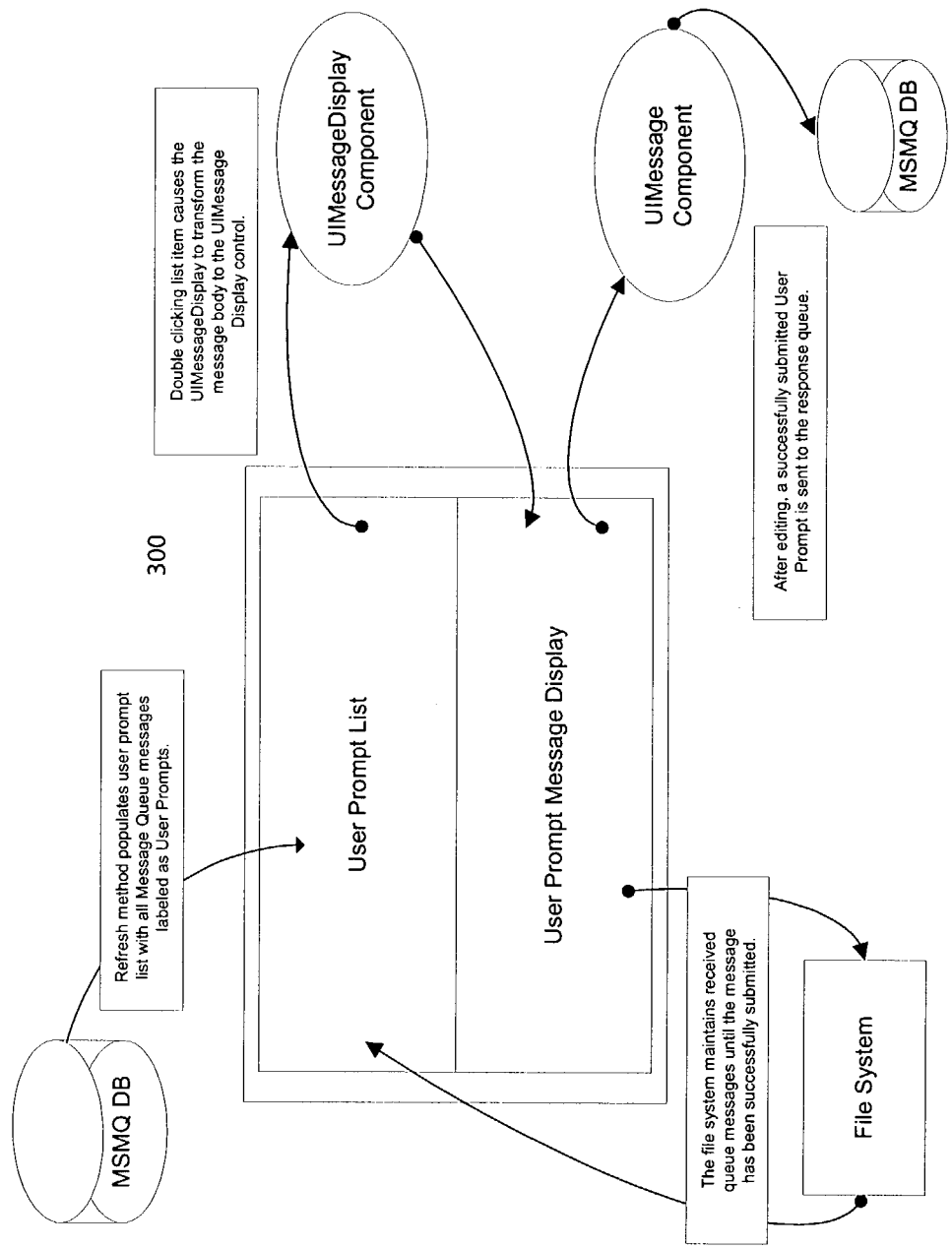
FIG. 3 illustrates an ActiveX control of the type to support communications between a runtime client and a production engine in a system according to one practice of the invention.
Figure 4A:
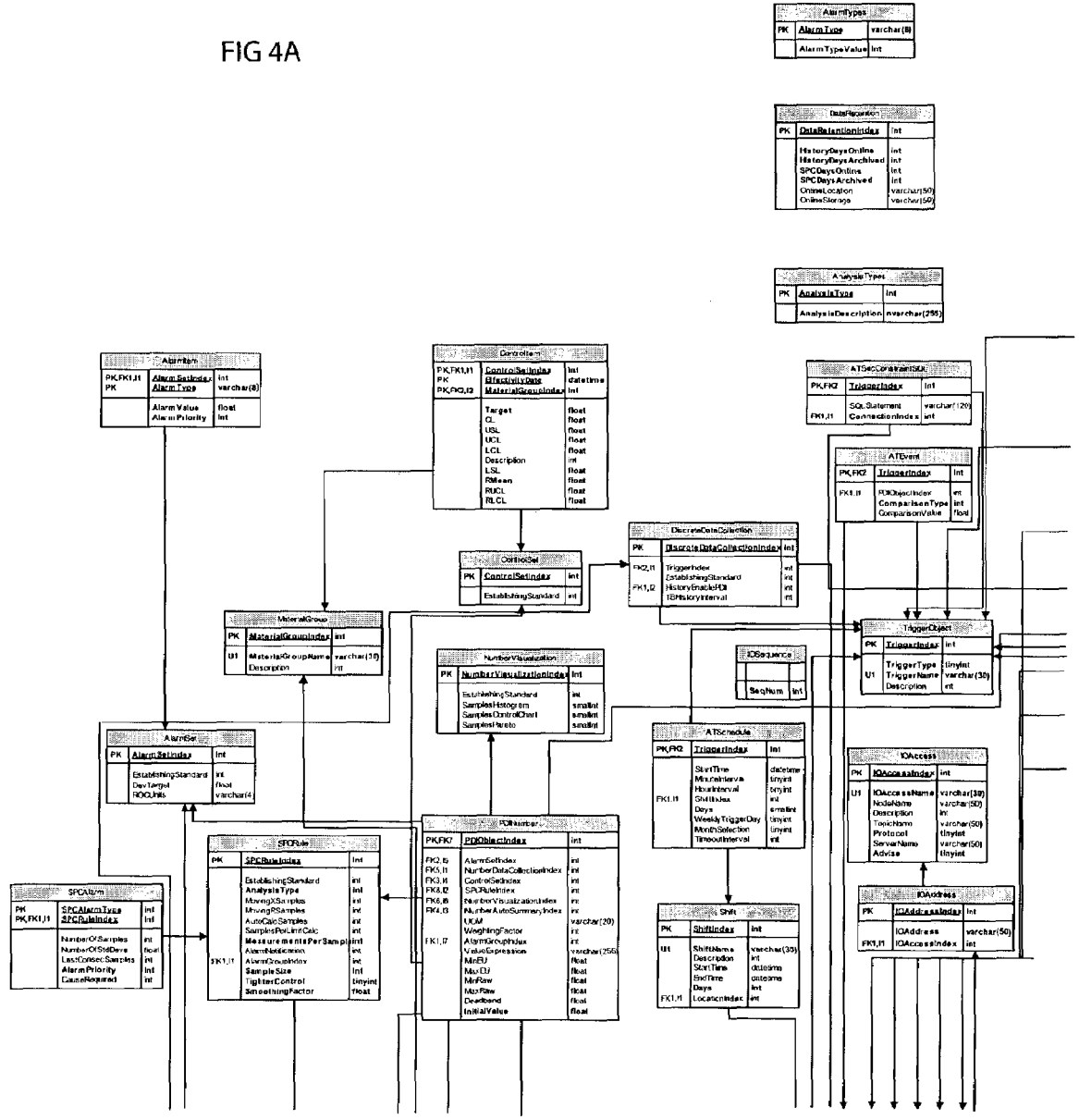
FIGS. 4A–D depicts an object oriented class structure used in implementing a system according to one practice of the invention.
Figure 4B:
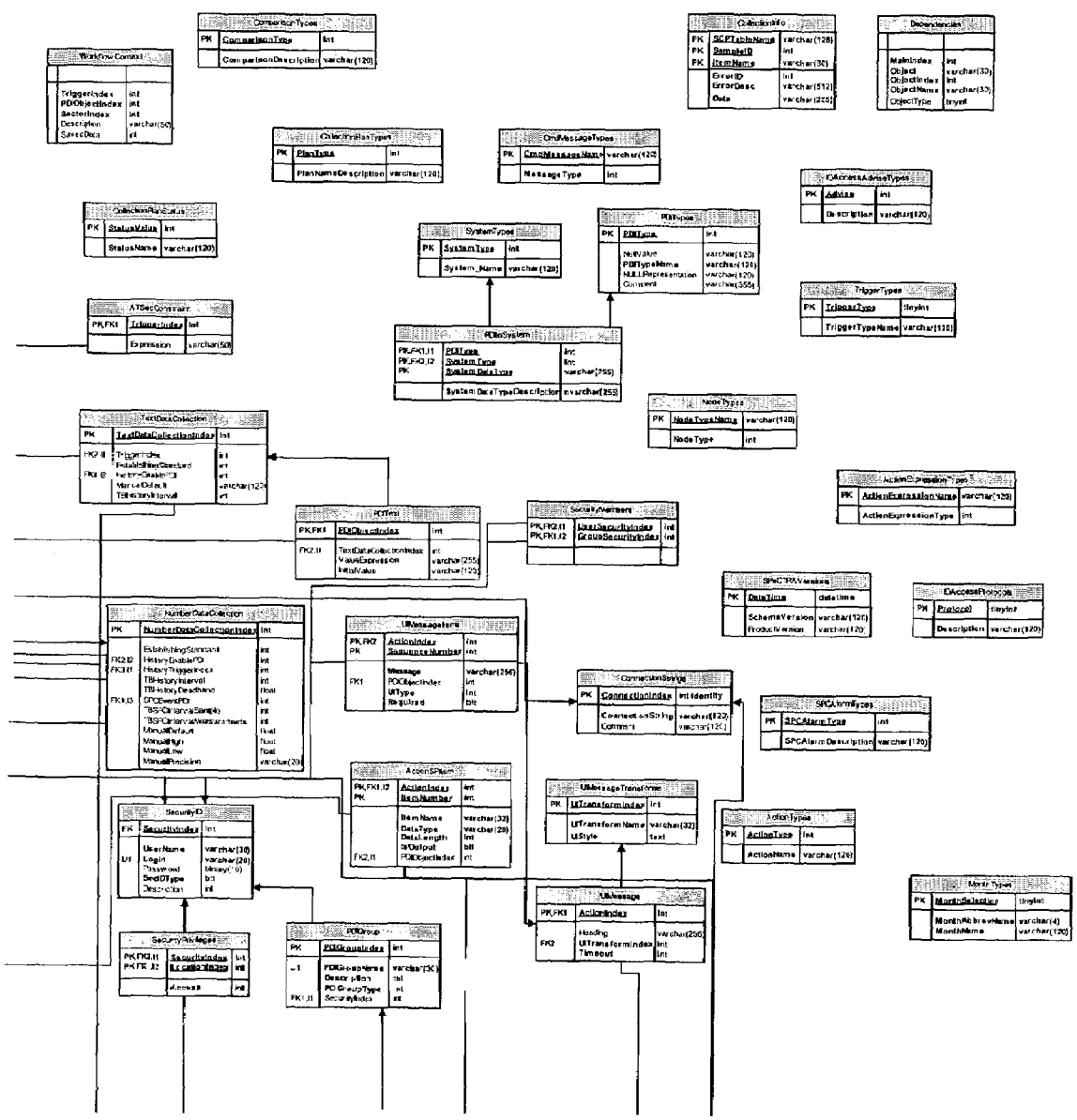
Figure 4C:
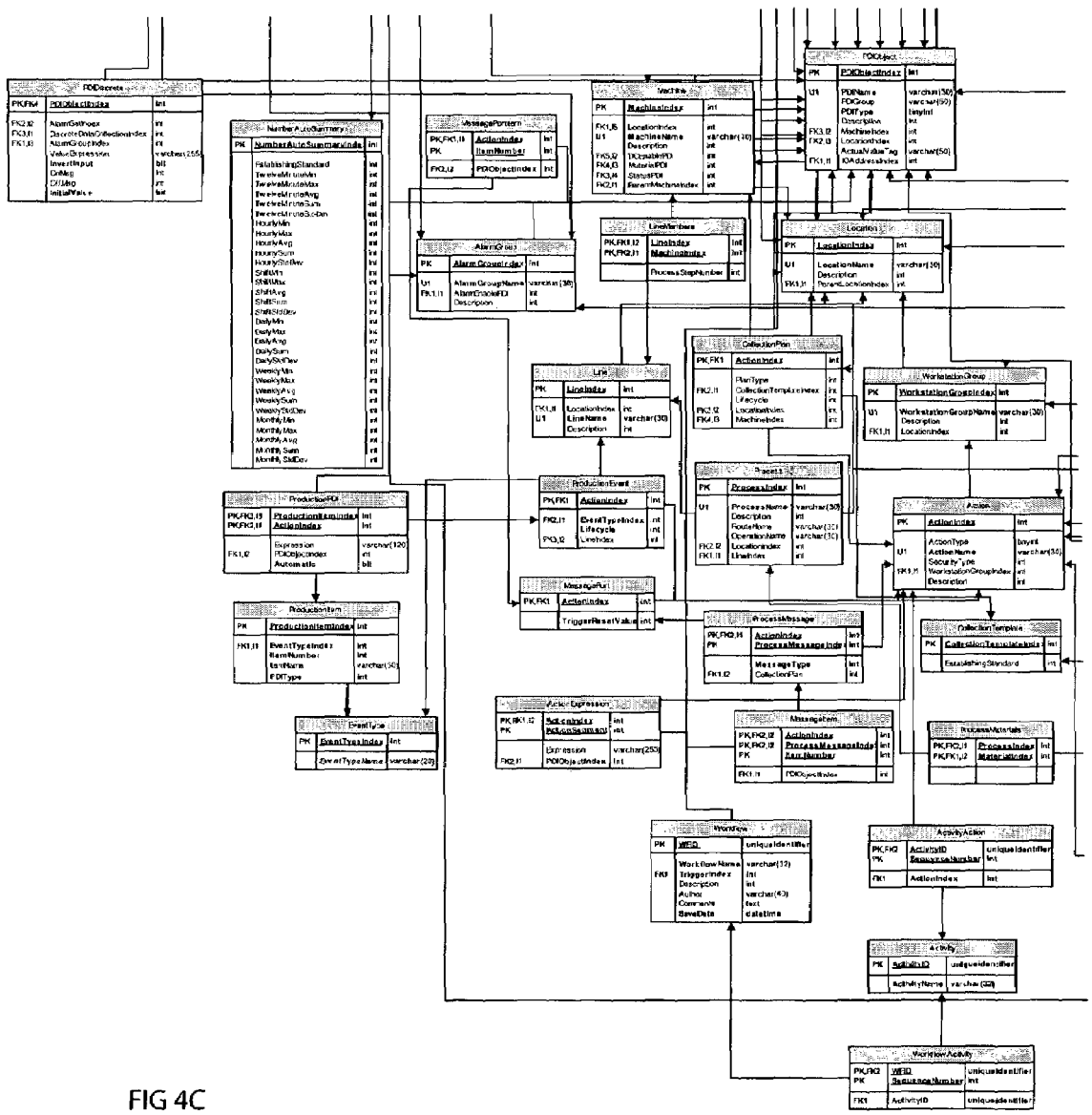
Figure 4D:
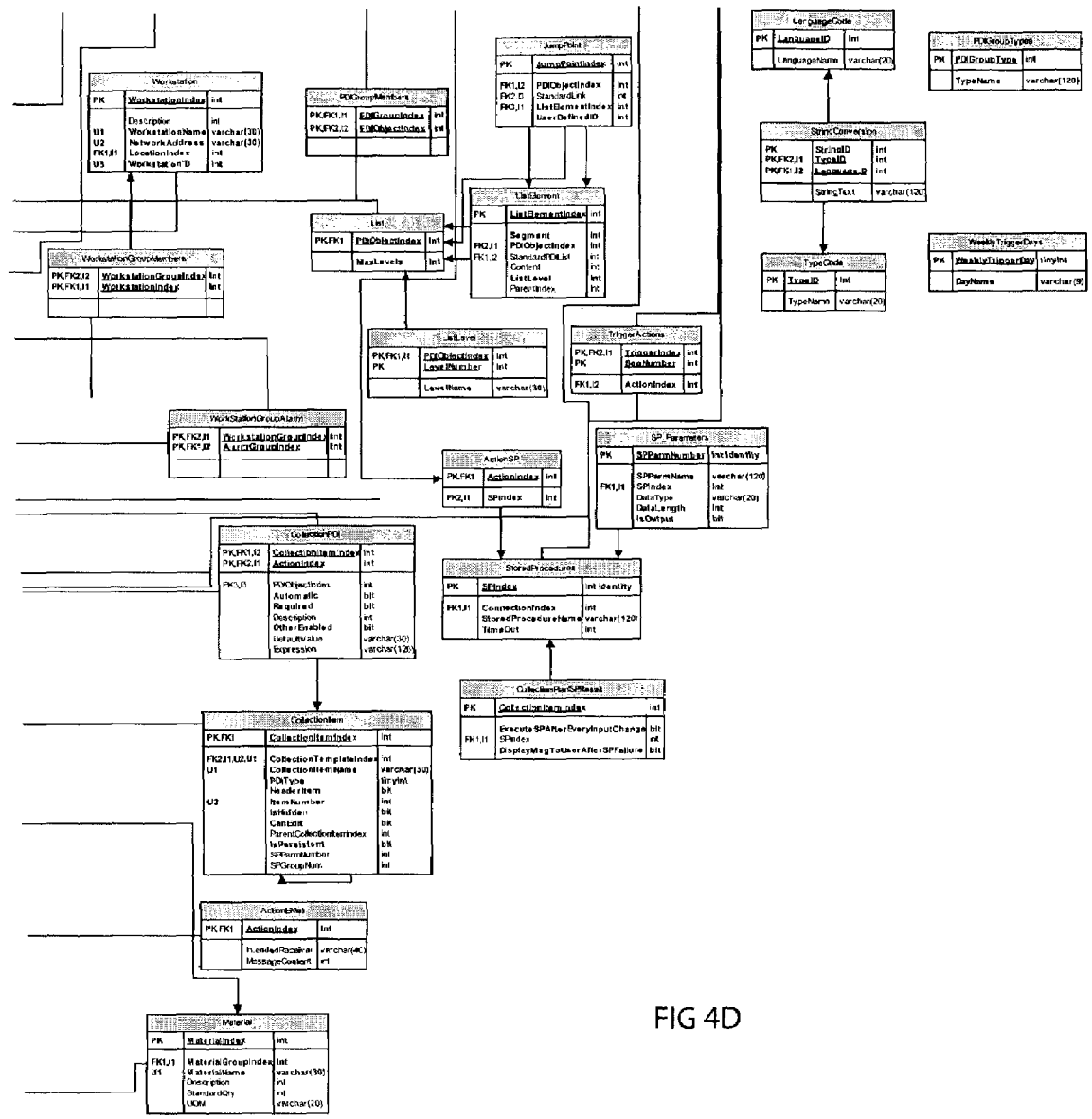

FIG. 3 illustrates an activeX control of the type used in a runtime client, e.g., 18*e*, to provide communications coupling between that client and the production engine 18*a*. As shown in the drawing, a refresh method populates a user prompt list provided in the control 300 with all Message Queue messages labeled as User Prompts. Double clicking an item in that list causes the a function IUIMessageDisplay to transform the message body to the UIMessage Display control. After editing, a successfully submitted User Prompt is sent to the response queue. The file system of the digital data processor on which the control (and, more generally, the runtime client 18*e*) is executed maintains received queue messages until the message has been successfully submitted.

AlarmClient Control

This control depends on data from the production support database 18*b*" (also referred to as the "ProdSupport" database). It receives alarm arrived events from alarm subsystem. An alarm consumer dll interfaces to an Alarm Monitoring DCOM server. The Alarm monitoring DCOM server polls the alarm subsystem of an application 12–16 (e.g., inTouch application 12*a*) for alarms.

PDISelector Control

This control combines data from production support database 18*b*", the application databases (e.g., InSQL database 14*b*) and a runtime database.

ActiveClient Control

The control combines data from production support database 18*b*" and the runtime database. It depends on the production engine for message queue server information and PDI information from production support database 18*b*".

QueueArrived Control

This control polls message queue for incoming messages. It uses product support database to determine queue information.

ParetoChart Control

This control combines data from the production support database 18*b*", the runtime database and one or more application databases (e.g., InSQL database 14*b*). The chart is able to provide information based on the following inputs: PDI information, configured collection plan information.

Trend Control

This control combines data from the production support database 18*b*", the runtime database and one or more application databases (e.g., InSQL database 14*b*). The control has the ability to trend on the following: configured PDIs, configured collection plan information.

SecurityDialog Control

This control interfaces to security manager service of application server to validate configured users.

Data Structures

Production engine 18 and, particularly, event manager 18*a*, are implemented utilizing objects implemented from classes of a structure of the type shown in FIG. 4. It will be appreciated that other class structures and data types may be used in addition or instead.

Populating Data Collection—User Action List

Figure 5:
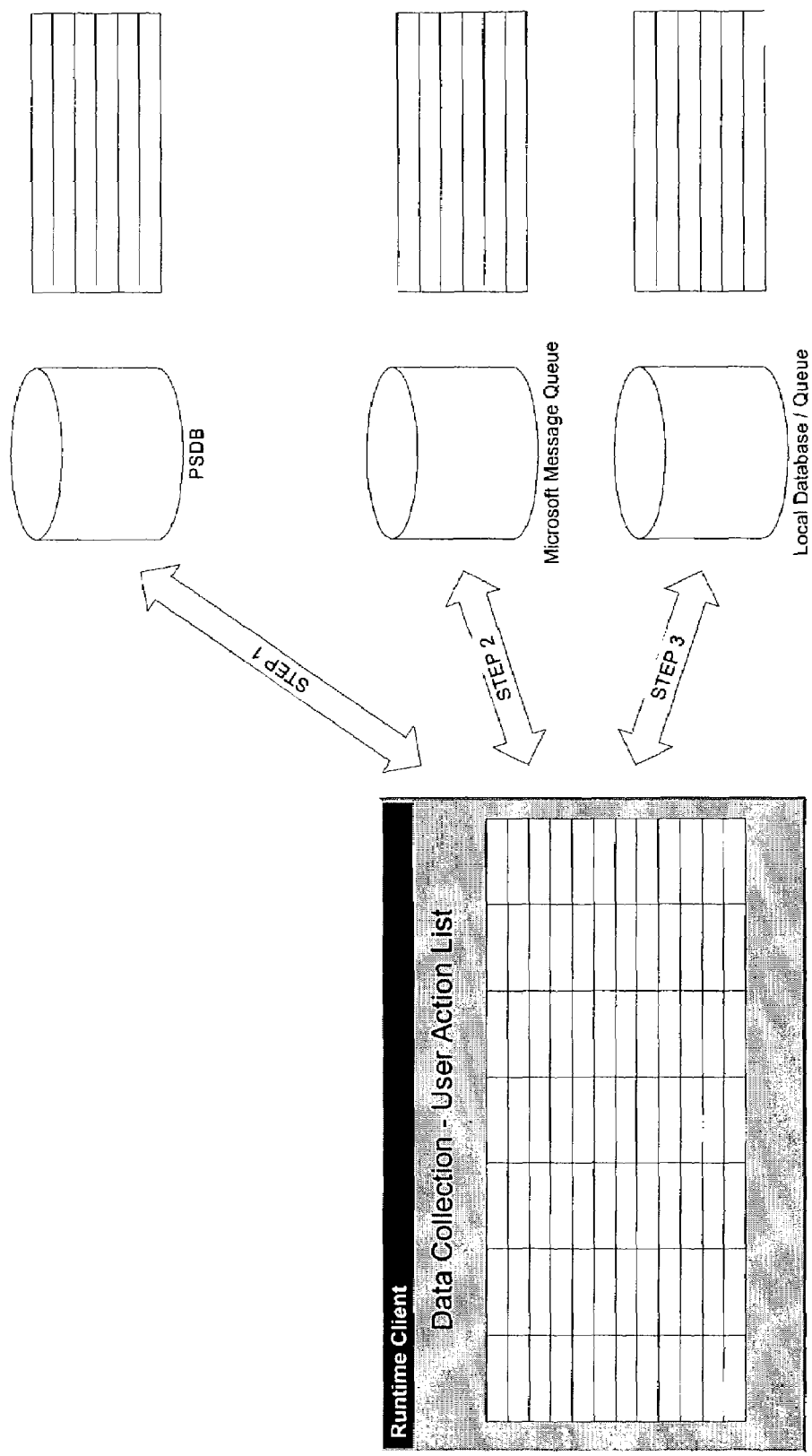
FIG. 5 depicts steps utilized to populate a data collection in a system according to one practice of the invention.

FIG. 5 depicts steps utilized in a system according to the invention to populate a data collection. In step 1, a list is requested of user-initiatable items from production support database 18*b*". In step 2, a list of pending items is requested from MSMQ. In step 3, the list of in-work items are requested from the node's local database/queue. Records in the MSMQ and in the local storage are identical. In the illustrated embodiment, they have the data collection template name and the InTrack record id, e.g., "Data Collection Template Name 'Bob'" | "InTrack Record ID# 1234" as shown in the drawing.

Action Message Life Cycle

Figure 6:
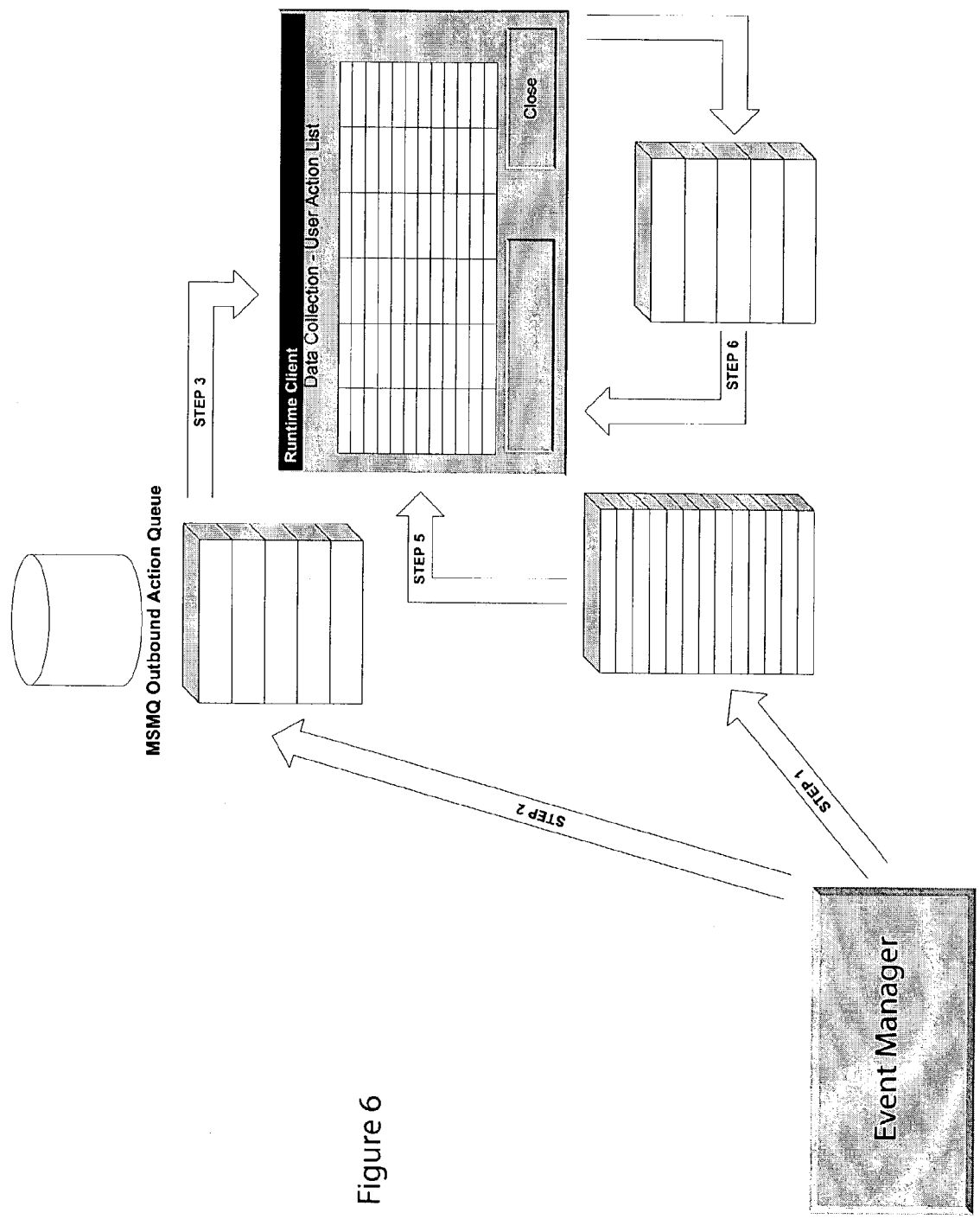
FIG. 6 depicts the life cycle of an action message in a system according to one practice of the invention.

FIG. 6 depicts an action message life cycle in a system according to the invention. In step 1, the Event Manager creates partial record in the InTrack (or other application) database 12*b*' (via its SaveMachineSample( ) function, or another such facility in another application). In step 2, it creates a Queue message and places it in the outbound MSMQ Queue. In step 3, a Client decides to pull action record from queue and work on it. The control performs a 'get message' on the MSMQ, effectively removing the message from the queue. In step 4, the client writes this action record (same information) down to a local persistence storage mechanism (database, queue, etc.). In step 5, the client reads partial record from the database 12*b* and populates a data collection screen. The client writes another partial record out if operator sets this data collection aside to work on later. In step 6, the client has completed all work on the action and has elected to "close" the action. The control writes the final record to InTrack and remove the action from the local storage.

Production and Configuration Databases

In the illustrated embodiment, the tables below are common to the configuration and production databases 18*b*' and 18*b*".

Action

The Action table identifies Actions in the illustrated system. Actions may be one of several types indicated by the ActionType field.

| Field Name | Field Format | Field Description |
|---|---|---|
| ActionIndex | Int NOT NULL (Primary Key) | Unique Index |
| ActionName | Varchar(30) NOT NULL (unique) | Name of Action |
| Description | Int NULL | Points to a multi-lingual text description of the Action, using StringConversion.StringID |
| ActionType | Tinyint NULL | Type of Action: 1 = Collection Plan 2 = Production Event 3 = Process Message (Msg Port) 4 = Expression 5 = E-mail 6 = SQL Statement |
| SecurityType | Int NULL | Describes the type of security check done for operators executing |

-continued

| Field Name | Field Format | Field Description |
|---|---|---|
| | | the action (Used for CollectionPLans and Production Events mainly) 1 = Use Login UserID 2 = Always prompt user for UserID/Password check every transaction) |
| WorkstationGroupIndex | Int NULL (Foreign key) | FK to WorkstationGroup This group identifies which workstations may perform the Action. |

ActionEMail

This table is describes the E-Mail type of Action. Each E-Mail action has a record in this table. In the illustrated embodiment, it is mapped 1:1 with Action Where Action-Type=5

| Field Name | Field Format | Field Description |
|---|---|---|
| ActionIndex | Int NOT NULL (PK) | FK to Action table |
| IntendedReceiver | Varchar(40) NULL | e-mail name of recipient |
| MessageContent | Int NULL | Pointer to string as StringConversion.StringID |

ActionExprission

This table is specifically for Expression type Actions.

| Field Name | Field Format | Field Descrirtion |
|---|---|---|
| ActionIndex | Int NOT NULL (PK) | FK to Action Table |
| ActionSegment | Int NOT NULL (PK) | Numeric Sequence number for joining multiple Expressions together |
| PDIObjectIndex | Int NOT NULL (FK) | FK to PDIObject table. Identifies the PDI that is the target for the result of the expression. |
| ExpressionType | Int NOT NULL | Type of Expression: 1 = PDI Expression (Expression is composed of PDIs and mathematical operators) 2 = SQL Expression (Expression is a SQL Statement) |
| Expression | Varchar(255) NULL | The expression text |
| ConnectString | Varchar(120) NULL | For SQL Expression Type (2), this is the connection string to the database for the SQL statement. |

ActionSQL

This table identifies a SQL expression to be executed for ActionType=6. This differs from the Expression type of Action in that the result of the SQL Statement is not used to populate a PDI value.

| Field Name | Field Format | Field Description |
|---|---|---|
| ActionIndex | Int NOT NULL (PK) | FK to Action |
| SQLStatement | Varchar(120) NULL | SQL Statement text |
| ConnectString | Varchar(120) NULL | String used for Database connection |

AlarmGroup

This table lists all the Alarm Groups for the illustrated system. This is primarily used by the InTouch Tag Server to group alarms into hierarchical sets. These sets can be used by the clients to filter out alarms that are not of concern to the operator.

| Field Name | Field Format | Field Description |
|---|---|---|
| AlarmGroupIndex | Int NOT NULL (PK) | Unique Index |
| AlarmEnablePDI | Int NULL (FK) | Foreign key to PDIObject. Identifies a Discrete PDI which acts as an enable mechanism for alarming. If NULL, the alarm group is always enabled. |
| AlarmGroupName | Varchar(30) NOT NULL | Unique name for Alarm Group |
| Description | Int NULL | Pointer to StringID in StringConversion table |

AlarmItem

This table identifies single alarms in an AlarmSet. Each record in this table represents a different type of alarm for the alarm set.

| Field Name | Field Format | Field Description |
| --- | --- | --- |
| AlarmSetIndex | Int NOT NULL (PK) | FK to AlarmSet |
| AlarmType | Varchar(8) NOT NULL (PK) | Type of Alarm using InTouch naming convention: 'HI', 'HIHI', 'LO', 'LOLO', 'ROC', 'MajorDev', 'MinorDev', 'On', 'Off' Note: 'On' and 'Off' are for Discrete PDIs only. All others are for Numeric PDIs only |
| Alarm Value | Float NOT NULL | Alarm Limit Value |
| AlarmPriority | Int NOT NULL | Priority 1–999 (1 is most important) |

ALARMSET

| Field Name | Field Format | Field Description |
| --- | --- | --- |
| AlarmSetIndex | Int NOT NULL (PK) | Unique Index |
| EstablishingStandard | Int NULL | FK to PDIObject table Identifies the Standard or Non-Standard PDI which created the AlarmSet |
| DevTarget | Float NULL | The Deviation Target value used for MajorDev and MinorDev alarm types (see AlarmItem) |
| ROCUnits | Varchar(4) NULL | Units for the Rate-Of-Change (ROC) alarm type (see AlarmItem |

ATEvent

In the illustrated embodiment, this table is 1:1 with the TriggerObject table for ATEvent type triggers

| Field Name | Field Format | Field Description |
| --- | --- | --- |
| TriggerIndex | Int NOT NULL (PK) | FK to TriggerObject |
| PDIObjectIndex | Int NULL | FK to PDIObject table. Identifies the PDI that is being monitored for comparison. |
| ComparisonType | Int NOT NULL | Type of Comparison done on the PDI: 1. == x 2. < x 3. > x 4. <= x 5. >= x 6. <> x 7. Any Change 8. Change By x 9. AlarmState changed to x |
| ComparisonValue | Varchar(20) NULL | Formatted string for 'x' in the above examples. X is a floating point number for all cases but type 9. |

ATSchedule

In the illustrated embodiment, this table is 1:1 with TriggerObject for Schedule type Triggers.

| Field Name | Field Format | Field Description |
| --- | --- | --- |
| TriggerIndex | Int NOT NULL (PK) | FK to TriggerObject |
| StartTime | Datetime NULL | Starting time |
| MinuteInterval | Tinyint NULL | Period between trigger events in minutes |
| HourInterval | Tinyint NULL | Period between trigger events in hours |
| ShiftIndex | Int NULL | FK to Shift table. Identifies the shift for the event. |
| Days | Smallint NULL | Period between trigger event in days. |
| WeeklyTriggerDay | Tinyint NULL | Identifies the day of the week for weekly trigger events: 1. Sunday 2. Monday 3. Tuesday 4. Wednesday 5. Thursday 6. Friday 7. Saturday |
| Month Selection | Int NULL | Selects which months the trigger will occur (bitwise AND . . . ) 1 = January 2 = February 4 = March 8 = April 16 = May 32 = June 64 = July 128 = August 256 = September 512 = October 1024 = November 2048 = December |

ATSecConstraint

This table identifies secondary constraints on triggers using a PDI expression.

| Field Name | Field Format | Field Description |
| --- | --- | --- |
| TriggerIndex | Int NOT NULL (PK) | FK to TriggerObject |
| Expression | Varchar(50) NULL | Text expression composed of PDIs and numerical operators |

ATSecConstraintsSQL

This table identifies secondary constraints on triggers that are made with a SQL statement.

| Field Name | Field Format | Field Description |
|---|---|---|
| TriggerIndex | Int NOT NULL (PK) | FK to TriggerObject |
| SQLStatement | Varchar(120) NULL | SQL Statement text |
| ConnectString | Varchar(120) NULL | Connect string text for database connection |

CollectionItem

This table identifies individual items to be collected as part of a Collection Template. Each item identifies a "slot" in the collection plan. Multiple collection plans may share the same Collection Template and therefore the same set of CollectionItems.

| Field Name | Field Format | Field Description |
|---|---|---|
| CollectionItemIndex | Int NOT NULL (PK) | Unique Index |
| CollectionTemplateIndex | Int NOT NULL | FK to CollectionTemplate |
| ItemNumber | In NOT NULL | Unique within the template, this field orders the items sequentially |
| HeaderItem | Bit NOT NULL | TRUE when the item is in the Header section of the plan. |
| CollectionItemName | Varchar(30) NOT NULL | Unique within the template this names the columns used in the collection plan (used by InTrack to name the DataSet Items for the DS Template) |
| PDIType | Tinyint NOT NULL | Type of PDI (see PDIObject) |

CollectionPDI

This table lists the specific PDIs that are mapped to CollectionItems for each Collection Plan.

| Field Name | Field Format | Field Description |
|---|---|---|
| CollectionItemIndex | Int NOT NULL (PK) | FK to CollectionItem |
| ActionIndex | Int NOT NULL (PK) | FK to CollectionPlan (Action) |
| PDIObjectIndex | Int NULL | FK to PDIObject identifies the PDI to map to the collection item for this collection plan |
| Automatic | Bit NOT NULL | TRUE when the PDI value is collected automatically by EventMgr. False means the value is manually collected by operator. |
| Required | Bit NOT NULL | TRUE when the operator is required to enter a value for this item. False means data entry is optional. |
| Description | Int NULL | Pointer to StringID in String-Conversion table. Optionally describes the PDI/CollectionItem relationship. |
| Expression | Varchar(120) | Text expression to be used by Run-Time client for automatically filling in the item with the result of an expression based on values of other entered items. |
| DefaultValue | Varchar(30) NULL | Default value for the CollectionPDI when filled in by EventMgr, o when presented to operator for manual collection. This is a formatted float for numeric PDIs. |

CollectionPlan

In the illustrated embodiment, this table is 1:1 with Action where ActionType=1

| Field Name | Field Format | Field Description |
| --- | --- | --- |
| ActionIndex | Int NOT NULL (PK) | FK to Action |
| CollectionTemplateIndex | Int NULL | FK to CollectionTemplate |
| PlanType | Int NULL | Type of Collection Plan:<br>1 = Manual<br>2 = Manual Standard<br>3 = Automatic<br>4 = Automatic Standard<br>5 = Combo<br>6 = Combo Standard |
| Lifecycle | Int NULL | Expiration time in minutes for the Collection plan to be fulfilled. |
| LocationIndex | Int NULL | FK to Location table. Optionally associates the Collection plan to a location. |
| MachineIndex | Int NULL | FK to Machine Table. Optionally associates the Collection plan to a machine. |
| COLLECTION TEMPLATE | | |
| CollectionTemplateIndex | Int NOT NULL (PK) | Unique Index |
| EstablishingStandard | Identifies the Collection plan (standard or non-standard) which created the CollectionTemplate | A Collection Template is shared by all regular Cplans linked to a standard. This field identifies which Cplan is the standard that created it. It also identifies the regular Cplan when it is independently configured (does not use a standard) |

ControlItem

This table identifies target and limit sets by PDI, Product Group, and Effective date.

| Field Name | Field Format | Field Description |
| --- | --- | --- |
| ControlSetIndex | Int NOT NULL (PK) | FK to ControlSet |
| EffectivityDate | Datetime NOT NULL (PK) | Date the target and limit set is to take effect. |
| MaterialGroupIndex | Int NOT NULL (PK) | FK to MaterialGroup. Identifies the Material (Product) Group for the target/limit set. |
| Description | Int NULL | Pointer to StringID in the StringConversion table. |
| Target | Float NOT NULL | The target value for SPC analysis |
| CL | Float NOT NULL | The Control Limit mean for SPC analysis |
| USL | Float NOT NULL | Upper Specification Limit |
| UCL | Float NOT NULL | Upper Control Limit |
| LCL | Float NOT NULL | Lower Control Limit |
| LSL | Float NOT NULL | Lower Specification Limit |
| Rmean | Float NULL | Expected mean value for Range |
| RUCL | Float NULL | Upper Control Limit on Range |
| RLCL | Float NULL | Lower Control Limit on Range |

ControlSet

This table groups the target and limit sets given by the ControlItem table into sets for standardization. Every PDI for SPC analysis has a ControlSet. This can be standardized so that several PDI may share the same control set.

| Field Name | Field Format | Field Description |
|---|---|---|
| ControlSetIndex | Int NOT NULL (PK) | Unique Index |
| EstablishingStandard | Int NULL | Identifies the PDI (PDIObjectIndex) which created the Control Set. |

DataRetention

This table defines the global data retention parameters for the illustrated system.

| Field Name | Field Format | Field Description |
|---|---|---|
| DataRetentionIndex | Int NOT NULL | Unique Index |
| HistoryDaysOnline | Int NOT NULL | Number of days to keep History records online |
| HistoryDaysArchived | Int NOT NULL | Number of Days to keep history records archived |
| SPCDaysOnline | Int NOT NULL | Number of days to keep SPC data online |
| SPCDaysArchived | Int NOT NULL | Number of Days to keep SPC records archived |
| OnlineLocation | Varchar(50) NULL | ??? |
| OnlineStorage | Varchar(50) NULL | ??? |

EventType

This table enumerates the event types possible with Production Events. The table is pre-populated with the types supported by the illustrated system. In the illustrated embodiment, the supported Event Types are:

EventTypeIndex EventTypeName
1 Sublot Create
2 Sublot Start
3 Sublot Consume
4 Sublot Complete
5 Sublot Close
6 Sublot Move
7 Sublot Adjust

| Field Name | Field Format | Field Description |
|---|---|---|
| EventTypeIndex | Int NOT NULL (PK) | Unique Index |
| EventTypeName | Varchar(30) | Name of Event Type |
| IOAccessIndex | Int NOT NULL (PK) | Unique Index |
| IOAccessName | Varchar(30) NOT NULL | Unique Name for IOAccess |
| Description | Int NULL | FK to StringID in String-Conversion table |
| NodeName | Varchar(50) NULL | Name of Node for server |
| TopicName | Varchar(50) NULL | Name of topic for server |
| ServerName | Varchar(50) NULL | Name of server application |
| Protocol | Tinyint NOT NULL | Protocol index:<br>1 = DDE<br>2 = SuiteLink |
| Advise | Tinyint NOT NULL | Identifies which items to advise:<br>1 = All<br>2 = Active Only |

PDIGroup

This table defines groups of PDIs. PDIs can be grouped for reports, displays, etc. Groups can be public or private.

| Field Name | Field Format | Field Description |
|---|---|---|
| PDIGroupIndex | Int NOT NULL (PK) | Unique Index |
| PDIGroupName | Varchar(30) NOT NULL | Unique Name for Group |
| Description | Int NOT NULL | FK to StringID in StringConversion table.<br>Text description of PDI Group |
| PDIGroupType | Int NOT NULL | The Type of PDI Group:<br>1 = Report Group<br>2 = Display Group |
| SecurityIndex | Int NULL | FK to SecurityID table.<br>Identifies the owner of a private PDI Group.<br>A NULL indicates that the group is public. |

PDIGROUPMEMBERS

| Field Name | Field Format | Field Description |
|---|---|---|
| PDIGroupIndex | Int NOT NULL (PK) | FK to PDIGroup<br>Identifies the PDI Group. |
| PDIObjectIndex | Int NOT NULL (PK) | FK to PDIObject<br>Identifies the PDI. |

PDINUMBER

| Field Name | Field Format | Field Description |
|---|---|---|

PDIObject

This table identifies PDIs of all types. It contains information common to all PDI types.

| Field Name | Field Format | Field Description |
|---|---|---|
| PDIObjectIndex | Int NOT NULL (PK) | Unique Index |
| PDIName | Varchar(30) NOT NULL | Unique Name |
| Description | Int NULL | FK to StringID in StringConversion |

| Field Name | Field Format | Field Description |
| --- | --- | --- |
| | | table |
| PDIGroup | Varchar(50) NULL | Not Used |
| PDIType | Tinyint NOT NULL | Type of PDI:<br>1 = Discrete<br>2 = Discrete Standard<br>3 = List<br>4 = List Standard<br>5 = Number<br>6 = Number Standard<br>7 = Text<br>8 = Text Standard<br>9 = DateTime<br>10 = DateTime Std.<br>11 = Message Port Item |
| MachineIndex | Int NULL | FK to Machine. Optionally associates the PDI to a Machine |
| LocationIndex | Int NULL | FK to Location. Optionally associates the PDI to a Location |
| ActualValueTag | Varchar(50) | TagName to be created in InTouch. Current implementation is to use the PDIName for this field. No independent configuration. |
| IOAddressIndex | Int NULL | FK to IOAddress. Identifies the IOAddress and Access used for PDIs linked to PLC addresses or other foreign applications. NULL indicates a "Memory" PDI whose value is not linked to a foreign application but is held internally in memory. (InTouch Memory Tag) |
| PRODUCTIONEVENT | | |
| ActionIndex | Int NOT NULL (PK) | 1:1 with Action table |
| EventTypeIndex | Int NOT NULL | FK to EventType (See EventType) |
| Lifecycle | Int NOT NULL | Number of minutes to keep Production Event active waiting for operator input. |
| LineIndex | Int NULL | FK to Line table. Identifies the Line |

ProductionItem

This table enumerates the parameters for each Production EventType. This table is pre-populated with the set of parameters for each EventType in the EventType table (see EventType).

| Field Name | Field Format | Field Description |
| --- | --- | --- |
| ProductionItemIndex | Int NOT NULL (PK) | Unique Index |
| EventTypeIndex | Int NOT NULL (FK) | FK to EventType Identifies the EventType |
| ItemNumber | Int NOT NULL | Orders the parameters for each EventType |
| ItemName | Varchar(30) NOT NULL | Name of the parameter |
| PDIType | Int NOT NULL | Data Type for the parameter (See PDIObject) |

ProductionPDI

This table lists the parameters for each real Production-Event and the PDI or Expression assignement. In the illustrated embodiment, expressions are a constant value. In alternate embodiments, arithmetic and string expressions are supported. The Expression and PDIObject fields are mutually exclusive. One and only one of these two fields must be NULL.

| Field Name | Field Format | Field Description |
| --- | --- | --- |
| ProductionItemIndex | Int NOT NULL (PK) | FK to ProductionItem Identifies the parameter name and datatype. |
| ActionIndex | Int NOT NULL (PK) | FK to ProductionEvent Identifies the specific ProductionEvent the Parameter/PDI mapping is for |
| Expression | Varchar(120) NULL | Text Expression Must be a constant value |
| PDIObjectIndex | Int NULL | FK to PDIObject table. Identifies the PDI mapped to the parameter. |
| Automatic | Bit NOT NULL | When True, this value is evaluated by the control system and entered When False, the value must be supplied by an operator. |

SPCAlarm

This table identifies the SPC Alarms which have been configured for each PDI (DataSet)

| Field Name | Field Format | Field Description |
| --- | --- | --- |
| SPCRuleIndex | Int NOT NULL (PK) | FK to SPCRule |
| SPCAlarmType | Int NOT NULL (PK) | Type of SPC Alarm: 1 = Samp Outside Spec Limits 2 = Samp Outside Control Limits 3 = 2 of last 3 outside 2 SD (Same Side) 4 = 4 of last 5 outside 1 SD (same side) 5 = x of last y outside z SD 6 = x of last y outside z SD (same side) 7 = x consecutive inside 1 SD 8 = x consecutive outside 1 SD 9 = x consecutive increasing or decreasing 10 = x consecutive alternating up/down |

-continued

| Field Name | Field Format | Field Description |
| --- | --- | --- |
| | | 11 = x consecutive on one side of centerline |
| NumberOfSamples | Int NULL | Number of Samples involved in alarm determination. (x in above type list) |
| LastConsecSample | Int NULL | Number of last consecutive samples involved in alarm determination. (y in the above type list) |
| NumberOfStdDevs | Float NULL | Number of Standard Deviations (SD) involved in alarm determination. (z in the above type list) |
| AlarmPriority | Int NOT NULL | Priority of Alarm 1–999 1 is most important. |
| CauseRequired | Int NULL | Indication that the operator is required to enter a cause code when this alarm occurs. 1 = Cause Required 0 or NULL = Not required |

SPCRule

| Field Name | Field Format | Field Description |
| --- | --- | --- |
| SPCRuleIndex | Int NOT NULL (PK) | Unique Index |
| EstablishingStandard | Int NULL | Identifies the Number PDI (Standard or Regular) which created the SPCRule record by PDIObjectIndex |
| AnalysisType | Int NOT NULL | SPC Analysis Type: 0 = X individual 1 = X Bar, R 2 = X Bar, s 3 = Moving X, Moving R 4 = (NOT USED) 5 = C 6 = P 7 = NP 8 = U 9 = EWMA 10 = CuSum |

-continued

| Field Name | Field Format | Field Description |
| --- | --- | --- |
| MovingXSamples | Int NULL | Number of Moving X Samples, required for AnalysisType = 4 only. |
| MovingRSamples | Int NULL | Number of Moving R Samples, required for AnalysisType = 4 only. |
| AutoCalcSamples | Int NULL | Sets the number of samples collected between automatically recalculating new control limits. NULL indicates no automatic recalculation is to be performed. |
| SamplesPerLimitCalc | Int NULL | The number of most recent samples to use for the automatic limit recalculation. |
| MeasurementsPerSample | Int NOT NULL | Number of Measurements Per Sample. |

Event Manager

Figure 7:
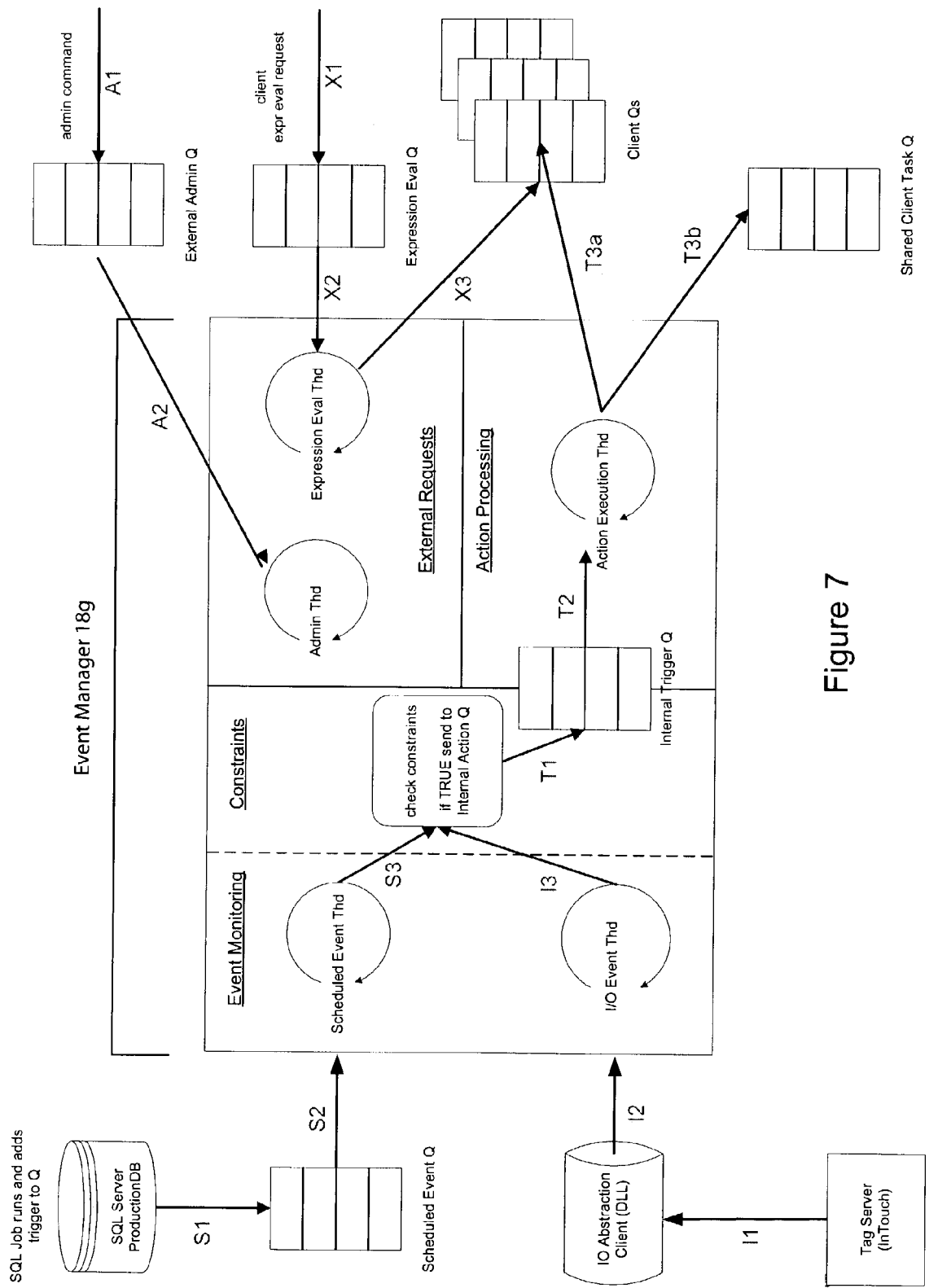
FIGS. 7–8 depict processing in an event manager in a system according to one practice of the invention.

FIG. 7 depicts event processing in an event manager 18a according to one practice of the invention. The illustration depicts embodimentS or instances where there is no persistence in data flows.

In the illustrated embodiment, a scheduled event message, notification or other indicator (collectively, "scheduled event") S1 is generated by the SQL server based on a search of the production database 18b" for scheduled events or other triggering conditions. Other mechanisms may be used to identify schedule events, e.g., non-SQL database searches, timers, scheduled events lists, and so forth. Regardless, the event S1 is queued or otherwise stored for processing on a FIFO or other basis. And, indeed, in some embodiments, selected (or all) events made available for immediate communication to the event manager 18a.

Like the scheduled event S1, a device input i1—that is, inputs from process or other control equipment to which the applications 12–16 are coupled—are generated by the respective applications, here, tag server associated with the inTouch™ application 12a. The device input i1 may be made available for immediate communication to the event manager 18a or, for example, as here, transmitted from the tag server (or other server, database management system or other store, manager and/or monitor of tags or other device input/output events) via illustrated abstraction client that reformats, maps and/or otherwise insures proper formatting, consistency and/or uniqueness among device inputs i1 received, potentially, from a variety of applications 12–16.

Following queuing, if any, event monitoring functionality in the event manager polls, receives or otherwise identifies scheduled event and device inputs. These are designated in the drawing as S2 and i2, respectively. Specifically, a scheduled event thread identifies and obtains generated/queued event S2 and checks them against event constraints, e.g., stored in the production support database 18b". An I/O event thread likewise identifies and obtains generated/queued device inputs i2 and checks them against constraints in the production support database 18b". If the events S2 or inputs i2 match the constraints, they are queued in an internal trigger queue for processing. These are designated in the drawing T1, the letter "T" indicating that they are triggers.

The triggers are, in turn, queued in an internal trigger queue for processing. These are taken up on a FIFO or other basis by an action execution thread ("AET") also executing in the event manager 18a. One such trigger is designated T2 in the drawing. The action execution thread processes the trigger in accord with the workflow, particularly, for example, executing the event action(s) associated with the particular current trigger (here, trigger T2). As noted previously, those actions can include transactions (such as start, complete, etc.) to be executed by the client applications 12–16, stored procedures/database actions, and so forth.

As discussed above in connection with FIG. 6, the action execution thread queues messages to those applications, here designated T3a, T2b, reflecting that a single trigger executed by the event manager 18a (and, particularly, the action execution thread) may result in generation of more than one message for processing by the clients 12–16.

With continued reference to FIG. 7, the event manager 18a includes an expression evaluation thread to process expressions in response to requests issued by the client applications. Here, a request X1 for expression evaluation is generated by a client application and queued or otherwise transmitted for processing by the manager 18a. The request is dequeued or otherwise received by the manager's 18a expression evaluation thread, which parses or otherwise interprets the request, generating a response (e.g., based on current system state values) for return to the requesting application. Here, that response is designated X2 and is shown being queued, e.g., in the manner detailed in FIG. 6 and discussed above, for return to that application. During processing of an expression X1, additional messages (not shown) can be generated and queued to the client applications, e.g., to obtain further values necessary to evaluate the expression.

The event manager 18a also includes an administrative command evaluation thread that processes commands received, for example, from the operator console. As above, one such command, here, designated A1, generated by the console is queued or otherwise transmitted for processing by the event manager 18a. That request is dequeued or otherwise received by the command evaluation thread, which parses or otherwise interprets it, altering internal system states, generating output, or performing such processing as is desirable or necessasry in view of the command. It will be appreciated that, though not illustrated here, such processing may include generation of messages to the client applications 12–16, e.g., as discussed above in connection with the expression evaluation and action execution threads.

Figure 8:
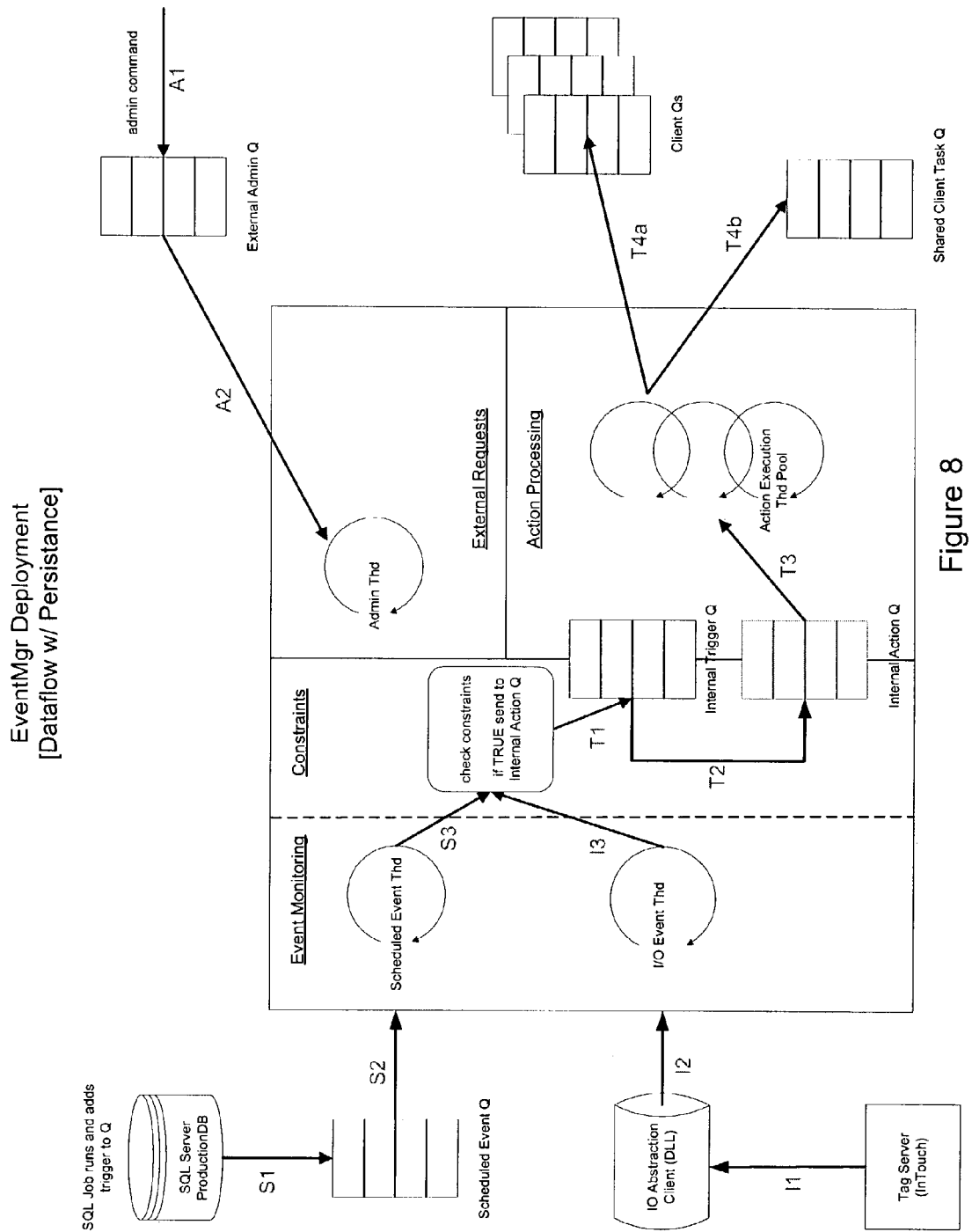

FIG. 8 also depicts event processing in an event manager 18a according to one practice of the invention—here, however, in an embodiment or instance where there is persistence in data flows. As shown in this illustration, operation of the event manager proceeds as described above in connection with FIG. 7. Rather than a single action execution thread (AET), a pool is shown in this drawing. Each AET in the pool operates as described above, taking up processing of the triggers (here shown being queued to an additional queue, the internal action queue) as the respective AET becomes available.

Process Data Items

The configuration manager integrates information generated by operation of system 10 and its constituent components using Process Data Items (PDIs). These can be established to collect information, trigger actions, and activate messages. These are also used to process values that are maintained or managed by the system.

PDIs can be associated with equipment or locations, and also can depend, for example, on materials to determine appropriate SPC targets and limits. The source of PDI values can be an I/O source. For example, basic information coming from the PLC or other I/O source, such as roll count, is used to trigger tags (PDIs). For example, a roll is completed every time 500 units are processed and a test is required after every five rolls. The following tags would be established:

At multiples of 500, the "Roll Finished" tag would be generated and stored in the database.

Every 5 rolls (5×500), an action will be triggered. If the operator is required to enter specific information, this action could include a trigger.

Additional on/off triggers would be used to generate warning messages, alarms, and other important information.

Figure 9A:
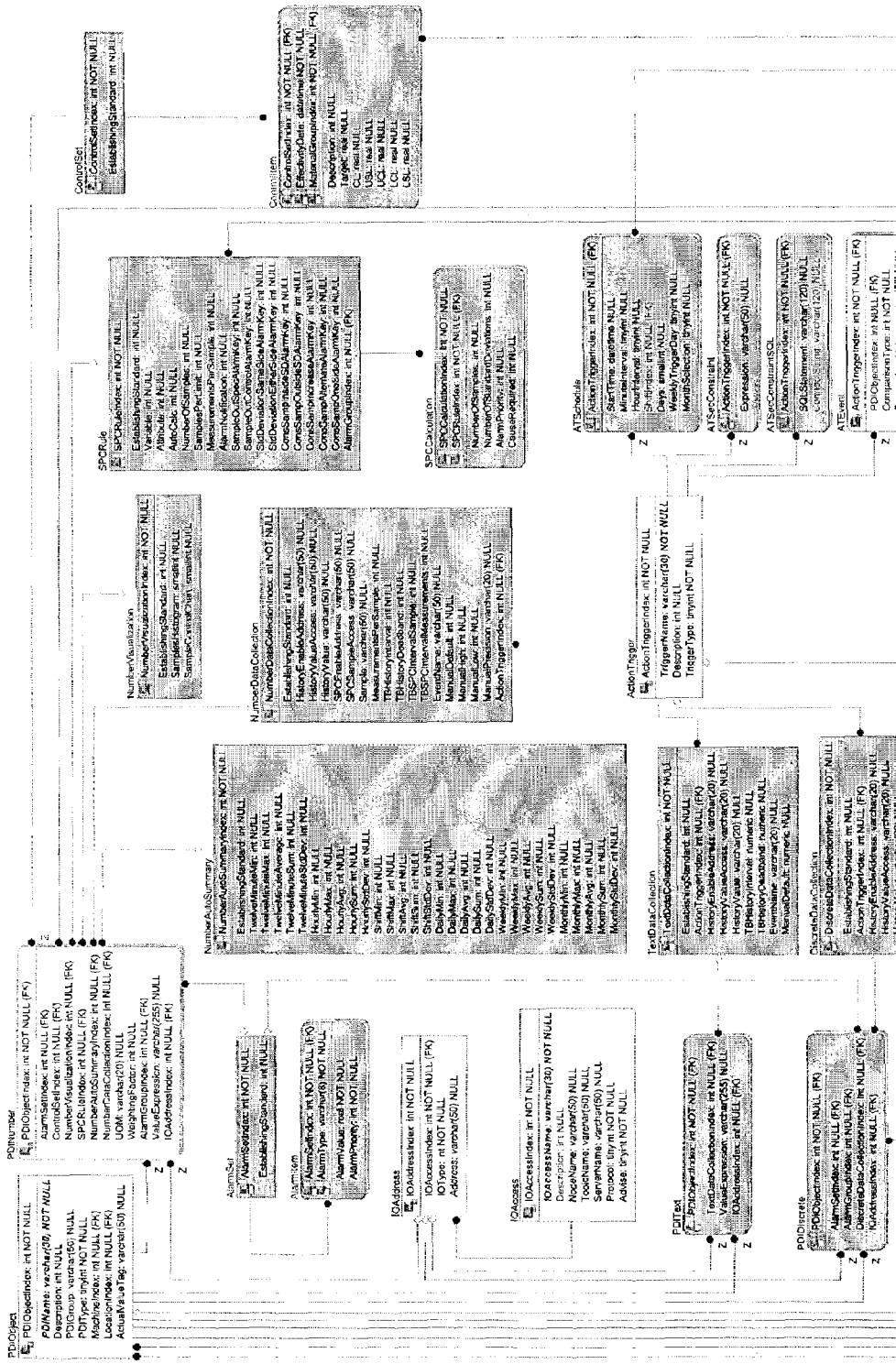
FIGS. 9A–9C depict an object oriented class structure supporting inter alia PDIs and collection plans in a system according one practice of the invention.
Figure 9B:
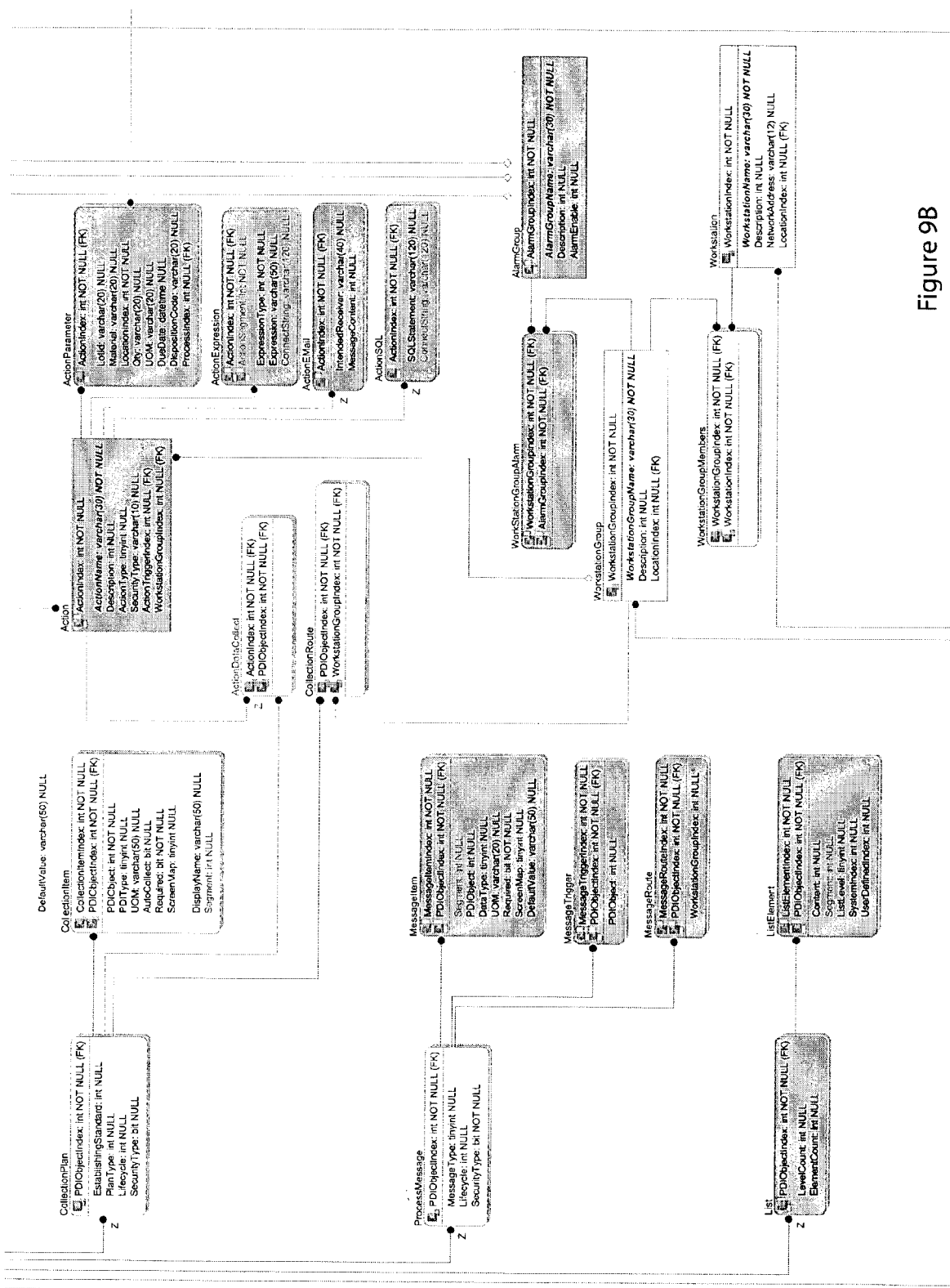
Figure 9C:
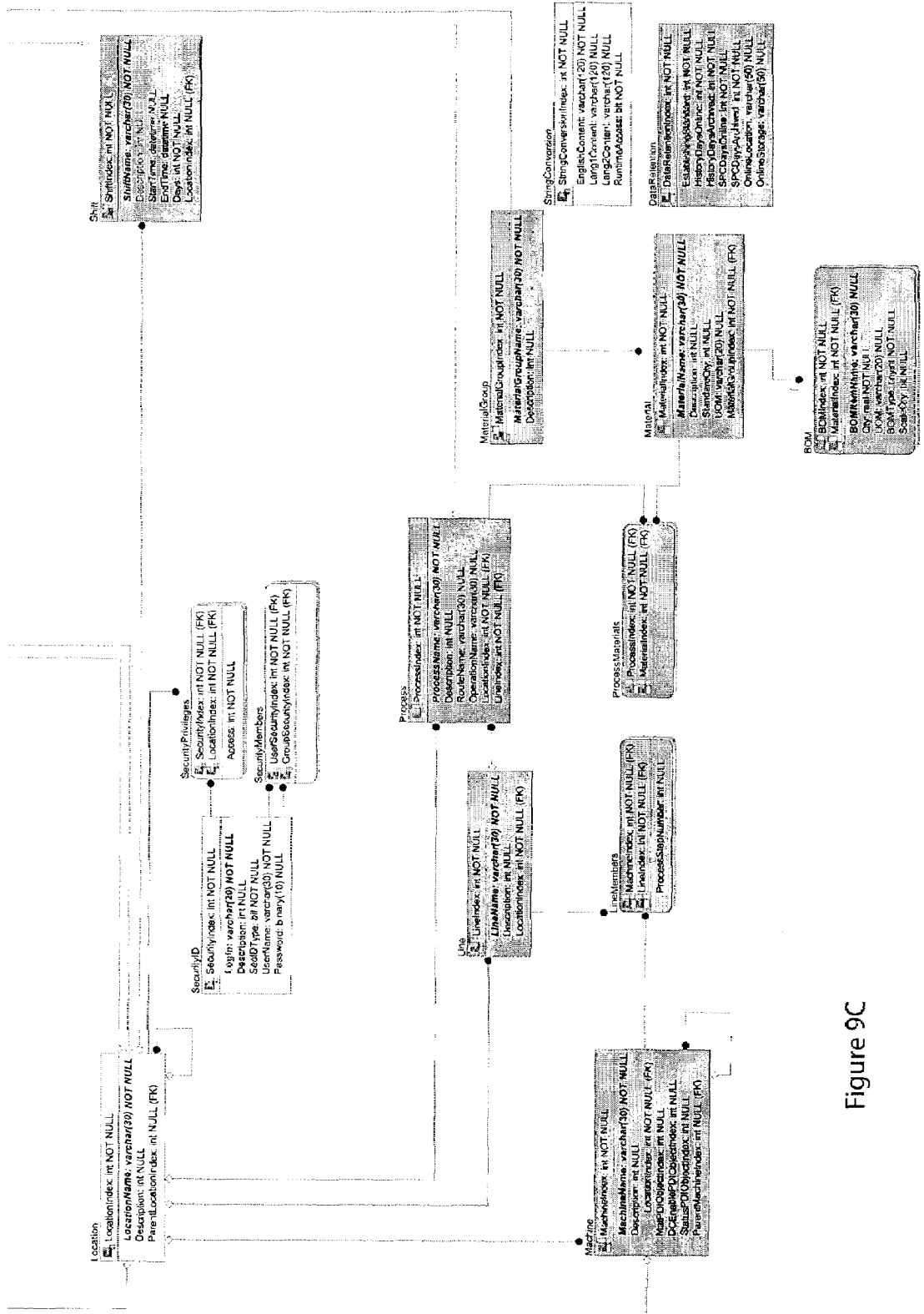

PDI values can also be derived from an expression calculated from other PDIs. In either event, limits and scaling are similar to those for process control tags. Extensions to process data items include collection plans, events and messages. These enable the grouping of process data items so they can be captured as a single event, either automatically, manually, or in combination. FIG. 9 depicts an object-oriented class structure supporting, among other things, PDIs and collection plans in a system according one practice of the invention.

Types of PDIs supported by the illustrated embodiment include date/time, discrete, list, numerical and text, as described above.

List PDIs.

A list PDI is a process data item or tag that stores a position in a hierarchical tree. The tree in the database schema is a circular reference (references itself) so that it can be easier to store in the database. The database structure can be seen in FIG. 10. The tree is created with the configuration client and an example can be seen in FIG. 11.

Figure 13:
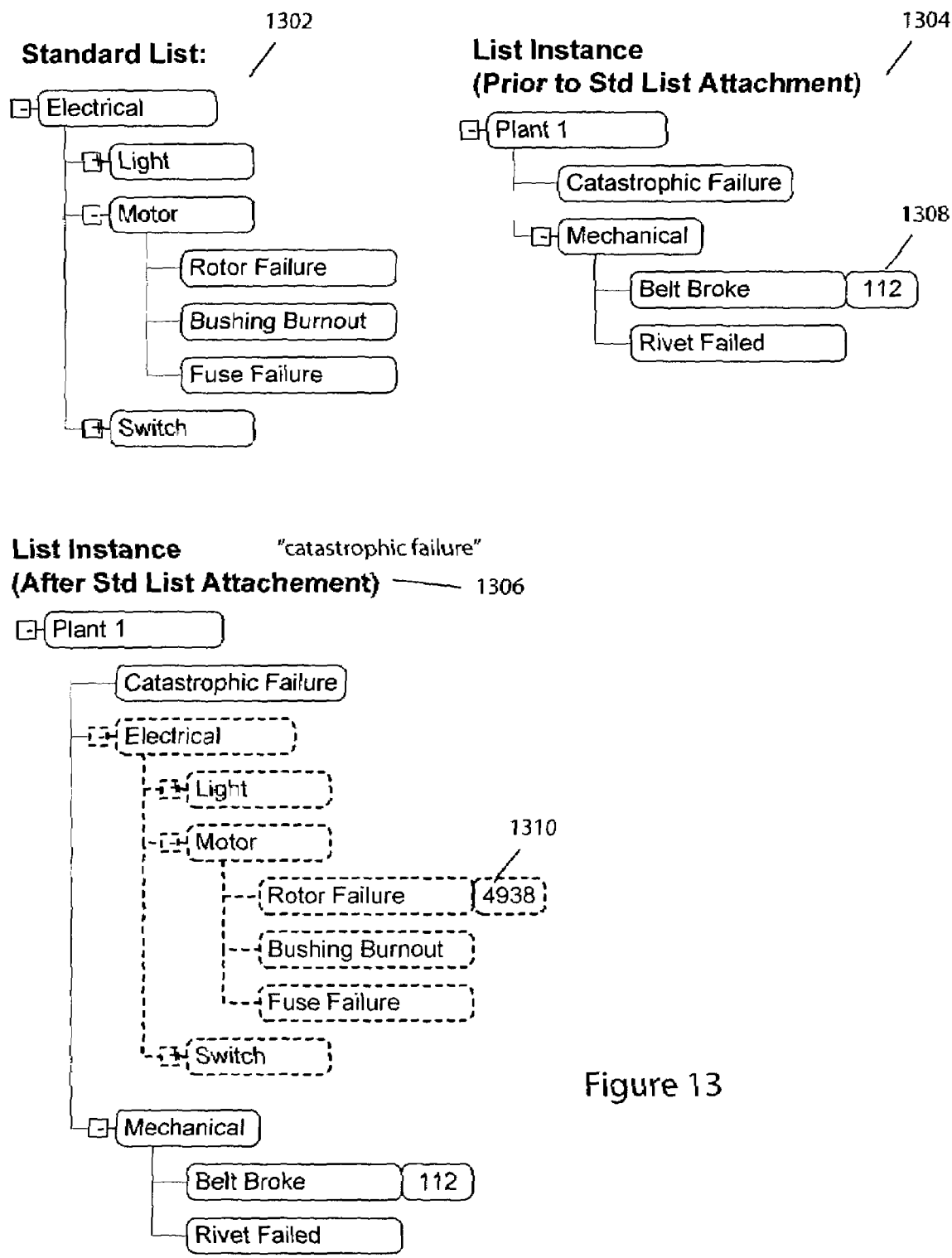
FIG. 13 illustrates a simplified standard List PDI of the type used in a system according to one practice of the invention.

Jump points, elements 1308 and 1310 of FIG. 13, associated with the List PDIs that can be seen from FIG. 11 (in brackets). These jump points are globally unique to the database and allow easy navigation to the exact node they reference. The node does not require a jump point though so level names must be unique for each list PDI. Each list PDI can have a different tree. In the illustrated embodiment, the entire tree is not stored with the tag, just the final location. In order to set the list PDI, a user is presented with a list in order to make a choice as to which node the list PDI is going to point to. In the illustrated embodiment, this is handled by a List Manager.

Figure 10:
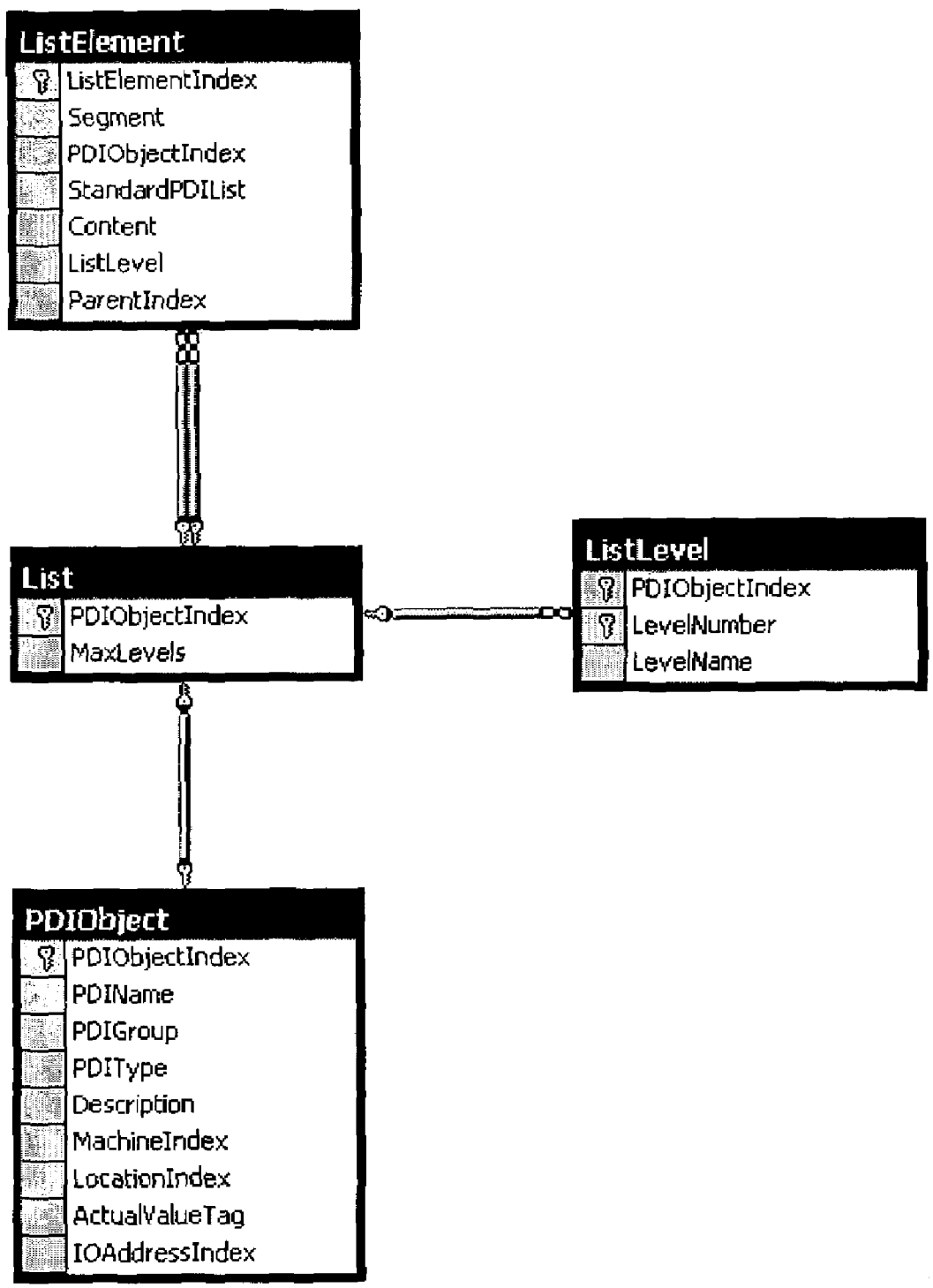
FIG. 10 depicts a database structure supporting List PDIs in a system according to one practice of the invention.

Note from FIG. 10, than any list node (ListElement Table) can have a ParentIndex. This parent index points to another node in the ListElement table, which is where the circular reference is used.

Figure 12:
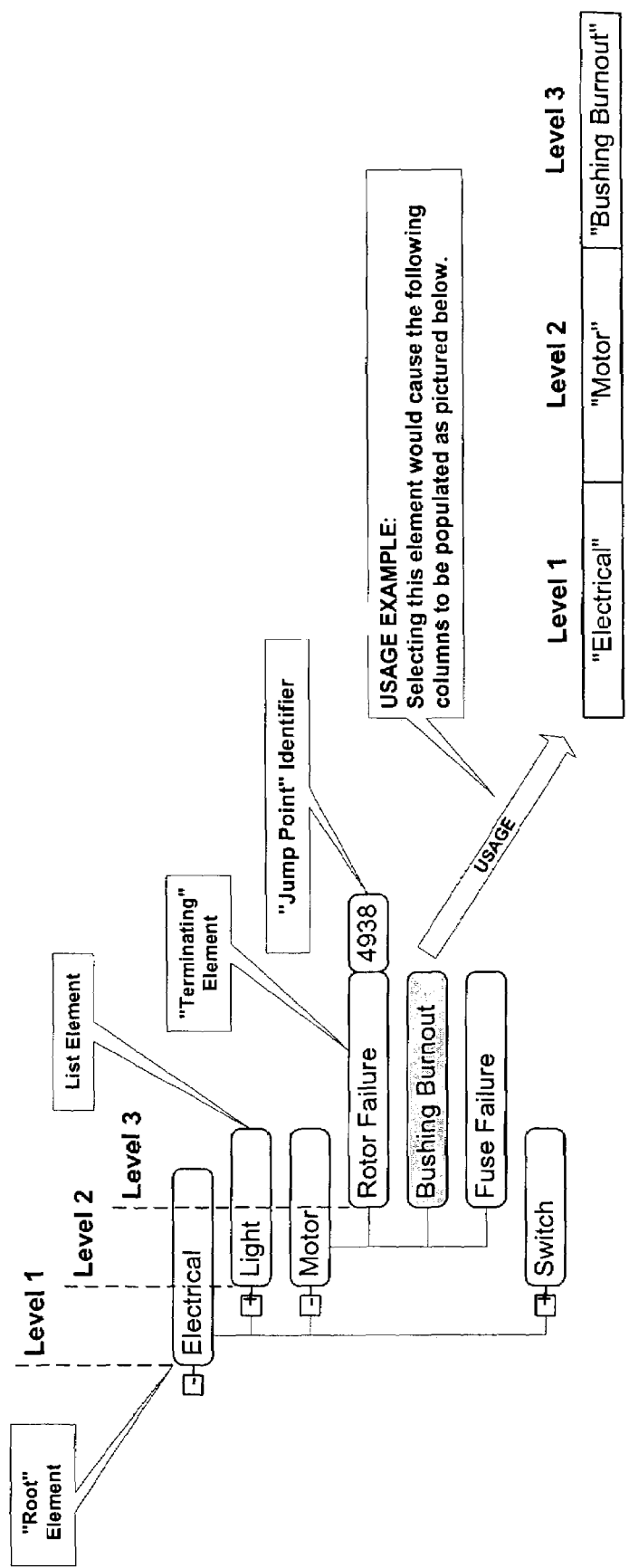
FIG. 12 depicts the anatomy of a List PDI in a system according to one practice of the invention.

The anatomy of a list PDI is illustrated by FIG. 12. As suggested there, every list in the illustrated embodiment has one and only one "Root" element. In the illustrated embodiment, during runtime, a user can only select a "Terminating" element. "Jump Point" identifiers are preferably unique across the entire system since they indicate both a list and a location within that specific list.

FIG. 13 illustrates a simplified standard list PDI 1302 of the type used in a system according to the invention. Standard PDIs, like 1302, are a subclass of PDIs that group general properties together, serving as templates for individual PDIs or instances.

The illustrated PDI defines a hierarchical relationship between the term "electrical" and the terms "light," "motor," and "switch," as illustrated. It further defines a hierarchical relationship between the term "motor" and the terms "rotor failure," "bushing burnout" and "fuse failure." Such a PDI can be used to reflect a real-world (or other) relationship, for example, between the electrical system of a hypothetical plant or control system and its major constitutents, to wit, the light, motor and switch. It can likewise reflect, to continue the example, modes of failure of those constituents—here, rotor failure or bushing burnout of the motor. In practice, a standard PDI may include more nodes than illustrated PDI 1302.

PDI instances can be created ad hoc as illustrated by element 1304. This PDI defines a hierarchical relationship between the term "plant 1" and the terms "catastrophic failure" and "mechanical." It further defines a hierarchical relationship between the term "mechanical" and terms "belt broke" and "rivet failed." Such a PDI can be used to reflect a real-world (or other) relationship, for example, between a plant (here, "plant 1") or control system and its the failure modes (here, "mechanical" and "catastrophic failure"). It can further reflect, to continue the example, the causes of those failures (here, "belt broke" or "rivet failed" as types of mechanical failure). Again, in practice, a standard PDI may include more nodes than illustrated PDI 1302.

PDI instances can also contain or be created (solely or otherwise) from standard PDIs, as illustrated by element 1306. This PDI 1306 combines the hierarchical relationship defined in 1302 and 1304 as indicated in the drawing. For convenient viewing, the relationships taken from standard PDI 1302 are indicated by dashed lines.

The illustrated PDIs 1304, 1306 further include jump points, designated 1308 (with a value "112") and 1810 (with a value "4938"). These are effectively short-cuts that permit the user to quickly identify an element in a potentially large or complex hierarchical list. For example, the value "112" can be used, e.g., when defining displays based on the list PDI 1304, as a reference (e.g., which can be quickly input by the user or system engineer) to plant 1/mechanical/belt broke node of list PDI 1304. Likewise, the value 4938 can be used as a reference to the plant 1/electrical/motor/rotor failure node of list PDI 1306.

The components and uses of list PDIs may be better understood by reference to the graphical user interface (GUI) screens/panels through which they are maintained in the illustrated embodiment. It will be appreciated that list PDIs in other embodiments may have components other than those shown here, and they may be maintained other than via the illustrated GUI screens. In the illustrated embodiment, three maintenance panels are provided. General (see FIG. 14A), List Definition (see FIG. 14B), and Dependencies (see FIG. 14C).

Figure 14A:
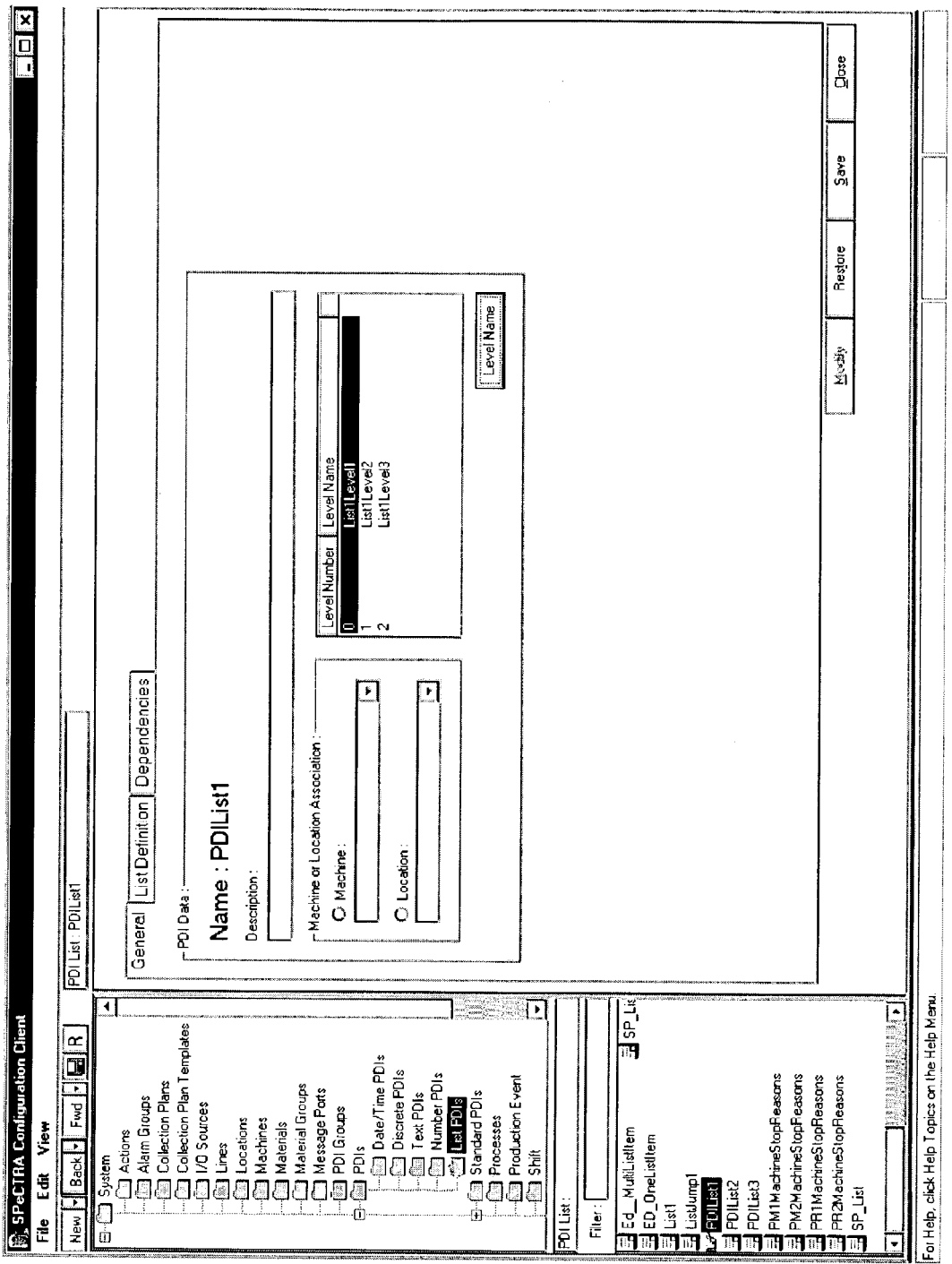
FIGS. 14A–14C depict graphical user interface screens used in connection with definition and maintenance of a List PDI in a system according to one practice the invention.

Referring to FIG. 14A, the General panel is used to maintain the name of the PDI, assign the machine or location for which data will be retrieved, and define general names for the levels created on the Level Definition screen.

The General panel includes the following fields:

| | |
|---|---|
| PDI Name | The PDI name is assigned when the PDI is created. |
| Description | A detailed description of the PDI. |
| Machine Association | Associate the listed PDI to an existing machine. The data processed is linked to the machine in all operations. List PDIs can be used to collect free-form comments about a machine from a Runtime user. |
| Location Association | Associate the list PDI to an existing location. The data processed is linked to the location in all operations. |
| Level Name | After lists and sublists of PDI text are created, the user can assign general labels to the levels. |

Figure 14B:
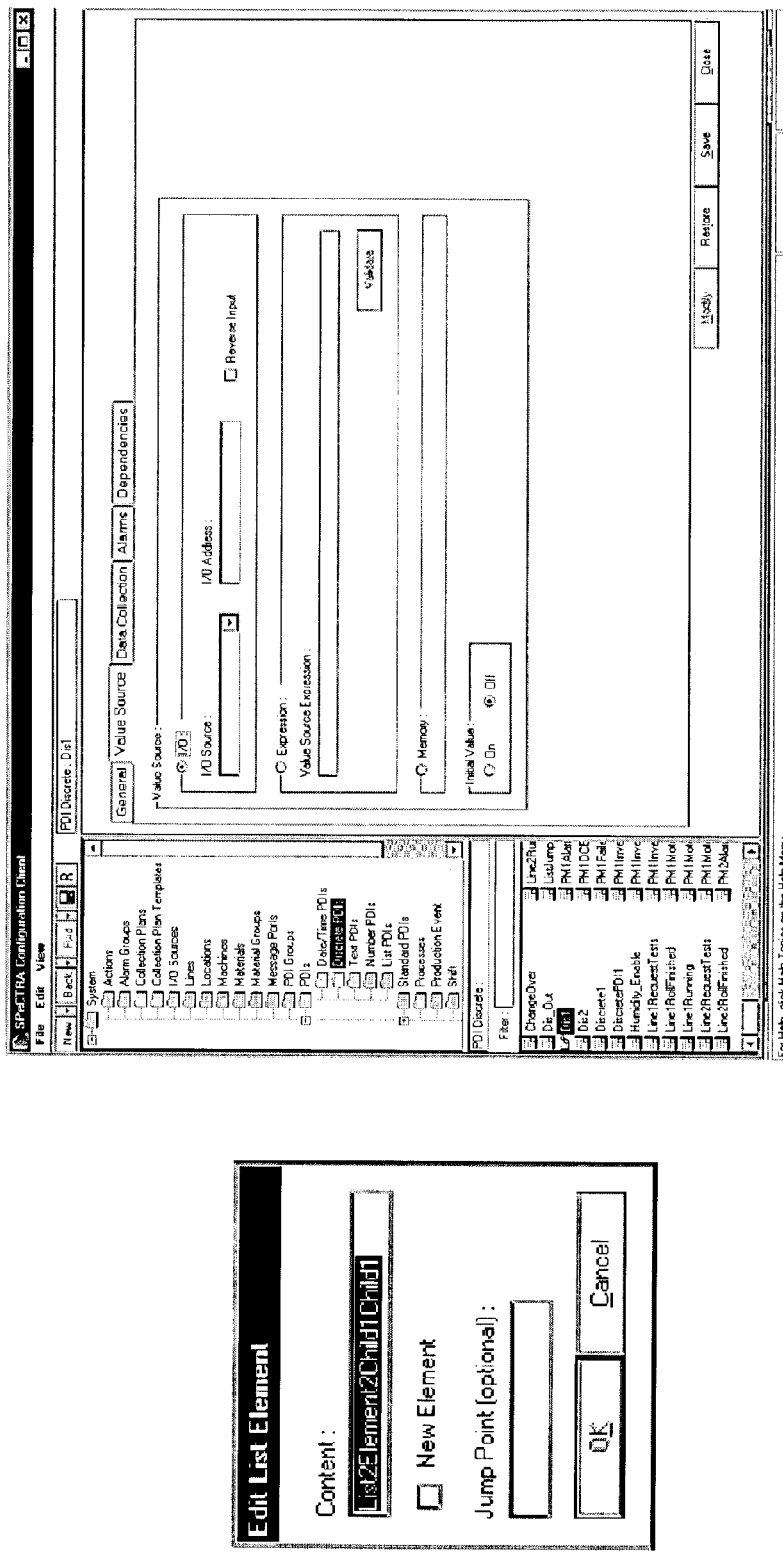

Referring to FIG. 14B, the List Definition window is used to assign the lists and sublists of elements. Lists of text elements are created in a tree formation (parent-child1-child2, etc.), with up to ten sub levels.

A right-click menu is available on the List Members table. After selecting an element, click the right mouse button to display a list of edit options: Add Element—to add a new element on the next sublevel below the selected element. Edit Element—to edit the details for the selected element. Remove Element—to remove the selected element. Move Up—to move the selected element above the previous element at the same level. Move Down—to move the selected element below the next element at the same level.

The List Definition panel includes the following fields:

| | |
|---|---|
| Standard List Templates | Copy all the elements from a Standard List PDI. |
| Existing List Elements | Shows all the current items available for the PDI. |
| Selected List Elements Table | Build a tree of up to ten levels of list PDIs. The name of the PDI is shown as the top (level). |
| Add Element | Referring to the Edit List Element dialog box of FIG. 12B, to add a new element, the user selects the element under which the element will be placed as a subelement. |
| Content | The element text. |
| New Element | Checkbox used to signify adding a new element. |
| Jump Point | A jump point allows the user to move quickly to the element on the list by typing the first letter(s) of the name. In the illustrated embodiment, jump points must be unique within the same list. |
| Edit Element | To change the settings for an element, click the element in the display table. Click Edit or use the right-click menu to access the Edit List Element window for the element. Change the text or jump point in the window as needed. |

Figure 14C:
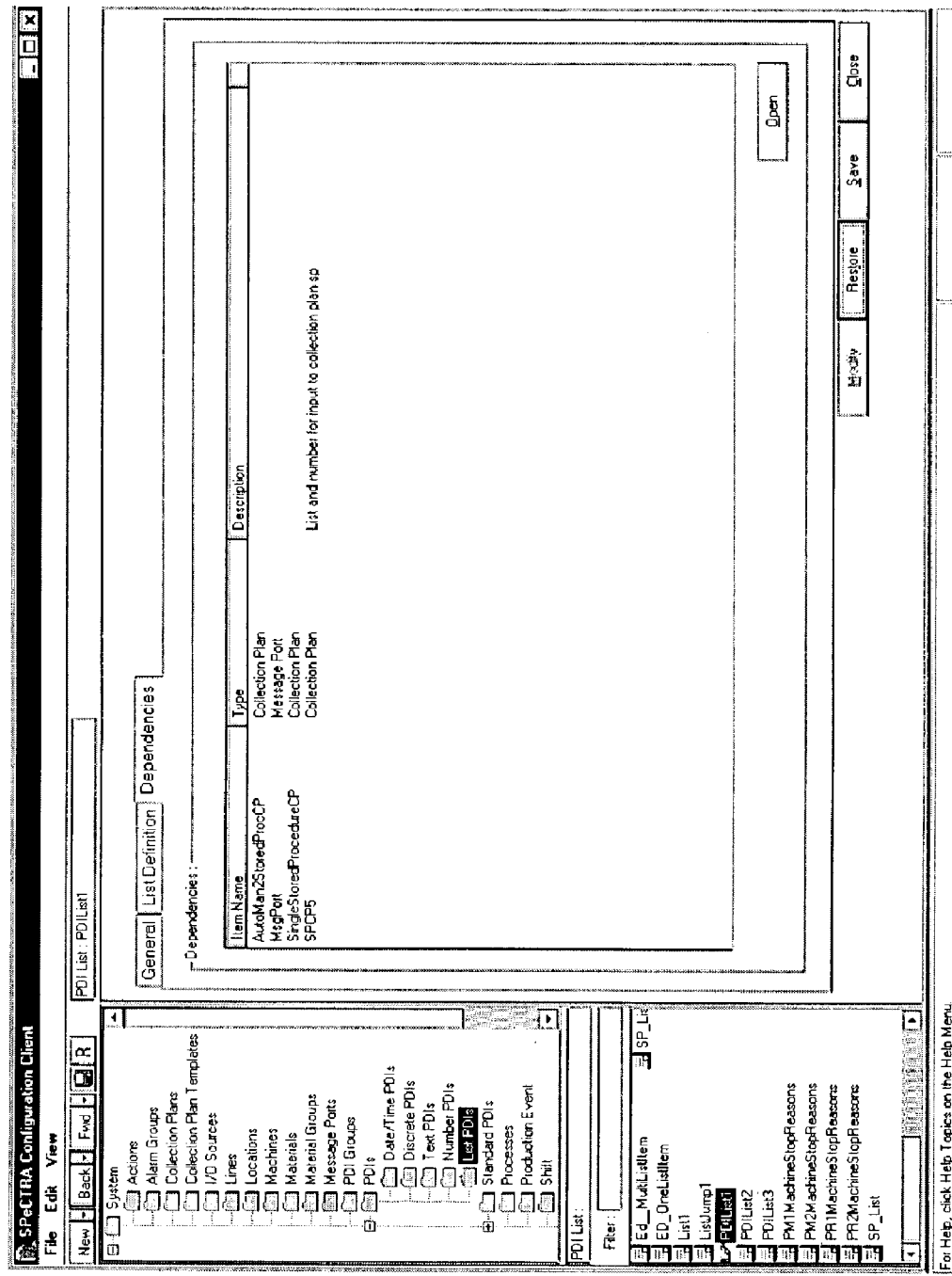

Referring to FIG. 14C, the Dependencies panel of the List PDIs maintenance screen displays all objects to which the PDI has been assigned.

List Manager API

In the illustrated embodiment, the list manager provides the functions described below.

INode

The INode interface is the connection to the Node object. Listed below are the Node object properties.

Get_DescIndex
Description: Retrieves the Description Index (StringID) of the Node.
Syntax: STDMETHODIMP get_DescIndex(long *pVal)
Parameters

| Input Parameter | Description |
|---|---|
| pVal | Returned Description of Index of node. |

Return Code

| Return Code | Description |
|---|---|
| HRESULT | Success or failure of property get. |

Get_Description
Description: Retrieves the Description (StringText) of the Node.
Syntax: STDMETHODIMP get_Description(BSTR *pVal)
Parameters

| Input Parameter | Description |
|---|---|
| pVal | Returned Description of node. |

Return Code

| Return Code | Description |
|---|---|
| HRESULT | Success or failure of property get. |

Get_IsTerminalNode
Description: Returns if the Node is a terminal node (leaf) of a list.
Syntax: STDMETHODIMP get_IsTerminalNode(VARIANT_BOOL *pVal)
Parameters

| Input Parameter | Description |
|---|---|
| pVal | Returns True if a terminal node, false otherwise. |

Return Code

| Return Code | Description |
|---|---|
| HRESULT | Success or failure of property get. |

Get_ListIndex
Description: Retrieves the List Index (ListElementIndex) of the Node.
Syntax: STDMETHODIMP get_ListIndex(long *pVal)
Parameters

| Input Parameter | Description |
|---|---|
| pVal | Returned List Index of node. |

Return Code

| Return Code | Description |
|---|---|
| HRESULT | Success or failure of property get. |

Get_PDIObjectIndex
Description: Retrieves the PDIObjectindex of the Node.
Syntax: STDMETHODIMP get_PDIObjectIndex(long *pVal)
Parameters

| Input Parameter | Description |
|---|---|
| pVal | Returned PDIObjectIndex of node. |

Return Code

| Return Code | Description |
|---|---|
| HRESULT | Success or failure of property get. |

INodes
The INodes interface is the connection to the Nodes collection object. Listed below are the Nodes object properties
Get_Count
Description: Retrieves the number of Node objects contained in the Nodes collection.
Syntax: STDMETHODIMP get_Count(long *pVal)
Parameters

| Input Parameter | Description |
|---|---|
| pVal | Returned count. |

Return Code

| Return Code | Description |
|---|---|
| HRESULT | Success or failure of property get. |

Get_Item
Description: Retrieves a specific Node object contained in a Nodes collection. The object can be returned with either a Listindex or a Description.
Syntax: STDMETHODIMP get_item(VARIANT vntIndex, INode **item)
Parameters

| Input Parameter | Description |
|---|---|
| vntIndex | Either a long (ListIndex) or a BSTR (Description) for the retrieval of the node. |
| item | The returned INode object. |

Return Code

| Return Code | Description |
|---|---|
| HRESULT | Success or failure of property get. |

GetDescriptionIndexVector
Description: Retrieves the first 10 StringIDs of a Nodes Collection for C++ implementations.
Syntax: STDMETHODIMP GetDescriptionIndexVector (long vals[10])
Parameters

| Input Parameter | Description |
|---|---|
| vals[10] | Returned array of StringIDs |

Return Code

| Return Code | Description |
|---|---|
| HRESULT | Success or failure of property get. |

INodeMgr
The INodeMgr interface is the link between the Node object, the Nodes collection and the database. The functions are listed below.
GetNode
Description: Returns a Node object given a valid StringID and LanguageID for the Node to return.
Syntax: STDMETHODIMP GetNode(long NStringID, long nLangID, INode **item)
Parameters

| Input Parameter | Description |
|---|---|
| nStringID | StringID of node to retrieve. |
| nLangID | Language ID |
| item | The returned INode object. |

Return Code

| Return Code | Description |
|---|---|
| HRESULT | Success or failure of property get. |

GetNodeElements
Description: Returns a Nodes collection of child nodes given a valid parent node.

Syntax: STDMETHODIMP GetNodeElements(INode * item, long nLangID, INodes **items)

Parameters

| Input Parameter | Description |
|---|---|
| item | Parent Node to retrieve children. |
| nLangID | Language ID |
| items | The returned INodes collection |

Return Code

| Return Code | Description |
|---|---|
| HRESULT | Success or failure of property get. |

GetNodePath

Description: Returns a Nodes collection of the path from a jump point to the parent node.

Syntax: STDMETHODIMP GetNodePath(long nJumpPoint, long nLangID, INodes **items)

Parameters

| Input Parameter | Description |
|---|---|
| nJumpPoint | Jump Point to retrieve path. |
| nLangID | Language ID |
| items | The returned INodes collection |

Return Code

| Return Code | Description |
|---|---|
| HRESULT | Success or failure of property get. |

GetPath

Description: Returns a Nodes collection of the path from a supplied node to the parent node.

Syntax: STDMETHODIMP GetNodePath(INode * item, long nLangID, INodes **items)

Parameters

| Input Parameter | Description |
|---|---|
| item | Node to retrieve path |
| nLangID | Language ID |
| items | The returned INodes collection |

Return Code

| Return Code | Description |
|---|---|
| HRESULT | Success or failure of property get. |

GetRootNodes

Description: Returns a Nodes collection of the Parent nodes of a specific PDIObjectIndex.

Syntax: STDMETHODIMP GetRootNodes(long nPDIObjectIndex, long nLangID, INodes **items)

Parameters

| Input Parameter | Description |
|---|---|
| nPDIObjectIndex | PDIObjectIndex of object to retrieve parent nodes |
| nlangID | Language ID |
| items | The returned INodes collection |

Return Code

| Return Code | Description |
|---|---|
| HRESULT | Success or failure of property get. |

List API Usage

Using the API described above, a list PDI class can be defined is generally indicated below:

```
class CListNode{
    // Jump Point identifier
    int m_iUserDefinedIndex;
    // Array of text for element
    // Array entries represent text for different locales.
    _bstr[] m_szElementText;
    // Index into StringConversion table
    int m_iElementTextIndex;
    // Is this a terminating node?
    bool m_bTerminating;
};
```

Such a class exposes the methods CListNodes GetChildElements(CListNode * pParentNode) and CListNodes GetPathElements(int iJumpPoint).

Examples of usage of exposed methods include the following:

1) cNodes=GetChildElements((CListNode *)NULL);
   Resulting "cNodes" Collection:

| cNodes ==> | "Electrical" |
|---|---|

2) Continuing the example from above, we make this subsequent call:
   cNodes=GetChildElements(cNodes[0]);

| cNodes ==> | "Light" |
|---|---|
| | "Motor" |
| | "Switch" |

3) cNodes=GetPathElements(2112);
   Resulting "cNodes" Collection:

| cNodes ==> | "Electrical" |
|---|---|
| | "Motor" |
| | "Bushing Burnout" |

In the illustrated embodiment, the configuration manager 18g manages process data items (PDIs). The configuration client allows the user to configure them. PDIs are supported through data maintained in the InTrack database 12b, including work-in-progress tracking and resource tracking, and represent tag in the aforementioned InTouch application. If any of the historization attributes are selected, the PDI also represents a tag in the aforementioned InSQL application. Once a tag is configured and saved, the interpreter 18d is executed which transfers the appropriate attributes to the InTouch tag database and InSQL database. The configuration client permits security groups, users and associated passwords to be created. Once the user information is saved, execution of the interpreter will transfer the security information to the aforementioned InTrack application.

Collection Plans

Collection plans are used to collect run-time data. They can be automatic, partially automatic, or manual. In the illustrated embodiment, automatic collection plans are evaluated by the action execution thread (see FIG. 7) and stored to the inTrack database 12b. Partially automatic and manual collection plans are transmitted to the run-time clients 18e, 18f for evaluation.

To that end, messages for those plans are sent via the common run-time client queue (see FIG. 7). Each collection plan is recorded as a single item of delivery. It is triggered on the node assigned in the Configuration Client. The Event Manager reads the incoming tag, and places the collection plan into the queue where it can be accessed from the Runtime Client. All computers assigned to the workstation group receive the collection plan. The collection plan appears on the task lists of the runtime clients 18e, 18f, where it can be accessed and completed. Depending on the set-up, the collection plan is generated after a certain amount of time, an action, certain measurement of units, etc., based on the triggers assigned to the collection plan or properties assigned to the PDI. If the tag is configured for SPC tags, SPC tags can generate an alarm. The Event Manager saves messages on the queue to the InTrack database along with the collection time.

The runtime clients 18e, 18f allows operators to enter data responsive to those messages for entry into the respective plans. Manual collection plans appear on task lists for assigned workstations associated with the run-time clients 18e, 18f. When opened, entry grids enable operators to enter information for each PDI in the collection plan. This data is stored in the databases. The illustrated embodiment also permits stored procedures to be included in collection plans: as the collection plans are opened and saved, additional activities such as calculations or communication with other resources can be executed.

Collection plans can be based on templates that serve as outlines or basic patterns. For example, if a user wishes to establish six different product quality tests with the same types of measurements, he or she can enter the basic collection items in a template. When individual collection plans are created from the template, the user assigns individual parameters to the measurements as needed. In the illustrated embodiment, collection plan templates are optional: the user can create individual collection plans without them.

In the illustrated embodiment, collection plans are a superset of InTrack data collection, that is, of the data collection maintained by the inTrack application 12a and stored in the associated database 12b. In this regard, the InTrack application 12a provides the mechanism to store and retrieve a time stamped series of user definable records and columns. (Of course, it will be appreciated that other functionality, standard in the art, proprietary or otherwise, could be used for this purpose in place of the InTrack application). The configuration manager and client permits the user to specify collection plan objects linking InTrack data collection items to PDIs (external data points) and expressions. They also allow the user to define specific items of information to be collected per location or machine. Collection plan actions can also be dropped into workflows.

When the user saves a collection plan and runs the interpreter 18d, the aforementioned automation server creates the data collection, using machine and location attributes available on the collection plan and other objects available within production engine. Specified attributes are created within the InTrack application 12a after running the interpreter 18d.

Once saved and interpreted, the engine executes workflows as they are triggered. When the collection plan action is executed the engine gathers the appropriate external data storing them to collection items, performs the configured calculations using other collection items and stores the values using calls to the data set object of the InTrack automation server.

The expression assignment capability is provided, in the illustrated embodiment, via the GEO application, though, other mechanisms standard in the art, proprietary or otherwise can be used instead or in addition. At runtime, each expression is evaluated, including the specified item parameters as input. The result is stored as the collection plan item specifying the expression.

The illustrated system also provides for "stored procedures in collection plans". These allows the user to insert one or more stored procedure calls into the collection plans. These stored procedures are executed using ADO. Each collection plan item, specified for use in the stored procedure, are loaded as parameters into the ADO object and the appropriate stored procedure is executed. All collection plan items are written to InTrack via the automation server once all items are evaluated.

Active Client Control

Described below is the ActiveClient control used by runtime clients 18e, 18f. according to one practice of the invention to create and edit collection plan records. The control is implemented into the runtime clients to allow users the ability to view queued items, as well as templates for creating new records. The control is also be defined to display archived collection plan records according to a user define query filter.

In the illustrated embodiment, two modes are defined for the user to view and edit collection plan records; "View" and "Edit". Three panels are defined to display to the user; the tasks available, the records associated to the selected task, and the selected task items for editing. A separate panel is defined to allow the user the ability to filter the returned collection plan records.

View Mode

Figure 15:

Referring to FIG. 15, this is the view the user sees in the illustrated embodiment when no edits are being performed. Collection plans are indicated at the top of the view panel, here, entitled Auto_All_Items and Man_All_Items. Depending on which is selected, here, the latter, the data collection tasks that make that plan up are indicated on the bottom of the view panel. Here, the tasks are identified by sample (or task) i.d., sample time, collection time, status, comments, superceded, and sample duration, among others. Queued plans are supplied via MSMQ. The displayed task list can be filtered or sorted, as desired by the user. Of course, in other embodiments different views, graphical or otherwise, may be presented.

Figure 16:
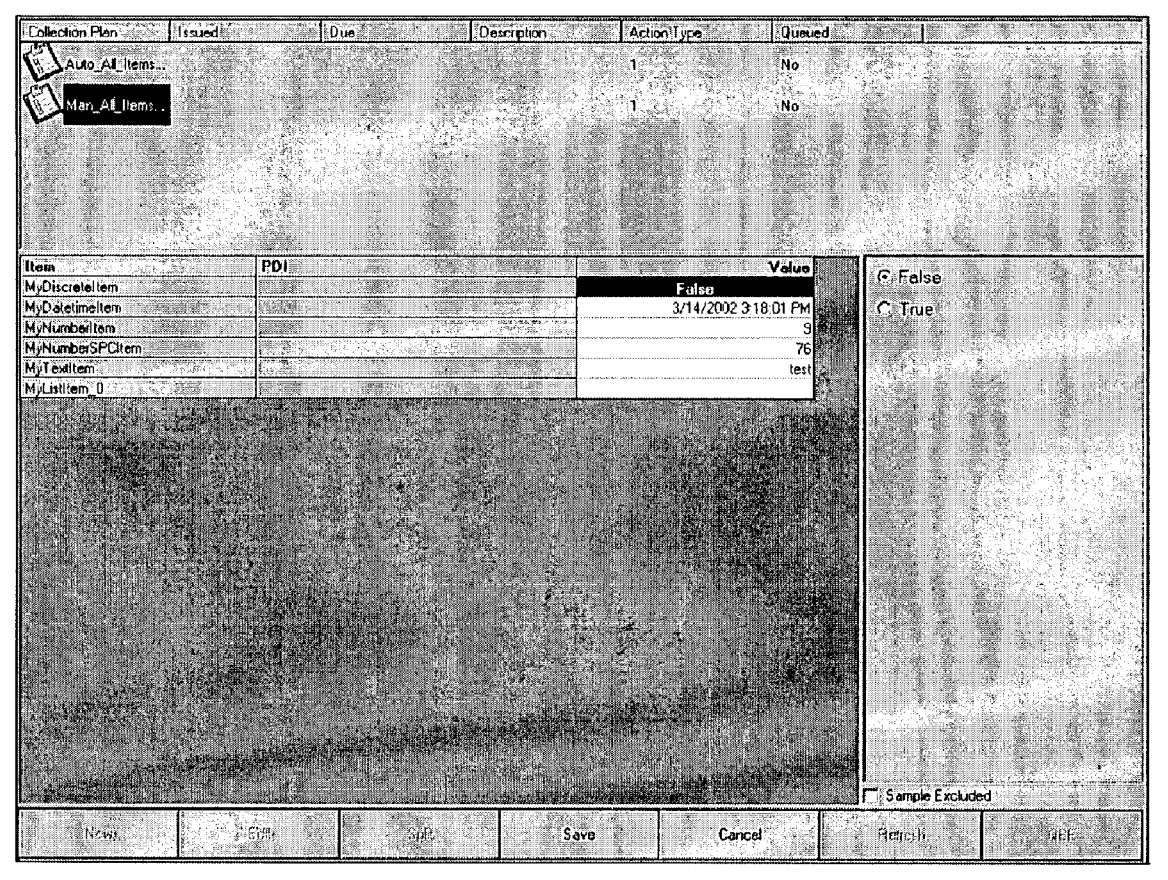

FIG. 16 depicts the view the user sees during edit mode of the illustrated embodiment. There are three types of edit mode:

New collection plan record from a template item
Edit collection plan record from a queued item
Edit collection plan record from an archived item New Collection Plan From a Template In the illustrated embodiment, entering edit mode through a template item creates a new collection plan record. This template supports automatic and manual items. Manual items require user input. A generic default value is stored initially into the field upon entering edit mode, unless a specific default value had been configured. Automatic items are populated by retrieving values from a tag server. If the tag server is not available, default values are used as with manual items. Automatic items are not editable by the user, unless they were defined as a datetime with the name of "SampleTime", or as a list item.

Edit Collection Plan Record From a Queue Item

Entering edit mode through a queued task item removes the item from the common message queue folder. This prevents all other configured users from accessing this item. This record is stored in a separate database table until all required items have been supplied by the user, and the task list displays this item as "InWork" with the use of a distinct icon. Upon completion of all required items, the task is removed from the task list, the stored record is removed, and the collection plan record status is updated to the appropriate status indicator.

Edit Collection Plan Record from an Archived Item

After a queued task has been completed, and the item has been removed from the task list, the user can still edit the record by way of the Collection Plan Samples grid (defined below).

Collection Plan Samples

A grid is defined to display all collection plan records according to the user defined query criteria. This is performed when the user configures the QBE, and by selecting a task in the task list. All configured data items within the collection plan record are supplied in the grid, as well as all relevant base InTrack table items: such as Status, SampleTime, SampleID, etc. During edit mode, manual and automatic items have specific characteristics. The following section describes the characteristics.

Automatic Items

Upon entering edit mode, automatic items are populated with the values from the tag server only when the user has selected a collection plan template for creating a new record. Otherwise, the Event Manager supplies the automatic items through a queued collection plan record to the client, or previously by a client creating a new sample through a template. In the illustrated embodiment, after the record has been created and saved, no automatic items are editable, except for the following: collection plan items configured as a Datetime item, and configured with the item name "SampleTime" and any list item.

Manual Items

Upon entering edit mode, any manual item is made available for editing. This is true for new records, queued records, or archive records.

Data Types

In the illustrated embodiment, a collection plan can include the following data types:

Date/Time

In the illustrated embodiment, a datetime PDI (or tag) is defined as an item to represent a date and time value. Datetime items can be configured with a default value representing any valid date and time.

Discrete

In the illustrated embodiment, a discrete PDI (or tag) is defined as an item to represent a "True" or "False" condition. This value can be displayed with a textual value such as "On" or "Off", as well as any other desired combination. Discrete items can be configured with a default value representing either a "True" of "False" value.

List Items

As evident in the discussion above, a list PDI (or tag) is an item that stores a position in a hierarchical tree. In the illustrated embodiment, the tree in the database schema is a circular reference (references itself) so that it can be easier to store in the database.

Numeric

In the illustrated embodiment, a numeric PDI (or tag) is defined as an item to represent any valid numeric value. Numeric items can be configured with a default value representing any valid numeric value.

Stored Procedure

Figure 17:
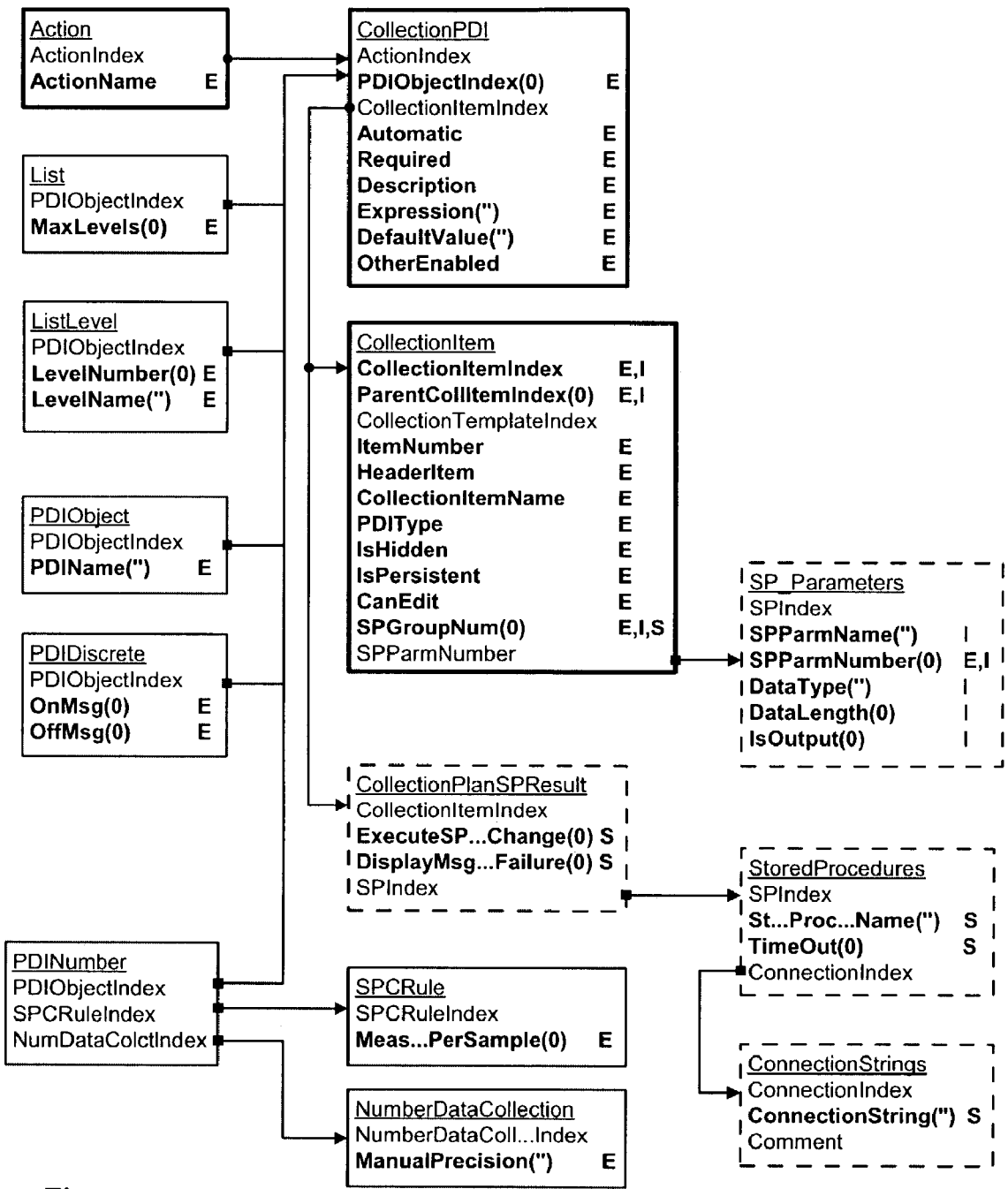
FIG. 17 illustrates a relationship among classes defining the production support database and those defining stored procedure items in a system according to one practice of the invention.

In the illustrated embodiment, a stored procedure PDI (or tag) is defined as an item to represent any valid stored procedure interface. This item allows the user to supply information to return further information through a stored procedure. FIG. 17 illustrates a relationship among classes defining the production support database 18b" and those defining stored procedure items stored procedure items (identified by dashed lines). Items in the drawing shown in boldface type are returned in the stored procedure. Nullable items are returned as zero for null string, as appropriate. Edit classes are designated with an E; stored procedure item classes with a I; and stored procedure classes with a S.

Text

In the illustrated embodiment, a text PDI (or tag) is defined as an item to represent a textual value. Text items can be configured with a default value representing any value.

Collection Plan Execution Implementation

Event Manager

In the illustrated embodiment, the event manager and runtime client (RTC) nodes work together to create collection plan data. Initially, the collection plan initiated. If it is an automatic collection plan then the RTC has no interaction. If it is a manual collection plan then the RTC supplies Event Manager with some or all of the collection plan data. To initiate the collection plan, a trigger is required. The collection plan is either a manual or automatic collection plan as described below.

Automatic Collection Plan

When the trigger is fired, the event manager fills in the data for the collection plan. This is saved using one of the control applications 12–16 and, specifically, in the illustrated embodiment, the data collection method of the aforementioned InTrack application (though, it will be appreciated, that data collection methods of other control applications, industry standard, proprietary or otherwise, may be used in addition or instead).

Manual Collection Plan

First, the event manager fills what data it can in the collection plan with the automatically collected items and then calls the InTrack (or, as indicated in the prior paragraph, other application) data collect method. In the illustrated embodiment, a message is sent to the Microsoft Message Queue server with the data in a ADO recordset. This message is directed to one or more real time clients (RTC).

The RTC(s) read(s) this message and the user fills in some or all of the data for the collection plan. This data is then sent back to Event Manager via another message. Event Manager calls as method from the DSSManager which updates the previous InTrack data collection data using InTrack's data collection supercede.

Collection Plan Stored Procedures

Stored procedures are fully operable for both collection plans and actions in the illustrated system. Entry options in the configuration client to enable fast entry of connection information and stored procedure parameters and commands.

Stored procedures are activated series of commands that are triggered when a collection plan or action is conducted in Runtime. Trigger conditions determine if and when the stored procedure is activated. Stored procedures can be used to:

Generate displays of numerical values or text to operators.
Calculate numerical values from ongoing measurements (PDIs) for display during Runtime, storage in the database, or download to PLCs.
Perform comparisons of multiple data inputs to generate results that may trigger additional activities, such as value conversion (English/metric), storage of data in multiple databases, or generation of PDIs to control a PLC or machine. In addition, stored procedures can be nested so that multiple stored procedures are activated in tandem within the same collection plan. A stored procedure can generate an output value that will be used immediately as an input value in a second stored procedure. Collection plan stored procedures supports a variety of SQL data types:

Configuration Entry Screens

Entry screens and display windows accommodate entry of stored procedure connection and command information. List windows enable selection and display of existing stored procedures. As stored procedure information is entered, default input and output item names are assigned automatically, selection options enable the configuration of items, and SQL script validation is performed. Entry screens have been standardized, enabling fast reference and selection of stored procedures activated by any combination of multiple collection plans and actions.

Collection Plan Template Maintenance Screen

Figure 18:
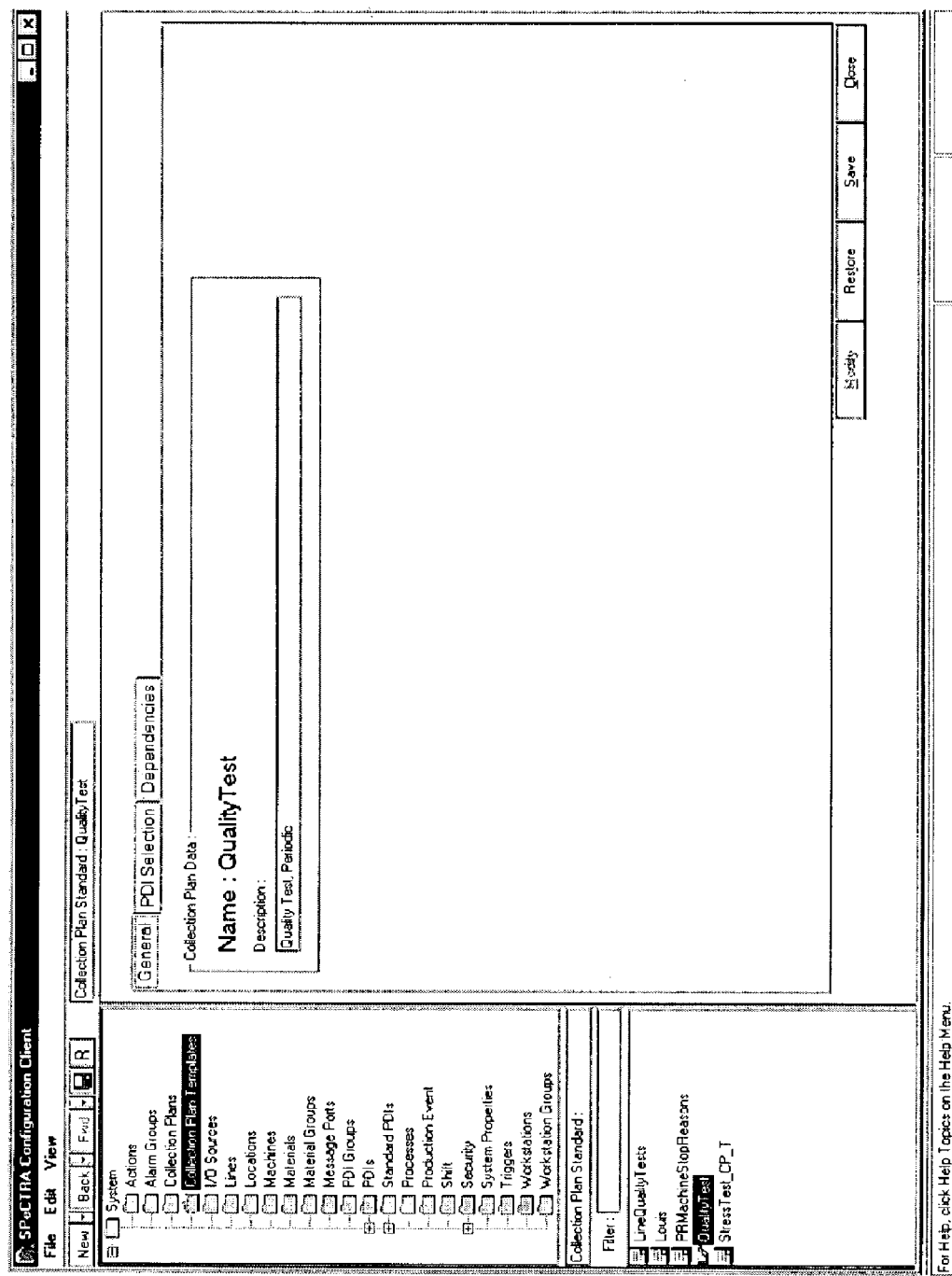
FIGS. 18–19 depict graphical user interface screens used in connection with collection plan template maintenance in a system according to one practice of the invention.
Figure 19:
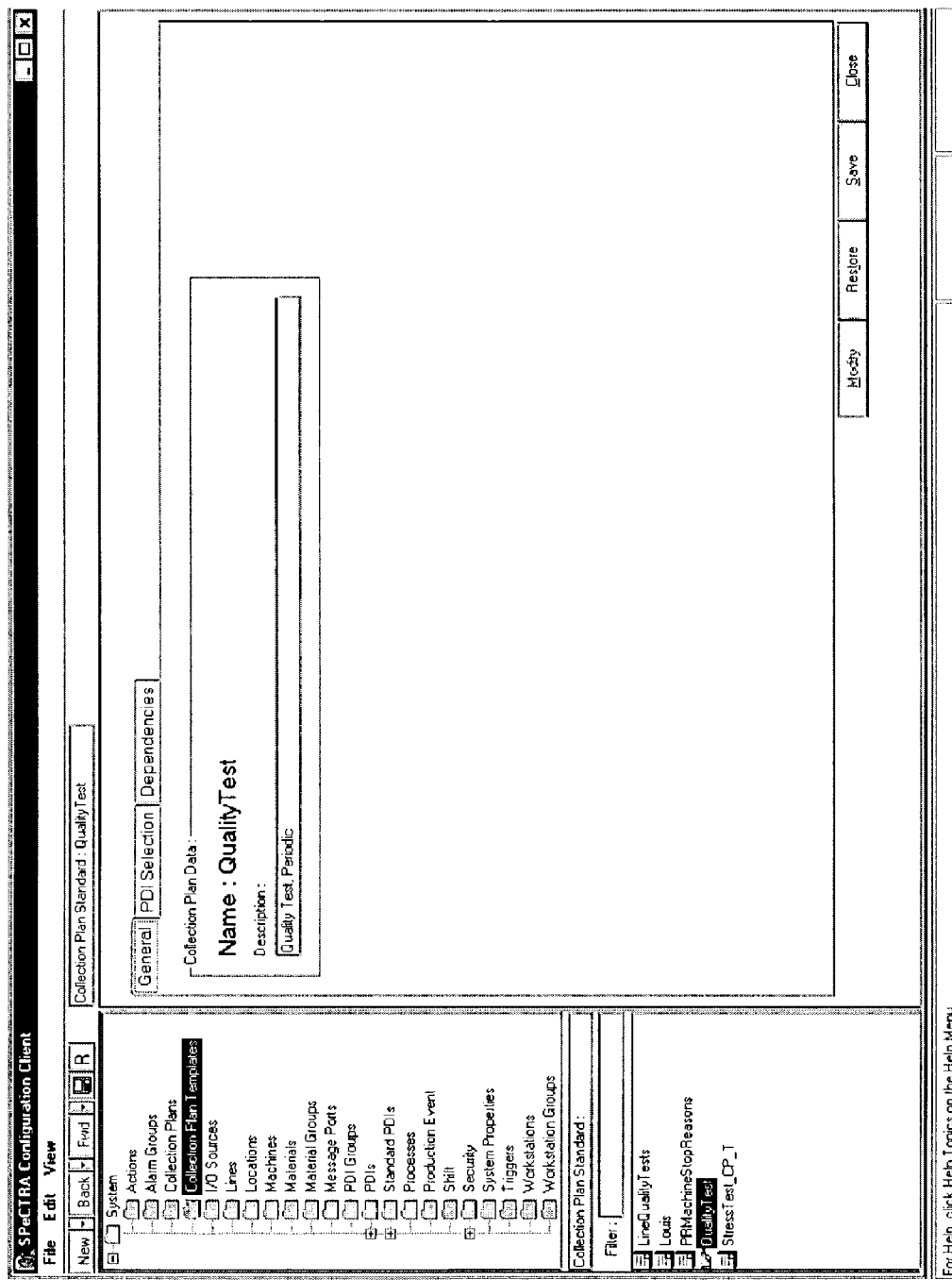
Figure 20:
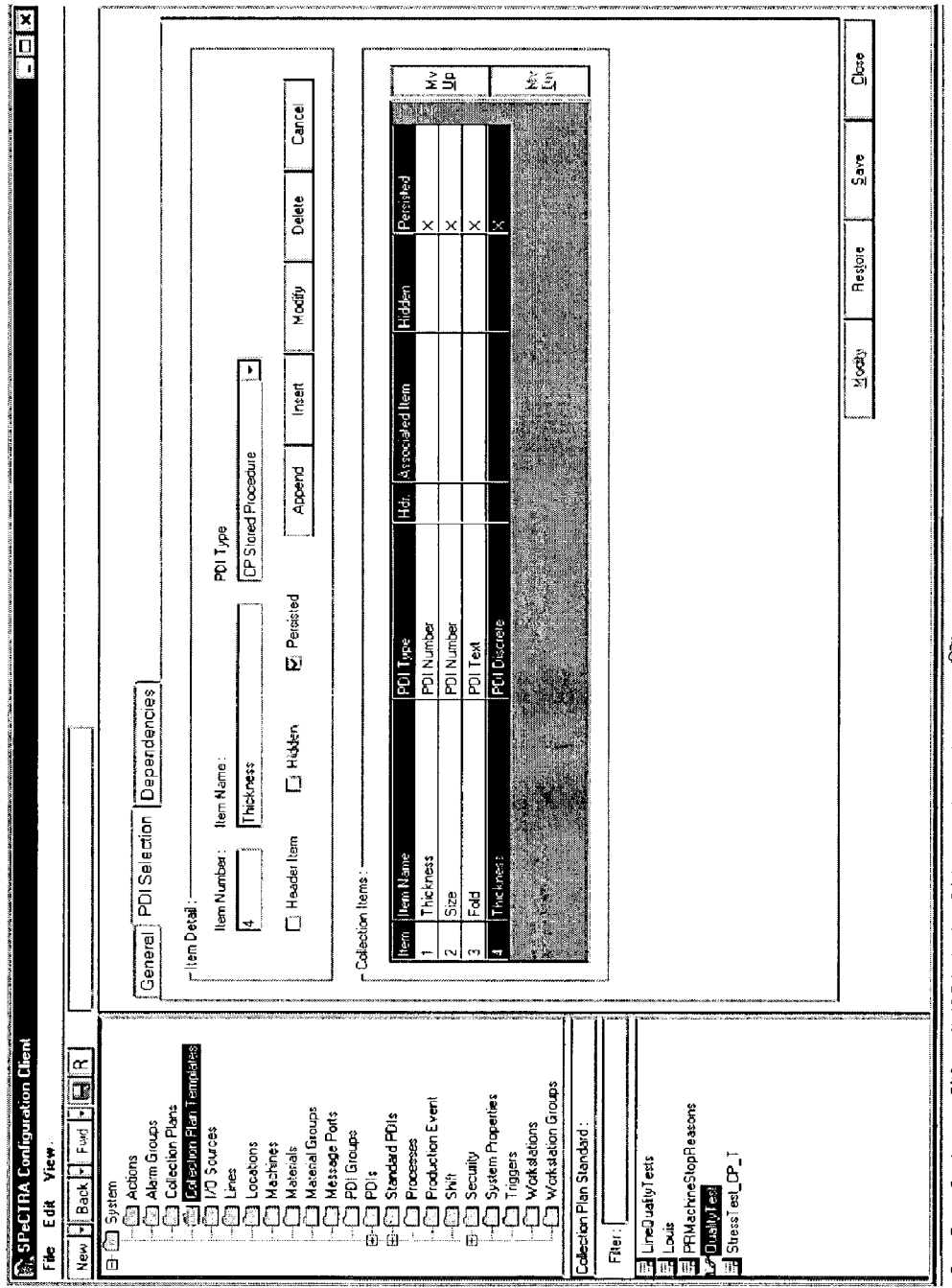
FIG. 20 depicts a graphical user interface screen used in connection with storing information about a PDI in a collection plan generated from the template in a system according to one practice of the invention.

In the illustrated embodiment, after a new collection plan template is selected for editing, a collection plan template maintenance screen appears. See, FIG. 18. The General panel is used to maintain the name and description of the collection plan template. An example of it is provided in FIG. 19. The PDI selection panel stores information about each PDI that appears as an entry field on collection plans generated from the template. See FIG. 20. This can be used to specify the type of PDI and basic information. The dependencies panel lists all objects that are dependent on the current collection plan template.

Config & ProdSupport Common Tables

The following tables are common to both the Configuration and Production Support databases in support of Collection Plans in the illustrated embodiment.

Action

In the illustrated embodiment, the Action table identifies Actions in the illustrated system. Actions may be one of several types indicated by the ActionType field.

| Field Name | Field Format | Field Description |
| --- | --- | --- |
| ActionIndex | Int NOT NULL (Primary Key) | Unique Index |
| ActionName | Varchar(30) NOT NULL (unique) | Name of Action |
| Description | Int NULL | Points to a multi-lingual text description of the Action, using StringConversion.StringID |
| ActionType | Tinyint NULL | Type of Action:<br>1 = Collection Plan<br>2 = Production Event<br>3 = Process Message (Msg Port)<br>4 = Expression<br>5 = E-mail<br>6 = SQL Statement |
| SecurityType | Int NULL | Describes the type of security check done for operators executing the action (Used for CollectionPLans and Production Events mainly)<br>1 = Use Login UserID<br>2 = Always prompt user for UserID/Password check (every transaction) |

CollectionItem

In the illustrated embodiment, this table identifies individual items to be collected as part of a Collection Template. Each item identifies a "slot" in the collection plan. Multiple collection plans may share the same Collection Template and therefore the same set of CollectionItems.

| Field Name | Field Format | Field Description |
| --- | --- | --- |
| CollectionItemIndex | Int NOT NULL (PK) | Unique Index |
| CollectionTemplateIndex | Int NOT NULL | FK to CollectionTemplate |
| ItemNumber | In NOT NULL | Unique within the template, this field orders the items sequentially |
| HeaderItem | Bit NOT NULL | TRUE when the item is in the Header section of the plan. |
| CollectionItemName | Varchar(30) NOT NULL | Unique within the template this names the columns used in the collection plan (used by InTrack |

-continued

| Field Name | Field Format | Field Description |
|---|---|---|
| | | to name the DataSet Items for the DS Template) |
| PDIType | Tinyint NOT NULL | Type of PDI (see PDIObject) |

CollectionPDI 10

In the illustrated embodiment, this table lists the specific PDIs that are mapped to CollectionItems for each Collection Plan.

| | | |
|---|---|---|
| CollectionItemIndex | Int NOT NULL (PK) | FK to CollectionItem |
| ActionIndex | Int NOT NULL (PK) | FK to CollectionPlan (Action) |
| PDIObjectIndex | Int NULL | FK to PDIObject identifies the PDI to map to the collection item for this collection plan |
| Automatic | Bit NOT NULL | TRUE when the PDI value is collected automatically by EventMgr. False means the value is manually collected by operator. |
| Required | Bit NOT NULL | TRUE when the operator is required to enter a value for this item. False means data entry is optional. |
| Description | Int NULL | Pointer to StringID in StringConversion table. Optionally describes the PDI/CollectionItem relationship. |
| Expression | Varchar(120) | Text expression to be used by Run-Time client for automatically filling in the item with the result of an expression based on values of other entered items. |
| DefaultValue | Varchar(30) NULL | Default value for the CollectionPDI when filled in by EventMgr, o when presented to operator for manual collection. This is a formatted float for numeric PDIs. |

CollectionPlan 40

In the illustrated embodiment, this table is 1:1 with Action where ActionType=1

| Field Name | Field Format | Field Description |
|---|---|---|
| ActionIndex | Int NOT NULL (PK) | FK to Action |
| CollectionTemplateIndex | Int NULL | FK to CollectionTemplate |
| PlanType | Int NULL | Type of Collection Plan:<br>1 = Manual<br>2 = Manual Standard<br>3 = Automatic<br>4 = Automatic Standard<br>5 = Combo<br>6 = Combo Standard |
| Lifecycle | Int NULL | Expiration time in minutes for the Collection plan to be fulfilled. |
| LocationIndex | Int NULL | FK to Location table. Optionally associates the Collection plan to a location. |
| MachineIndex | Int NULL | FK to Machine Table. Optionally associates the Collection plan to a machine. |

CollectionTemplate

| | | |
|---|---|---|
| CollectionTemplateIndex | Int NOT NULL (PK) | Unique Index |
| EstablishingStandard | Identifies the Collection plan (standard or non-standard) | A Collection Template is shared by all regular Cplans |

-continued

| Field Name | Field Format | Field Description |
|---|---|---|
| | which created the CollectionTemplate | linked to a standard. This field identifies which Cplan is the standard that created it. It also identifies the regular Cplan when it is independently configured (does not use a standard) |

ControlItem

This table identifies target and limit sets by PDI, Product Group, and Effective date.

| Field Name | Field Format | Field Description |
|---|---|---|
| ControlSetIndex | Int NOT NULL (PK) | FK to ControlSet |
| EffectivityDate | Datetime NOT NULL (PK) | Date the target and limit set is to take effect. |
| MaterialGroupIndex | Int NOT NULL (PK) | FK to MaterialGroup. Identifies the Material (Product) Group for the target/limit set. |
| Description | Int NULL | Pointer to StringID in the StringConversion table. |
| Target | Float NOT NULL | The target value for SPC analysis |
| CL | Float NOT NULL | The Control Limit mean for SPC analysis |
| USL | Float NOT NULL | Upper Specification Limit |
| UCL | Float NOT NULL | Upper Control Limit |
| LCL | Float NOT NULL | Lower Control Limit |
| LSL | Float NOT NULL | Lower Specification Limit |
| Rmean | Float NULL | Expected mean value for Range |
| RUCL | Float NULL | Upper Control Limit on Range |
| RLCL | Float NULL | Lower Control Limit on Range |

ControlSet

In the illustrated embodiment, the table groups the target and limit sets given by the ControlItem table into sets for standardization. Every PDI for SPC analysis has a ControlSet. This can be standardized so that several PDI may share the same control set.

| Field Name | Field Format | Field Description |
|---|---|---|
| ControlSetIndex | Int NOT NULL (PK) | Unique Index |
| EstablishingStandard | Int NULL | Identifies the PDI |

UI Messaging

The UI Messaging mechanism of the illustrated embodiment provides for definition of a user interface—i.e., prompts, questions, text/list/combo boxes, and so forth—through which information is presented to, and accepted from, the operator, e.g., via real-time clients 18e, 18f and via applications 12–16 which understand the UI message format. The UI mechanism also provides the ability to associate elements of the presented user interface with variables (e.g., PDIs) in the system 18, as well as the ability to programmatically extract user-entered results from the UI Message for use in other parts of the execution context, e.g., as workflow variables.

Figure 28:
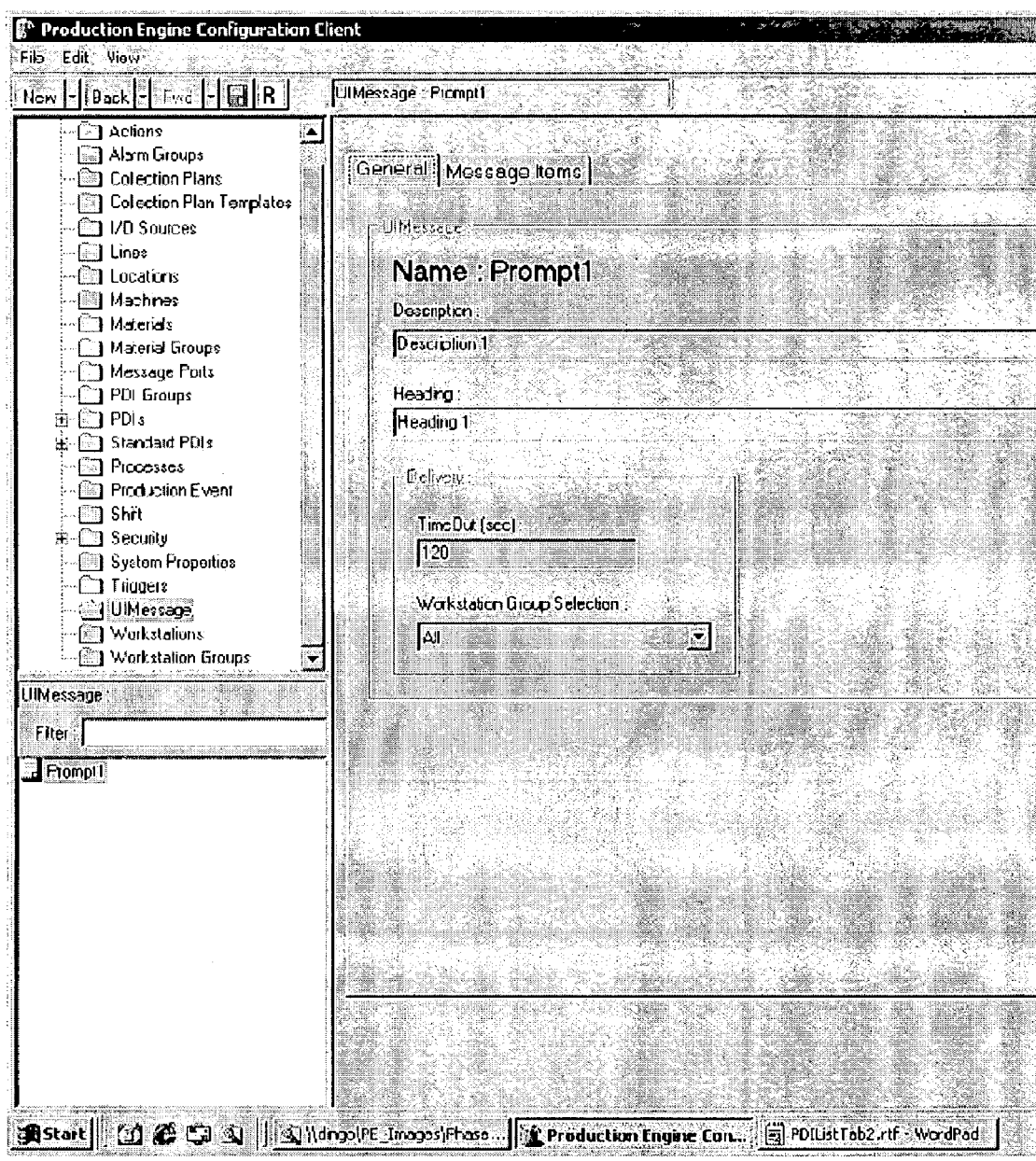
FIGS. 28–29 depict graphical user interface screens used in connection with user interface (UI) message definition in a system according to one practice the invention.
Figure 29:
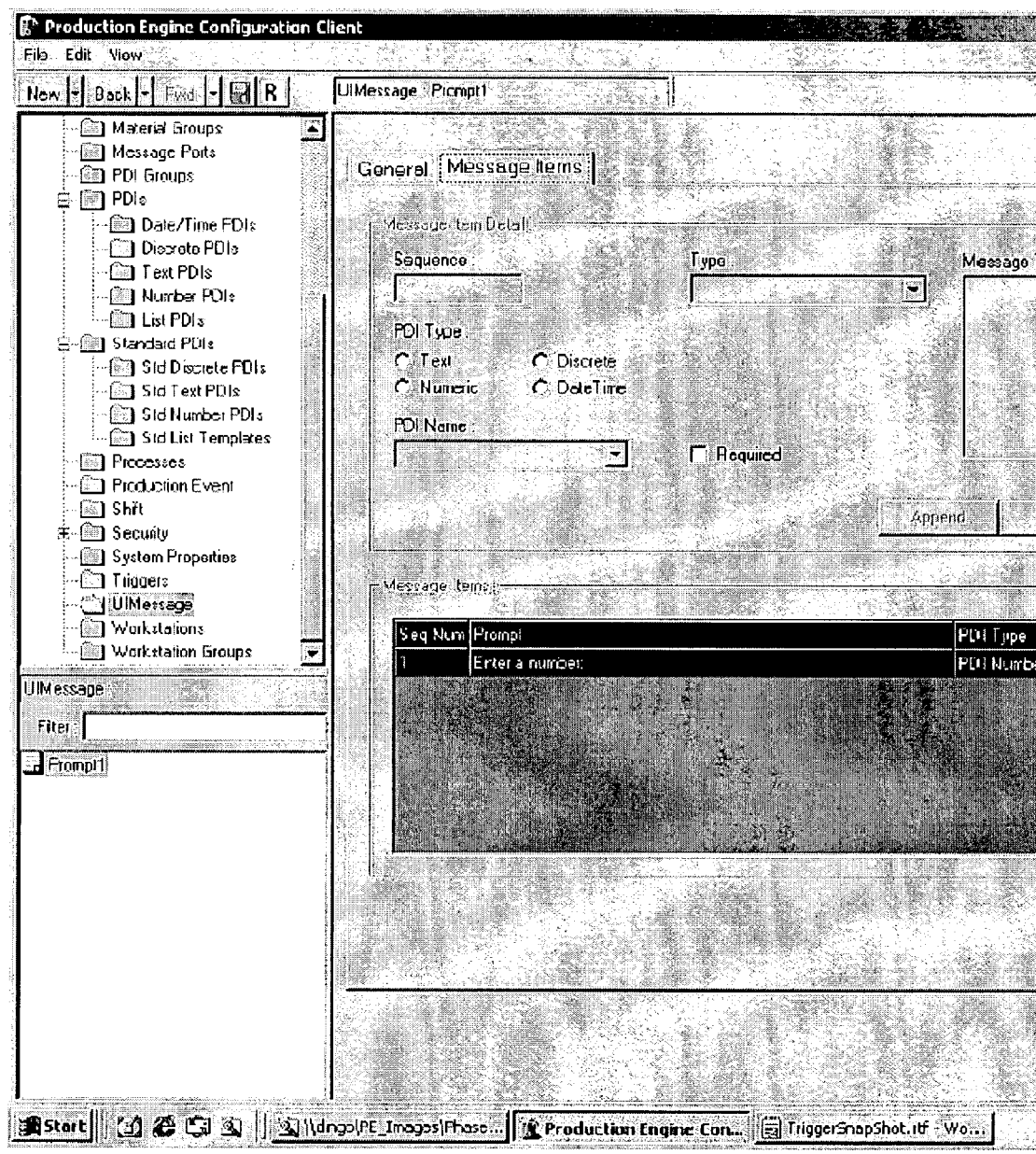

Configuration of UI Messages is accomplished using the configuration client, e.g., database 18b and editor 18c. The configuration client of the illustrated embodiment utilizes displays as shown in FIGS. 28–29 for this purpose. Referring to FIG. 28, a screen such as shown there is used in the illustrated embodiment to permit general definition of a UI message—here, a message named PROMPT1, with a description DESCRIPTION1, heading HEADING1, a timeout of 120 seconds, and workstation specifier of ALL. Of course, in practice more descriptive terms are likely to be used for each of the description and heading fields, as well as for the message name. The timeout period, shown here as defaulting to 120 seconds, specifies the period after which the message will be returned to the queue and removed, if the operator fails to open the message. The workstation specifier indicates on which workstations the message is valid.

Referring to FIG. 29, a screen such as shown there, provides for definition of the message items that make up the UI message. Depending upon implementation and on the demands of the workflows that invoke the UI message actions, each message item can be treated as a separate UI message; alternatively, groups of one or more message items can be so treated. Shown here is a first message (Seq. Num. 1), with a prompt "Enter number," for entering a value into a specified number-type PDI. One or more of these messages can be identified as "required," as indicated by the checkbox field, also shown in the drawing. Those skilled in the art will appreciate that FIGS. 28–29 are merely examples of interfaces that permit a design or configuration engineer to specify a UI message in a system according to the invention.

The configuration client stores data that makes up a UI Message in three tables in the configuration database 18b:

UIMessage
UIMessageTransforms
UIMessageItems

These tables are created via an SQL commands as follows, though it will be appreciated that such tables may be created elsewise and that they may be represented, instead or in addition, by structures other than tables (e.g., hierarchical databases, linked lists, objects or object databases, and so forth). It will also be appreciated that the fields other than those shown in the following SQL commands may be used in the tables instead or in addition.

```
CREATE TABLE UIMessage
{
    ActionIndex          int NOT NULL,
    Heading              varchar(256) NULL,
```

```
        -continued
Timeout              long NOT NULL,
UITransformIndex     int NOT NULL,
PRIMARY KEY          (ActionIndex),
FOREIGN KEY          (ActionIndex)
REFERENCES           Action
FOREIGN KEY          (UITransformIndex)
REFERENCE            UIMessageTransforms
}
CREATE TABLE UIMessageTransforms
{
    UITransformIndex     int NOT NULL,
    UIStyle              text NOT NULL,
    PRIMARY KEY          (UITransformIndex)
}
CREATE TABLE UIMessageItems
(
    ActionIndex          int NOT NULL,
    SequenceNumber       int NOT NULL,
    Message              varchar(256) NOT NULL,
    PDIObjectIndex       int NULL,
    UIType               int NOT NULL,
    Required             bit,
    PRIMARY KEY          (ActionIndex, SequenceNumber),
    FOREIGN  KEY         (ActionIndex)
    REFERENCES           UserPrompt,
    FOREIGN KEY          (PDIObjectIndex)
    REFERENCES           PDIObject
)
```

The data in the respective UIMessage tables is moved into the runtime execution environment when the interpreter 18*d* is executed. At that point, all UI Message data available in the production support database 18*b*", using an identical schema to that shown above.

Figure 30:
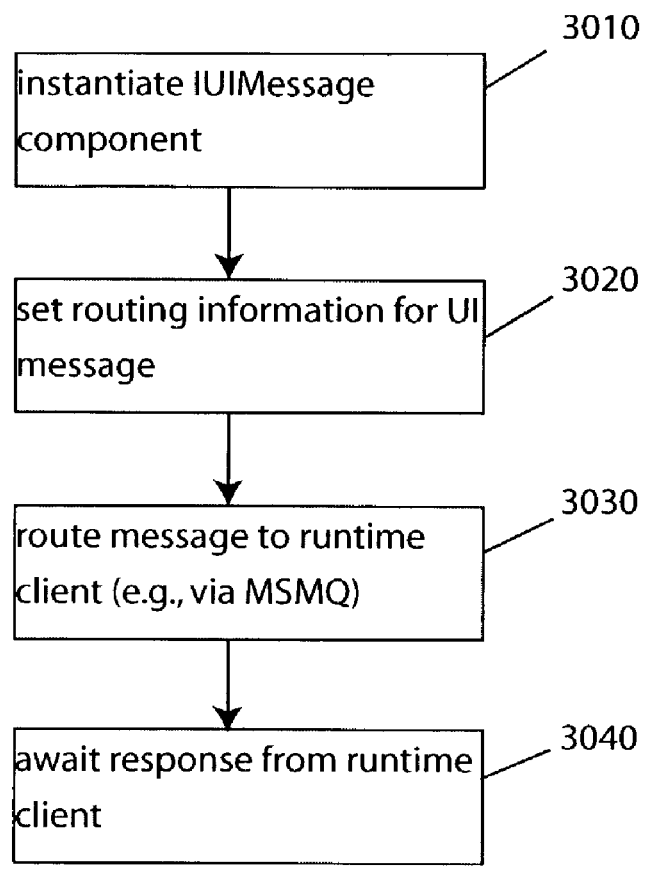
FIG. 30 is a flowchart depicting step involved in execution of a UI Message action in a system according to one practice of the invention.

In the illustrated embodiment, UI Messages are implemented as actions; hence, all activity on them is initiated by the Event Manager. A UI Message "action" may be part of a workflow and/or otherwise associated with a data change event, an alarm event, a scheduled event, or otherwise. FIG. 30 depicts the sequence executed in the illustrated embodiment when such a UI Message action is executed in response to occurrence of the corresponding event.

A IUIMessage component is provided by the system to facilitate processing of UI Messages by the AET and by the runtime clients. The IUIMessage component is a DLL which provides the following interface and which has the following functionality.

```
interface IUIMessage {
//    METHODS:
// load from Production Support tables into internal format
HRESULT Load (CComBSTR& ConnString);
// convert entire UIMessage to XML format
HRESULT ToXML (BSTR* Message);
// convert entire UIMessage from XML format
HRESULT FromXML (BSTR Message);
// get/set Result Value data
HRESULT SetResultValue (BSTR Name, VARIANT Value);
HRESULT GetResultValue (BSTR Name, VARIANT* Value);
// get/set Body element sub-tree
HRESULT GetBody (BSTR* Body);
HRESULT SetBody (BSTR Body);
// get/set Routing data
HRESULT GetRoutingOrigin (BSTR* Type, BSTR* Origin);
HRESULT SetRoutingOrigin (BSTR Type, BSTR Origin);
HRESULT GetRoutingDestination (BSTR* Type, BSTR* Destination);
HRESULT SetRoutingDestination (BSTR Type, BSTR Destination);
HRESULT GetRoutingException (BSTR* Type, BSTR* Exception);
HRESULT SetRoutingException (BSTR Type, BSTR Exception);
// send UIMessage w/ result values to DestinationRoute
HRESULT SendResults ( ); }
```

A corresponding IUIMessageDisplay component is an active template library (ATL) HTML-based control. The UIMessageDisplay is an ActiveX control that leverages the Microsoft WebBrowser control for rendering a UIMessage. UIMessageDisplay applies an XSLT to transform the UIMessage document into an HTML-based visualization. The UIMessageDisplay also handles user input [which includes various forms of data validation] as well as submission of the UIMessage back to the engine. The control supports the following interface:

```
typedef enum visual_mode {view, edit} eVisualMode;
interface IMessageDisplay : IDispatch
{
    // METHODS:
    // hidden method used by HTML UI to submit entered values
    HRESULT Submit( );
    // hidden method used by HTML UI to cancel session
    HRESULT Cancel( );
    // clear the HTML display
    HRESULT Clear( );
    // display the current UI Message in either view or edit mode
    HRESULT Display([in, optional,
    defaultvalue(view)]eViewMode Mode);
    // get the entire UIMessage xml property
    HRESULT GetUIMessage([out, retval]BSTR* Message);
    // set the UIMessage xml property of the control
    HRESULT SetUIMessage(BSTR Message);
    // set the current transform property [defaults to std_display]
    HRESULT SetUITransform(BSTR TransformName);
    // allows loading the control directly with HTML
    HRESULT LoadBrowserFromText(BSTR HtmlText);
    // EVENTS:
        // fired when submit succeeds
        SubmitSucceeded ( );
        // fired if result message cannot be delivered to destination route
        SubmitFailed ( );
        // fired when the HTML Cancel button is clicked
        SubmitCanceled ( );
}
```

As evident in the discussion that follows, in the illustrated embodiment, UI messages are converted to/from XML markup language by the IUI Message component for use (e.g., information display and/or retrieval) by the IUIMessageDisplay component. To facilitate dynamic display of the UI messages, the latter specifies their output to the web-browser component active within the runtime client application in XHTML, though it will be appreciated that HTML or other protocols, proprietary or otherwise, markup language-based or otherwise, may be used as well or in addition. Moreover, IUIMessageDisplay utilizes XSL to govern formatting of those displayed message by the web-browser component, though, again, it will be appreciated that other format specification techniques, proprietary or otherwise, may be used to specify the formatting of UI messages or the elements thereof. Shown in FIGS. 32A–32C is a UI Message schema according to the illustrated embodiment. That schema is presented in XSD format. Shown in FIGS. 33A–33B is a UI message template according to the illustrated embodiment. That schema is presented in XSL format Turning back to FIG. 30, in step 3010, the action execution thread (AET) instantiates an IUIMessage component for the UI Message action associated with a trigger being processed by the AET. In the illustrated embodiment, The message content and other information from the production support database 18*b*" is provided to the IUIMessage component in order to format the message (and supporting information) in XML format.

In step 3020, the AET sets the routing information for the UIMessage. The illustrated embodiment utilizes MSMQ to route messages to runtime clients, though other embodiments may use other protocols instead or in addition.

In step 3030, the AET routes the UIMessage command message—now, in XML format—to the designated runtime client applications. In the illustrated embodiment, which uses MSMQ, this means creating an MSMQ message of the requisite type and notifying the client application(s) that it is available. In step 3040, waits on the asynchronous response from the runtime client(s).

To receive a UI Message from the MSMQ queue, the runtime client:
- a) Monitors the RTC Common queue for messages indicating a UIMessage command message type. See Step 3050.
- b) Creates instance of IUIMessage component. See Step 3060.
- c) Converts the MSMQ Message body from VARIANT to string, in this case, a string containing the XML encoded message. See step 3070.
- d) Calls the IUIMessage::FromXML (Message) method, passing the message string. This initializes the IUIMessage component from its XML representation. See step 3080.

UI Message visualization is generated dynamically by using an XSL Stylesheet associated with the UI Message XML document. A default standard XSL stylesheet, depicted in FIG. 31, provides a table-oriented, HTML-based user interface. To use default (or standard) UI Message visualization, for viewing a message, the runtime client:
- a) Creates instance of IUIMessageDisplay control or, more particularly, IUIMessageDisplay. See Step 3090.
- b) Calls IUIMessageDisplay::SetUIMessage (IUIMessage::ToXML( )) to initialize display control. See Step 3100.
- c) Calls IUIMessageDisplay::TransformUIMessage ("std_display") to transform the Message using built-in transform. See Step 3110.
- d) Calls IUIMessageDisplay::SetMode (view) [view=0, edit=1]
- e) Calls IUIMessageDisplay::Display ( ) to display the UIMessage visualization. See Step 3120.

To use default (or standard) UI Message visualization in edit mode, the runtime client:
- a) Executes steps a–c, immediately above.
- b) Calls IUIMessageDisplay::SetMode (edit) [edit=1]
- c) Calls IUIMessageDisplay::Display ( ) to display the UIMessage visualization
- d) The operator enters values for all questions/prompts, then click Submit.
- e) Implements an Event Sink for IUIMessageDisplay events. These events are raised by the control to indicate that the user has clicked the Submit or Cancel buttons on the IUIMessageDisplay HTML form.
- f) If the SubmitSucceeded event was raised then
  - a. Call IUIMessage::FromXML (IUIMessageDisplay::GetUIMessage ( )). See Step 3130.
  - b. Send the UIMessage response back to EventMgr by calling the IUIMessage:: SendResults method. See step 3140.
- g) else if the SubmitCanceled event was raised
  - a. Put the UIMessage back on the RTC Common queue OR store locally.

Overriding the standard UIMessage Visualization is accomplished on a per-UIMessage basis. The IUIMessage component has a Name property. If the client application has provided a custom visualization for UIMessages that have a specific name, then the client may choose not to use the IUIMessageDisplay control.

Referring back go FIG. 30, in step 3150, the AET processes any response from the runtime client, e.g., placing back in PDIs or workflow context variable any values entered by the operator.

A further understanding of the interaction between the UIMessage component, the UIMessage display component and the operator is depicted in FIG. 3 and discussed above in connection therewith.

Thin Client UI Messaging

UI Messaging for a "thin" runtime client is accomplished as discussed above, taking into account the modifications below.

At the outset, the runtime client of a "thin" client is an Microsoft ASP.NET application that provides web-based access to UI Messages for web browsers and mobile devices. As above, that application provides a view of the available UI messages for a client, and enables the client to enter values for the message items and submit the results.

Figure 34:
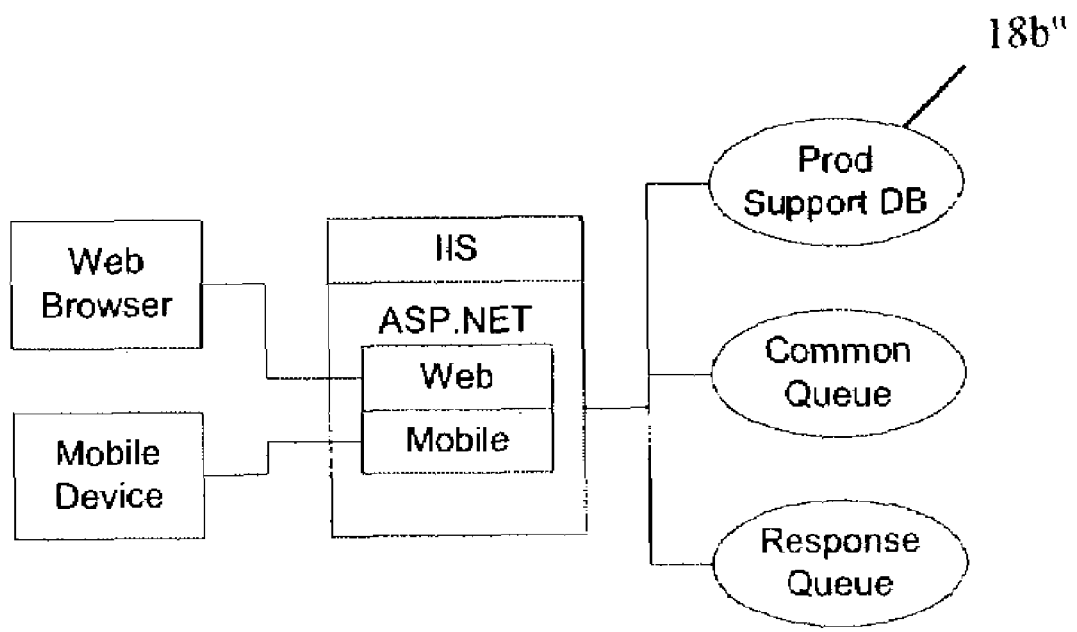
FIG. 34 depicts an architecture for UI messaging with a thin runtime client in a system according to one practice of the invention.

Referring to FIG. 34, The UI Message Thin Client consists of two ASP.NET applications. One is a standard ASP.NET web application, which supports standard web-based clients. The other is a Mobile Web Application, which supports mobile device clients. Both applications work similarly, the main difference is that the mobile application uses the mobile controls to support the limitations of mobile devices. The mobile application also does not support custom pages like the standard web application.

Startup

Both applications query the production support database 18b" at startup to determine the common and response queues to use for getting and returning messages. In order for this to work, the IIS machine must be entered as a workstation in the ConfigClient. The WorkstationID for the IIS machine is also retrieved at this time. This data is stored in the Application object.

When a client makes a request for the first time, its WorkstationID is retrieved from the production support database 18b" as well. If it does not exist in the product support database 18b", a −1 is stored. This information is stored in the Session object.

UI Message List

When the user requests a list of the available UI Messages (UIMessageList.aspx), the application iterates through the common queue, looking for messages that match the IIS WorkstationID or the client's WorkstationID. If a message matches, it is added to a table. The name of the UI Message is stored as a link to the UI Message editing page (UIMessage.aspx). This link also contains a parameter named ID that identifies the message.

UI Message

When the user selects a message in the list by clicking on its name, the application receives the message from the common queue. This removes the message from the queue, making it unavailable to others. This is done using a transaction. The reason for this is that if the user later cancels the message or never submits it, the transaction can be aborted and the message will be returned to the common queue were another client can pick it up.

Once the message has been received, it's name is used to check for the existence of a custom page. If a custom page is found, control is transferred to that page.

The body of the message is loaded into an XML DOM and then parsed to find the labels, questions, and list PDIs.

Appropriate controls are added to the page to allow the user to enter values for these items. If the item is required and/or a numeric field, a validator control is added as well to insure the submitted results are valid. The control IDs are set to match the names of the workflow variables corresponding to each of the message items. This aids in returning the results later.

The XML DOM, message ID, and message transaction are all stored in the session object for later use.

If the user clicks the cancel button, the message transaction is aborted, and the message returns to the common queue.

If the user clicks the submit button, the application parses through the XML DOM finding message items. It uses the workflow variable name assigned to the item to retrieve the value submitted from the form. These values are then set in the XML DOM. Once all of the values have been retrieved and stored in the XML DOM, the message is sent to the response queue and the transaction is committed.

UI Message Notification

A UI Message Notification control was created to provide a way to add an indicator to a web page that informs the user when a message is available. The indicator is a red image when no messages are available for the client, and turns green when a message is available. When the indicator is green, clicking on it will popup a new page that contains the UI Message List.

Disclosed above are methods and apparatus meeting the objectives set forth above, among others. It will, of course, be appreciated that the embodiments disclosed herein are merely examples of the invention and that other embodiments incorporating changes therein fall within the scope of the invention.

We claim:

1. A method of graphically configuring a system for process, factory-floor, environmental, computer aided manufacturing-based or other (collectively, "process") control, comprising:
   (A) selecting from among a plurality of first icons, each representing a triggering event, an icon representative of a selected triggering event,
   (B) selecting from among a plurality of second icons, each representing a respective action, one or more respective selected actions,
   (C) defining a workflow by positioning the selected icons with respect to one another, the positioning determining, during workflow execution by a production engine, the one or more selected actions to be taken in response to the selected triggering event,
   (D) configuring a database to include a runtime component having a representation of the workflow and operational parameters obtained from at least one other database, each other database associated with a control application that is a client of the production engine, and
   (E) performing process monitoring or process control using the workflow and the configured database.

2. The method of claim 1, comprising presenting a first pane displaying the first and second plurality of icons, and presenting a second pane displaying the selected icons that define the workflow.

3. The method of claim 2, wherein step (C) comprises dragging-and-dropping the selected icons from the first pane to the second pane.

4. The method of claim 1, comprising presenting the first and second pluralities of icons in a tree view.

5. The method of claim 4, wherein the presenting step includes displaying (i) one or more icons representing a workflow currently being defined and the previously defined work-flows, (ii) one or more icons comprising the first plurality of icons, and (iii) one or more icons comprising the second plurality of icons.

6. The method of claim 5, wherein the step of displaying the one or more icons comprising the second plurality of icons includes displaying one or more groupings of icons representing each of one or more of the categories collection plans, expressions, production events, and stored procedures.

7. A method of permitting a user to graphically configure a system for process, factory-floor, environmental, computer aided manufacturing-based or other (collectively, "process") control, comprising:
   (A) presenting in a first display pane a first plurality of icons representing triggering events and a second plurality of icons representing actions,
   (B) dragging-and-dropping from the first display pane onto a second display pane at least one icon selected from the first plurality of icons and at least one icon selected from the second plurality of icons,
   (C) positioning the icons in the second display pane to establish a workflow for the process control system defining one or more selected actions to be taken by a production engine in response to a triggering event,
   (D) configuring a database to include a runtime component having a representation of the workflow and operational parameters obtained from at least one other database, each other database associated with a control application that is a client of the production engine, and
   (E) coupling the workflow with the database to perform process monitoring or process control.

8. The method of claim 7, wherein step (C) includes positioning the icons to define any of a linear workflow, parallel workflows, sub-workflows, or any of decisions, transitions, and conditional branches.

9. The method of claim 7, wherein step (B) includes dragging-and-dropping icons representing a decision action and one or more further actions onto the second display pane, and defining which of those further actions are to be taken based on results of the decision action.

10. The method of claim 7, further comprising:
    defining icons presented and manipulated in steps (A)–(C) using the Microsoft Foundation Class (MFC) document/view architecture.

11. The method of claim 10, comprising maintaining information about each icon presented in at least the first display pane using CTreeView.

12. The method of claim 11, comprising associating a trigger class with each icon in the first plurality of icons and an action class with each icon in the second plurality of icons, and further comprising defining collections to contain objects representing the icons and each class.

13. In the method of claim 10, the further improvement wherein the first plurality of icons represent events including any of process value changes, device inputs, production status changes, resource status changes, control application messages, operator user interface messages.

14. A method of process, factory-floor, environmental, computer aided manufacturing-based or other (collectively, "process") control, comprising:
    (A) presenting in a first display pane a first plurality of icons representing triggering events that can occur with respect to the process and/or one or more control applications that interface with an operator and/or control equipment for the process, and a second plurality of icons representing actions, (B) dragging-and-dropping from the first display pane onto a second display pane at least one icon selected from the first plurality of icons and at least one icon selected from the second plurality of icons, and, thereby, defining a workflow for the process control system determining one or more selected actions to be taken by a production engine in response to the selected triggering event, (C) coupling the workflow with a database configured to include a runtime component having a representation of the workflow and operational parameters obtained from at least one other database, each other database associated with a control application that is a client of the production engine, (D) monitoring the control applications to detect occurrence of the selected triggering event, and (E) responding to detected event by taking action in accord with the defined workflow.

15. In the method of claim 14, the further improvement wherein the second plurality of icons represent actions including any of start; complete, and other transactions in the control applications; stored procedures; database transactions; set-point configuration; data collection; downtime reporting; sample registration; production reporting; consumption reporting; maintenance tasking; operator messaging; and SCADA alarm actions.

16. The method of claim 14, wherein step (B) includes dragging-and-dropping the icons in the second display pane to define any of a linear workflow, parallel workflows, sub-workflows, or any of decisions, transitions, and conditional branches.

17. The method of claim 14, wherein step (B) includes dragging-and-dropping icons representing a decision action and one or more further actions onto the second display pane, and defining which of those further actions are to be taken based on results of the decision action.

18. In the method of claim 14, the further improvement wherein any of the events and actions are defined with respect to objects or other data structures (collectively, "objects") that maintain values associated with the process, the objects maintaining any of a date/time associated with the process, a true/false (or other binary) value associated with the process, a numeric value associated with the process, a text value associated with the process, and a value selected from among a hierarchical set of values characterizing one or more aspects of the process.

* * * * *